US012663905B2

(12) United States Patent
Kim et al.

(10) Patent No.: US 12,663,905 B2
(45) Date of Patent: Jun. 23, 2026

(54) ELECTRONIC DEVICE COMPRISING SENSOR LAYER AND SENSOR DRIVER

(71) Applicant: Samsung Display Co., Ltd., Yongin-si (KR)

(72) Inventors: Gayoung Kim, Yongin-si (KR); Sanghyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/966,786

(22) Filed: Dec. 3, 2024

(65) Prior Publication Data

US 2025/0335064 A1 Oct. 30, 2025

(30) Foreign Application Priority Data

Apr. 25, 2024 (KR) ........................ 10-2024-0055551

(51) Int. Cl.
 *G06F 3/044* (2006.01)
 *G06F 3/041* (2006.01)
(52) U.S. Cl.
 CPC ........ *G06F 3/0448* (2019.05); *G06F 3/04164* (2019.05); *G06F 3/0446* (2019.05); *G06F 2203/04114* (2019.05)
(58) Field of Classification Search
 CPC .. G06F 3/0448; G06F 3/0446; G06F 3/04164; G06F 2203/04114
 See application file for complete search history.

(56) References Cited

U.S. PATENT DOCUMENTS

| | | | |
|---|---|---|---|
| 9,092,097 B2 | 7/2015 | Kang et al. | |
| 11,625,118 B2 | 4/2023 | Kim et al. | |
| 11,847,275 B2 | 12/2023 | Park et al. | |
| 2014/0062948 A1 | 3/2014 | Lee et al. | |
| 2023/0185400 A1* | 6/2023 | Park ..................... | G06F 3/0445 |
| | | | 345/173 |

FOREIGN PATENT DOCUMENTS

| | | |
|---|---|---|
| KR | 10-1351413 B1 | 1/2014 |
| KR | 10-2166853 B1 | 10/2020 |
| KR | 10-2021-0109694 A | 9/2021 |
| KR | 10-2022-0062191 A | 5/2022 |

* cited by examiner

*Primary Examiner* — Deeprose Subedi
(74) *Attorney, Agent, or Firm* — Womble Bond Dickinson (US) LLP

(57) ABSTRACT

An electronic device includes: a sensor layer; and a sensor driver to drive the sensor layer, and selectively operate in a first mode of sensing a touch input or a second mode of sensing a pen input. The sensor layer includes: first electrodes, each extending in a first direction, and located along a second direction crossing the first direction; second electrodes, each extending in the first direction, and located along the second direction; first lines electrically connected to the first electrodes; and a second line electrically connected to the second electrodes. Each of the first electrodes includes: a first split electrode extending in the first direction; and a second split electrode extending in the first direction, and spaced from the first split electrode in the first direction. At least a portion of the second line connects adjacent ones of the second electrodes to each other inside a sensing area.

23 Claims, 33 Drawing Sheets

ELECTRONIC DEVICE COMPRISING SENSOR LAYER AND SENSOR DRIVER

CROSS-REFERENCE TO RELATED APPLICATION

The present application claims priority to and the benefit of Korean Patent Application No. 10-2024-0055551, filed on Apr. 25, 2024, in the Korean Intellectual Property Office, the entire disclosure of which is incorporated by reference herein.

BACKGROUND

Aspects of embodiments of the present disclosure relate to an electronic device that may sense an input by a pen.

Multimedia electronic devices, such as a television (TV), a mobile phone, a tablet computer, a laptop, a navigation system, and a game console, include a display device for displaying an image. In addition to a general input method, such as a button, a keyboard, and a mouse, the electronic devices may include a sensor layer (e.g., an input sensor) capable of providing a touch-based input method that allows a user to input information or commands easily and intuitively. The sensor layer may sense a touch or a pressure by the user. The demand of use of a pen for a more detailed touch input for users accustomed to inputting information using a writing instrument or a specific application (e.g., an application for sketching or drawing) is increasing.

The above information disclosed in this Background section is for enhancement of understanding of the background of the present disclosure, and therefore, it may contain information that does not constitute prior art.

SUMMARY

Embodiments of the present disclosure may be directed to an electronic device capable of sensing an input by a pen.

According to one or more embodiments of the present disclosure, an electronic device includes: a sensor layer having a sensing area, and a peripheral area adjacent to the sensing area; and a sensor driver configured to drive the sensor layer, and selectively operate in a first mode of sensing a touch input or a second mode of sensing a pen input. The sensor layer includes: a plurality of first electrodes, each extending in a first direction, and located along a second direction crossing the first direction; a plurality of second electrodes, each extending in the first direction, and located along the second direction; a plurality of first lines electrically connected to the plurality of first electrodes; and a second line electrically connected to the plurality of second electrodes. Each of the plurality of first electrodes includes: a first split electrode extending in the first direction; and a second split electrode extending in the first direction, and spaced from the first split electrode in the first direction. At least a portion of the second line connects adjacent second electrodes to each other inside the sensing area from among the plurality of second electrodes.

In an embodiment, the at least a portion of the second line may be located inside a gap between the first split electrode and the second split electrode.

In an embodiment, the second line may include: $(2\text{-}1)^{th}$ lines connecting adjacent ones of the plurality of second electrodes to each other; and a $(2\text{-}2)^{th}$ line electrically connecting the plurality of second electrodes to the sensor driver. The plurality of second electrodes, the $(2\text{-}1)^{th}$ lines, and the $(2\text{-}2)^{th}$ line may have an integrated shape together.

In an embodiment, at least a portion of each of the plurality of second electrodes may overlap with the first split electrode and the second split electrode of a corresponding one of the plurality of first electrodes.

In an embodiment, each of the plurality of second electrodes may include: a first auxiliary split electrode extending in the first direction; and a second auxiliary split electrode extending in the first direction, and spaced from the first auxiliary split electrode in the first direction. The second line may include: a $(2\text{-}1)^{th}$ line electrically connected to a plurality of the first auxiliary split electrodes of the plurality of second electrodes; and a $(2\text{-}2)^{th}$ line electrically connected to a plurality of the second auxiliary split electrodes of the plurality of second electrodes.

In an embodiment, the $(2\text{-}1)^{th}$ line may be connected to one area of each of the plurality of the first auxiliary split electrodes adjacent to the plurality of the second auxiliary split electrodes, and the $(2\text{-}2)^{th}$ line may be connected to one area of each of the plurality of the second auxiliary split electrodes adjacent to the plurality of the first auxiliary split electrodes.

In an embodiment, at least a portion of the first auxiliary split electrode may overlap with the first split electrode of a corresponding one of the plurality of first electrodes, and at least a portion of the second auxiliary split electrode may overlap with the second split electrode of a corresponding one of the plurality of second electrodes.

In an embodiment, a length of the first split electrode of one of the plurality of first electrodes and a length of the second split electrode of the one of the plurality of first electrodes may be the same as each other.

In an embodiment, a length of the first split electrode of one of the plurality of first electrodes and a length of the second split electrode of the one of the plurality of first electrodes may be different from each other.

In an embodiment, the first split electrodes of the plurality of first electrodes may have the same length as each other, and the second split electrodes of the plurality of second electrodes may have the same length as each other.

In an embodiment, at least some of the first split electrodes of the plurality of first electrodes may have different lengths from each other, and at least some of the second split electrodes of the plurality of second electrodes may have different lengths from each other.

In an embodiment, gaps between the first split electrodes of the plurality of first electrodes and the second split electrodes of the plurality of second electrodes may be located along a diagonal direction with respect to the first direction and the second direction.

In an embodiment, the plurality of first lines may include: a plurality of $(1\text{-}1)^{th}$ lines electrically connected to a plurality of the first split electrodes of the plurality of first electrodes, respectively; and a plurality of $(1\text{-}2)^{th}$ lines electrically connected to a plurality of the second split electrodes of the plurality of first electrodes, respectively.

In an embodiment, each of the plurality of $(1\text{-}1)^{th}$ lines and the plurality of $(1\text{-}2)^{th}$ lines may overlap with the peripheral area, and the plurality of $(1\text{-}1)^{th}$ lines and the plurality of $(1\text{-}2)^{th}$ lines may be spaced from each other with the plurality of the first split electrodes and the plurality of the second split electrodes located therebetween.

In an embodiment, at least a portion of each of the plurality of $(1\text{-}1)^{th}$ lines and the plurality of $(1\text{-}2)^{th}$ lines may overlap with the sensing area. At least some of the plurality of $(1\text{-}1)^{th}$ lines may be insulated from and cross at least some of the plurality of the first split electrodes, and at least some of the plurality of $(1\text{-}2)^{th}$ lines may be insulated from and cross at least some of the plurality of the second split electrodes.

In an embodiment, each of the plurality of first electrodes may further include a third split electrode spaced from the first split electrode and the second split electrode in the first direction, and extending in the first direction.

In an embodiment, at least a portion of each of the plurality of second electrodes may overlap with the first split electrode, the second split electrode, and the third split electrode of a corresponding one of the plurality of first electrodes.

In an embodiment, each of the plurality of second electrodes may include a first auxiliary split electrode, a second auxiliary split electrode, and a third auxiliary split electrode spaced from each other in the first direction, and extending in the first direction. The second line may include: a $(2\text{-}1)^{th}$ line electrically connected to a plurality of the first auxiliary split electrodes of the plurality of second electrodes; a $(2\text{-}2)^{th}$ line electrically connected to a plurality of the second auxiliary split electrodes of the plurality of second electrodes; and a $(2\text{-}3)^{th}$ line electrically connected to a plurality of the third auxiliary split electrodes of the plurality of second electrodes.

In an embodiment, a length of the sensing area in the first direction may be greater than a length of the sensing area in the second direction.

In an embodiment, the sensor layer may further include: a plurality of third electrodes located along the first direction, and insulated from and crossing the plurality of first electrodes, each of the plurality of third electrodes extending in the second direction; a plurality of fourth electrodes located along the first direction, and insulated from and crossing the plurality of third electrodes, each of the plurality of fourth electrodes extending in the second direction; a plurality of third lines electrically connected to the plurality of third electrodes, respectively; and a fourth line electrically connected to the plurality of fourth electrodes.

In an embodiment, in the first mode, the plurality of first electrodes and the plurality of third electrodes may be configured to sense a capacitance, and the plurality of second electrodes and the plurality of fourth electrodes may be configured to be grounded. The second mode may include a pen sensing drive mode, and in the pen sensing drive mode, the sensor driver may be configured to receive reception signals based on an induced current flowing through the plurality of first electrodes, the plurality of second electrodes, the plurality of third electrodes, and the plurality of fourth electrodes.

In an embodiment, the second mode may further include a charging drive mode, and in the charging drive mode, at least the plurality of fourth electrodes may be configured to define a current path, and the plurality of first electrodes, the plurality of second electrodes, and the plurality of third electrodes may be configured to be floated.

According to one or more embodiments of the present disclosure, an electronic device includes: a sensor layer; and a sensor driver configured to drive the sensor layer, and selectively operate in a first mode of sensing a touch input or a second mode of sensing a pen input. The sensor layer includes: a plurality of first electrodes, each extending in a first direction, and located along a second direction crossing the first direction; a plurality of second electrodes, each extending in the first direction, and located along the second direction; a plurality of first lines electrically connected to the plurality of first electrodes; and a second line electrically connected to the plurality of second electrodes. Each of the plurality of first electrodes includes: a first split electrode extending in the first direction; and a second split electrode extending in the first direction, and spaced from the first split electrode in the first direction. At least a portion of the second line is located inside a gap between the first split electrode and the second split electrode.

According to one or more embodiments of the present disclosure, an electronic device includes: a sensor layer having a sensing area, and a peripheral area adjacent to the sensing area, the sensor layer including: a plurality of first electrodes, each extending in a first direction, and located along a second direction crossing the first direction; a plurality of second electrodes, each extending in the first direction, and located along the second direction; a plurality of first lines electrically connected to the plurality of first electrodes; and a second line electrically connected to the plurality of second electrodes. At least a portion of the second line connects adjacent second electrodes to each other inside the sensing area from among the plurality of second electrodes, and the plurality of second electrodes and the second line have an integrated shape together.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

FIG. 8A is a view illustrating some electrode groups inside the sensor layer according to an embodiment of the present disclosure.

5

Figure 10A:
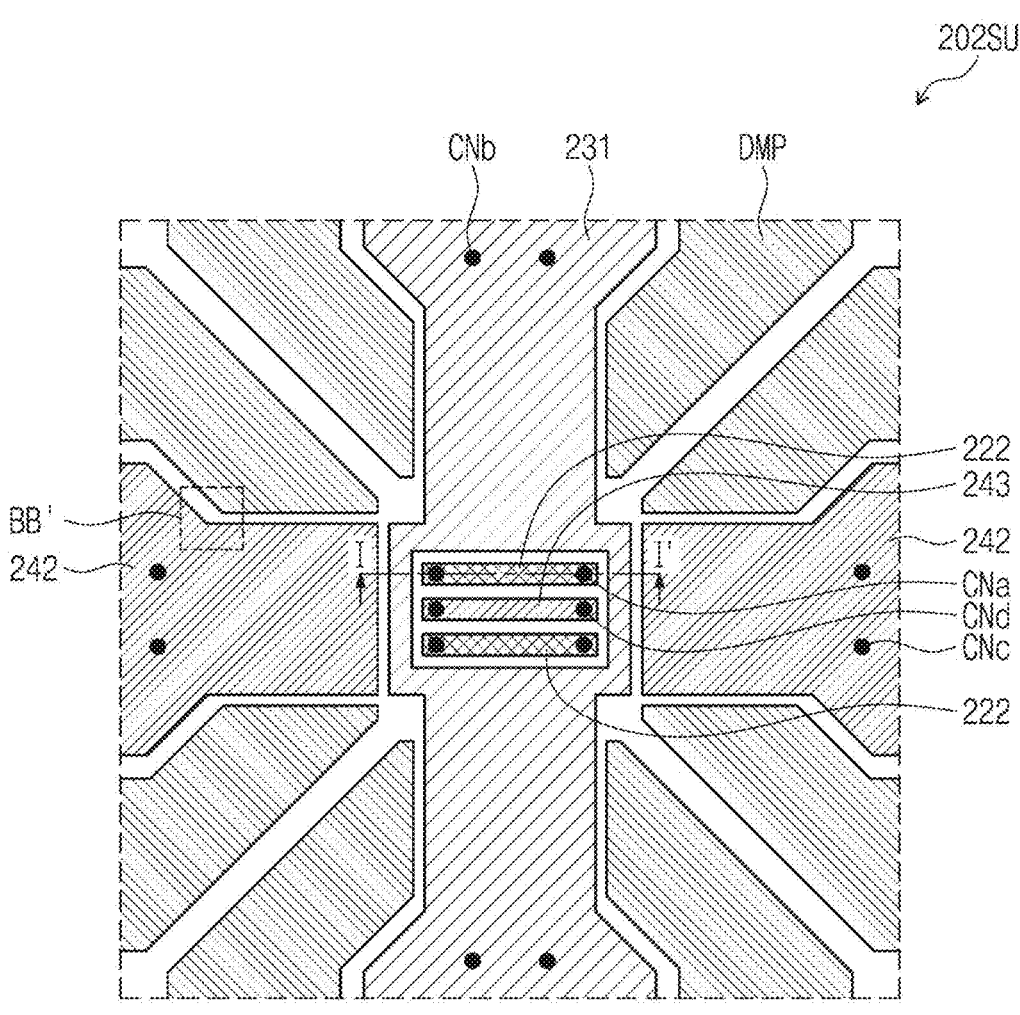
FIG. 10A is a plan view illustrating a first conductive layer of the sensor unit according to an embodiment of the present disclosure.
Figure 10A:
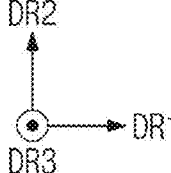
Figure 10B:
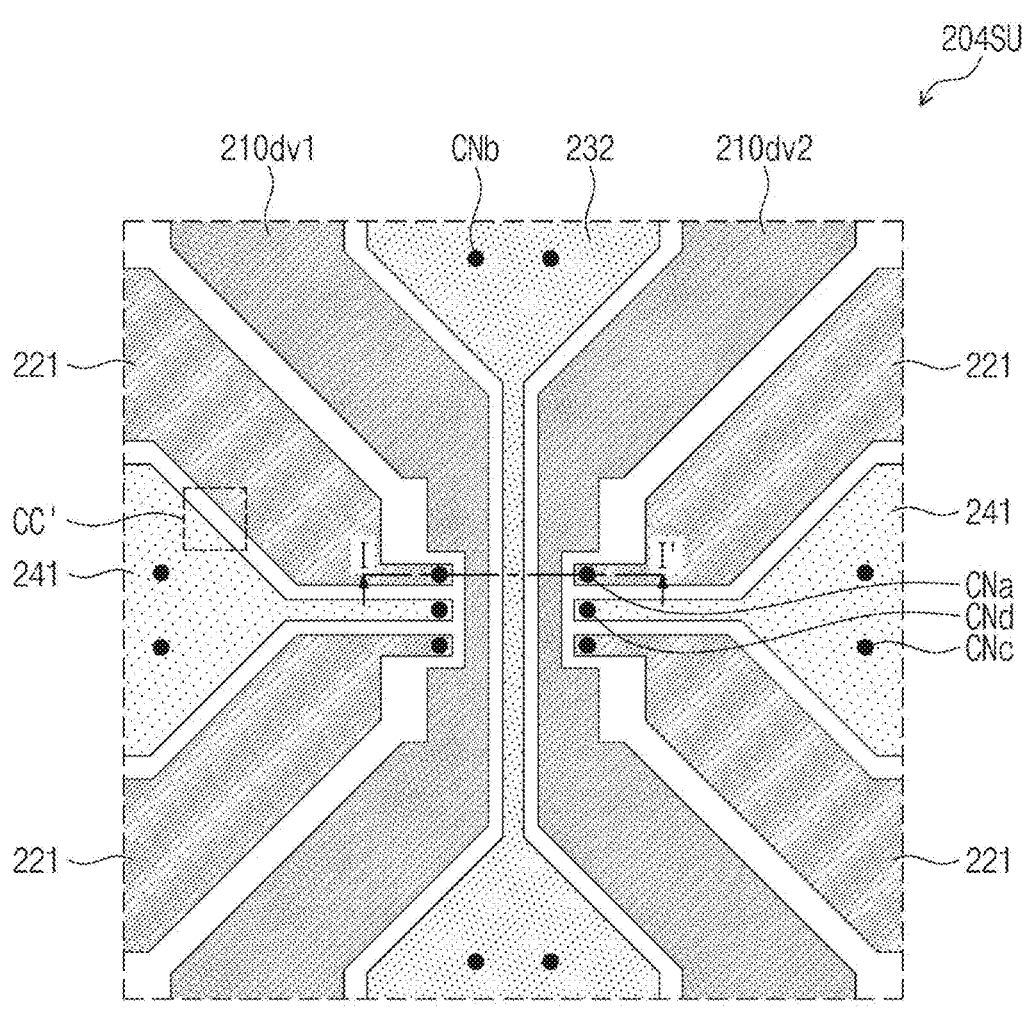
FIG. 10B is a plan view illustrating a second conductive layer of the sensor unit according to an embodiment of the present disclosure.
Figure 10B:
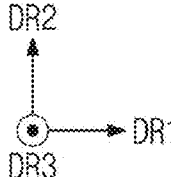
Figure 10C:
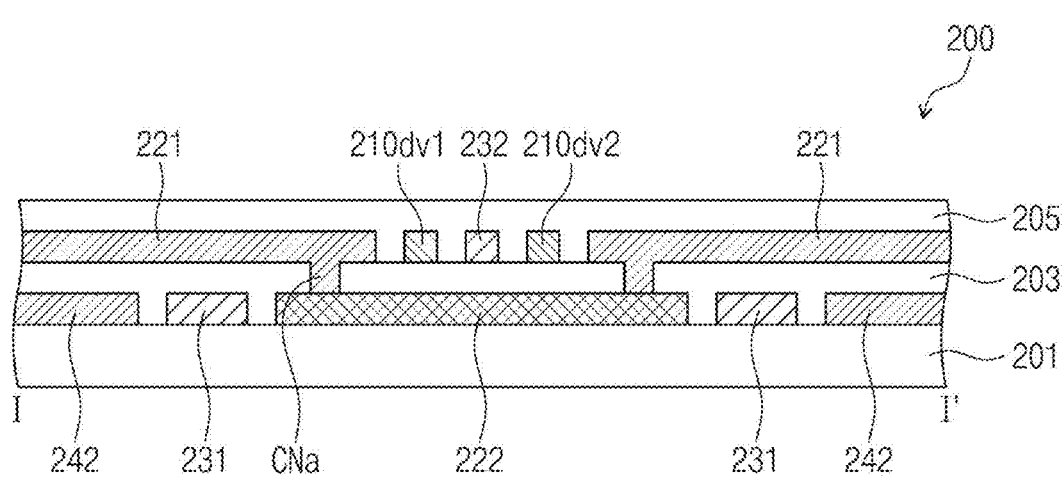
Figure 10C:
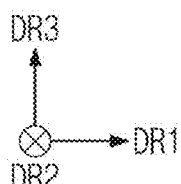

FIG. 10C is a cross-sectional view of the sensor layer taken along the line I-I' illustrated in FIGS. 10A and 10B according to an embodiment of the present disclosure.

Figure 11A:
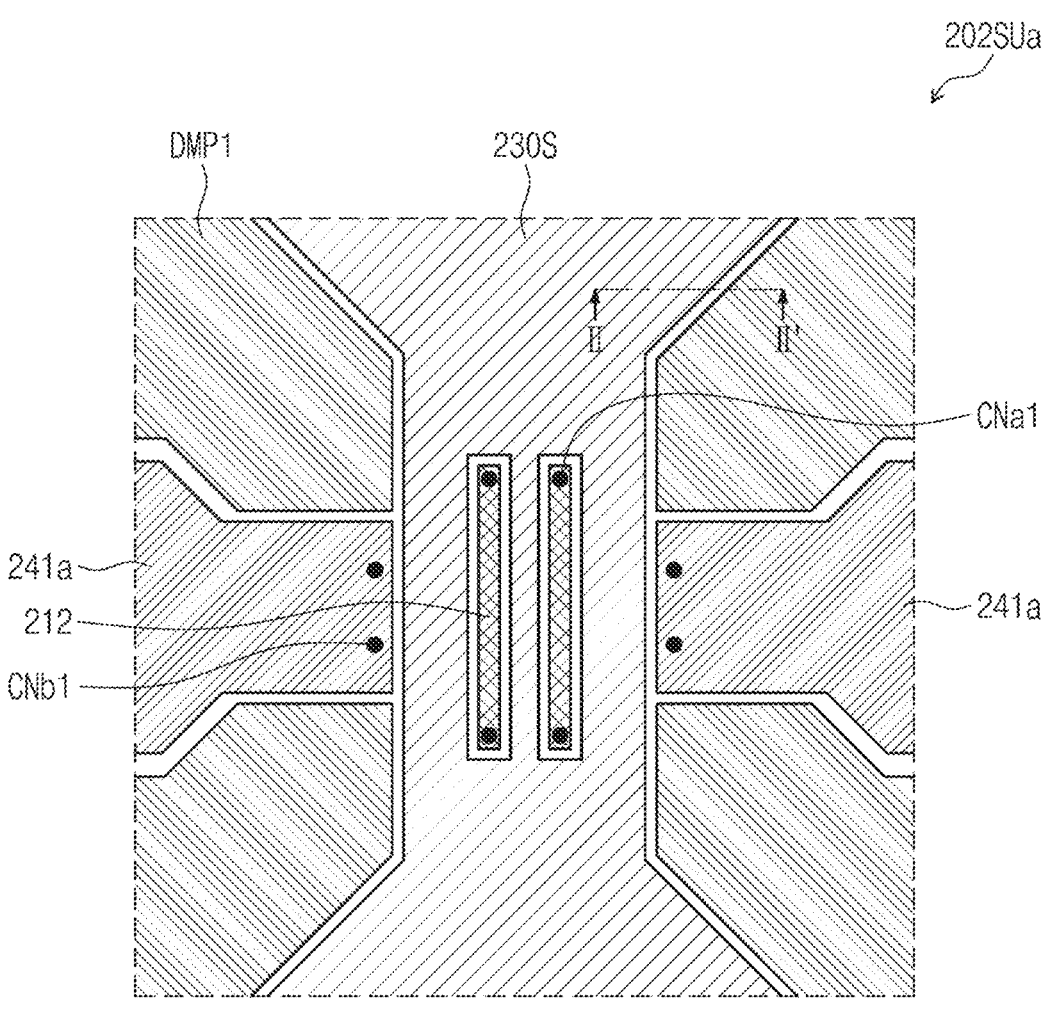
Figure 11A:
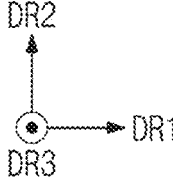

FIG. 11A is a plan view illustrating a first conductive layer of the sensor unit according to an embodiment of the present disclosure.

Figure 11B:
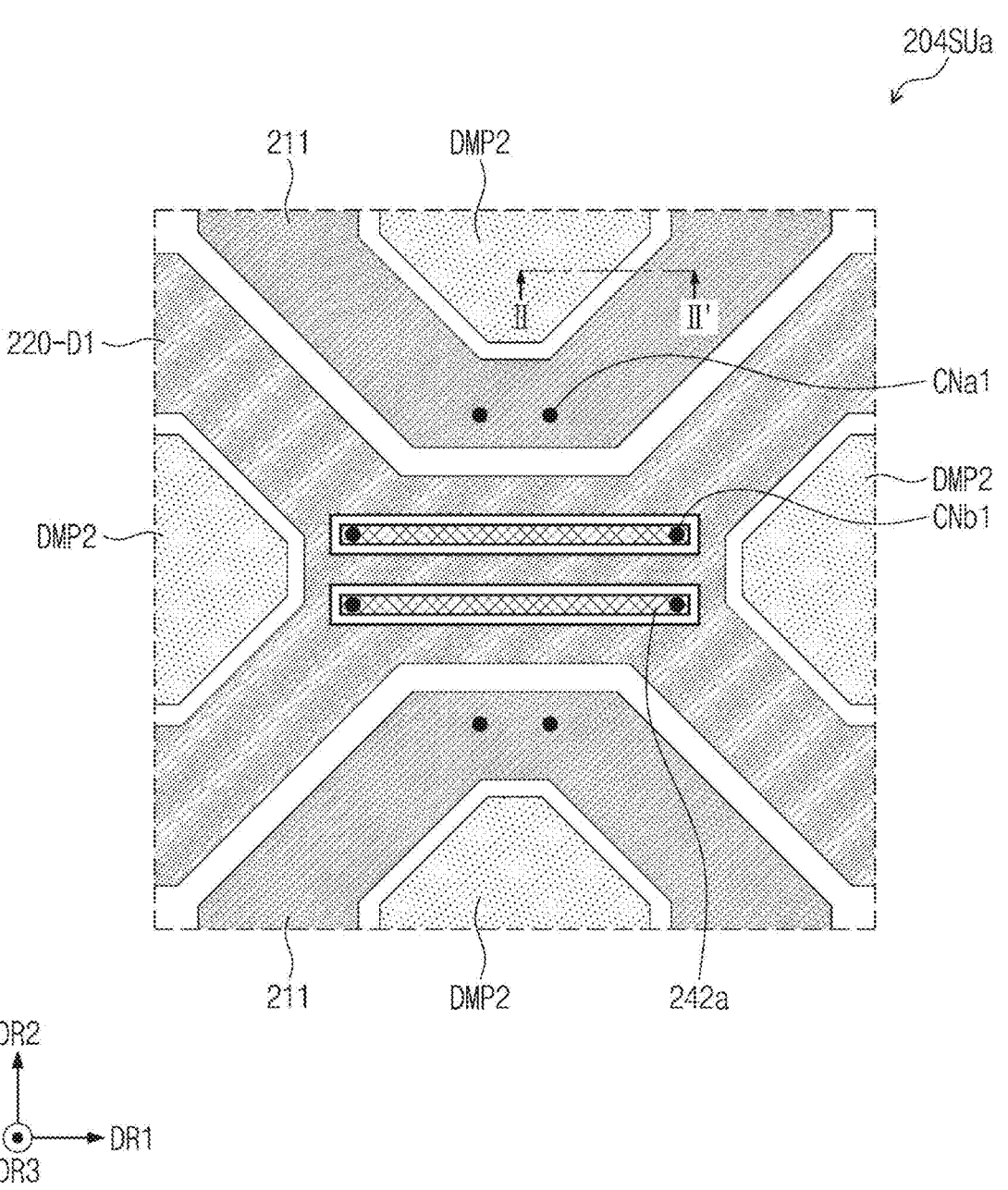

FIG. 11B is a plan view illustrating a second conductive layer of the sensor unit according to an embodiment of the present disclosure.

Figure 11C:
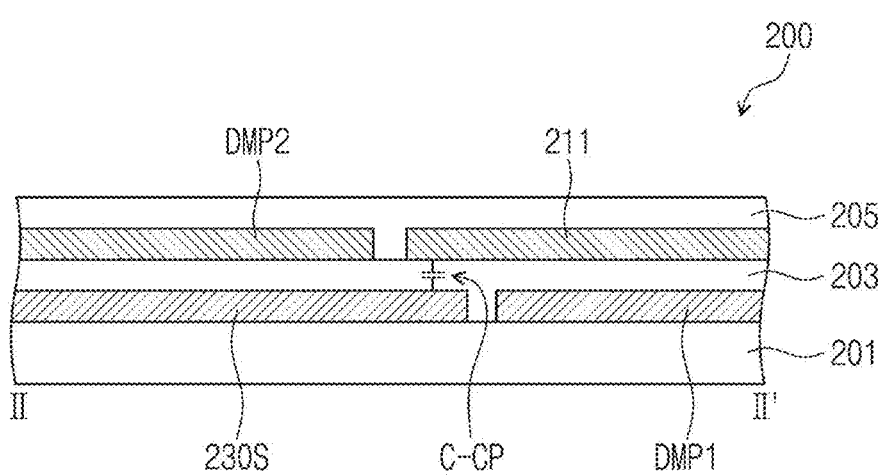
Figure 11C:
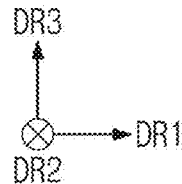

FIG. 11C is a cross-sectional view of the sensor layer along the line II-II' illustrated in FIGS. 11A and 11B according to an embodiment of the present disclosure.

Figure 12A:
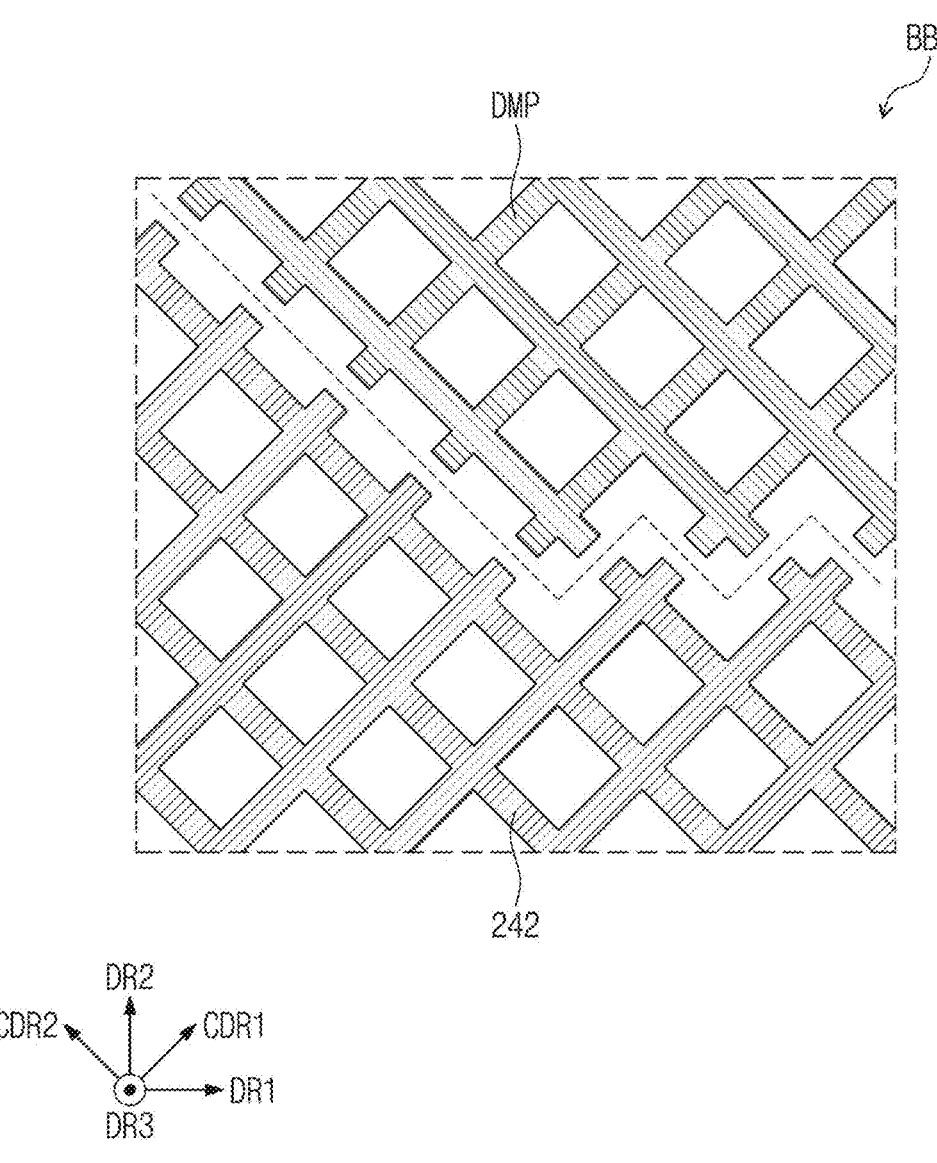

FIG. 12A is an enlarged plan view of the area BB' illustrated in FIG. 10A.

Figure 12B:
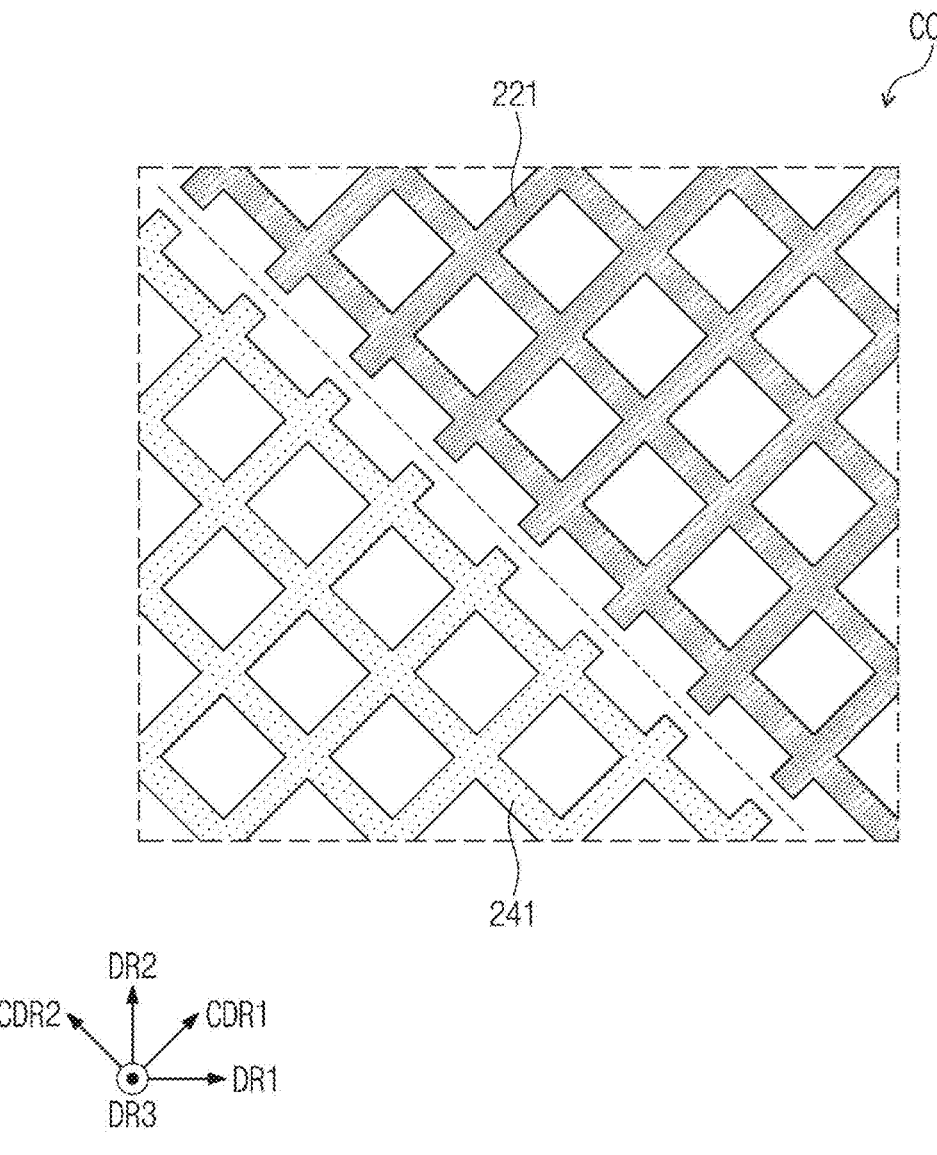

FIG. 12B is an enlarged plan view of area CC' illustrated in FIG. 10B.

Figure 13:
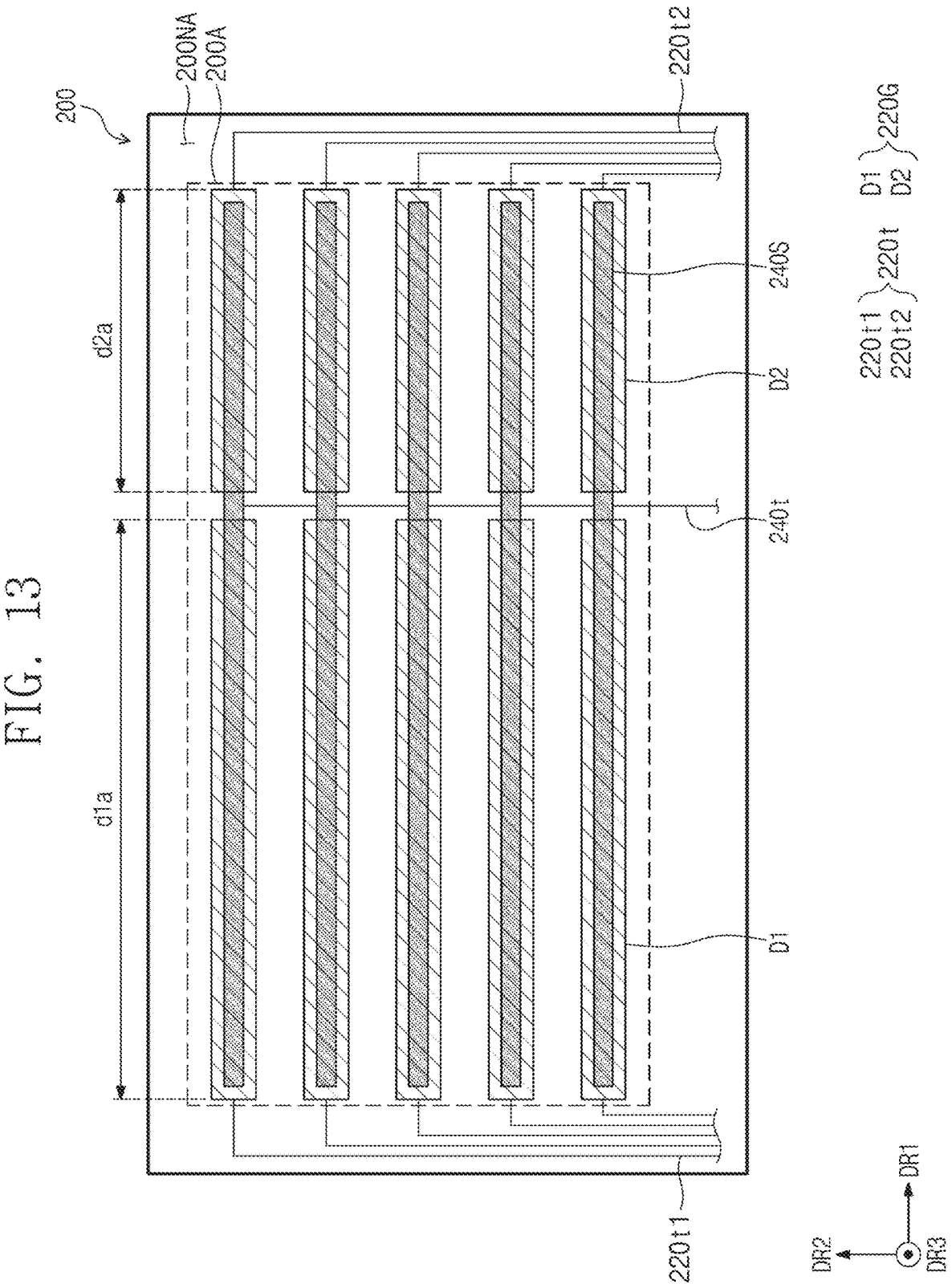

FIG. 13 is a view illustrating some electrode groups inside the sensor layer according to an embodiment of the present disclosure.

Figure 14:
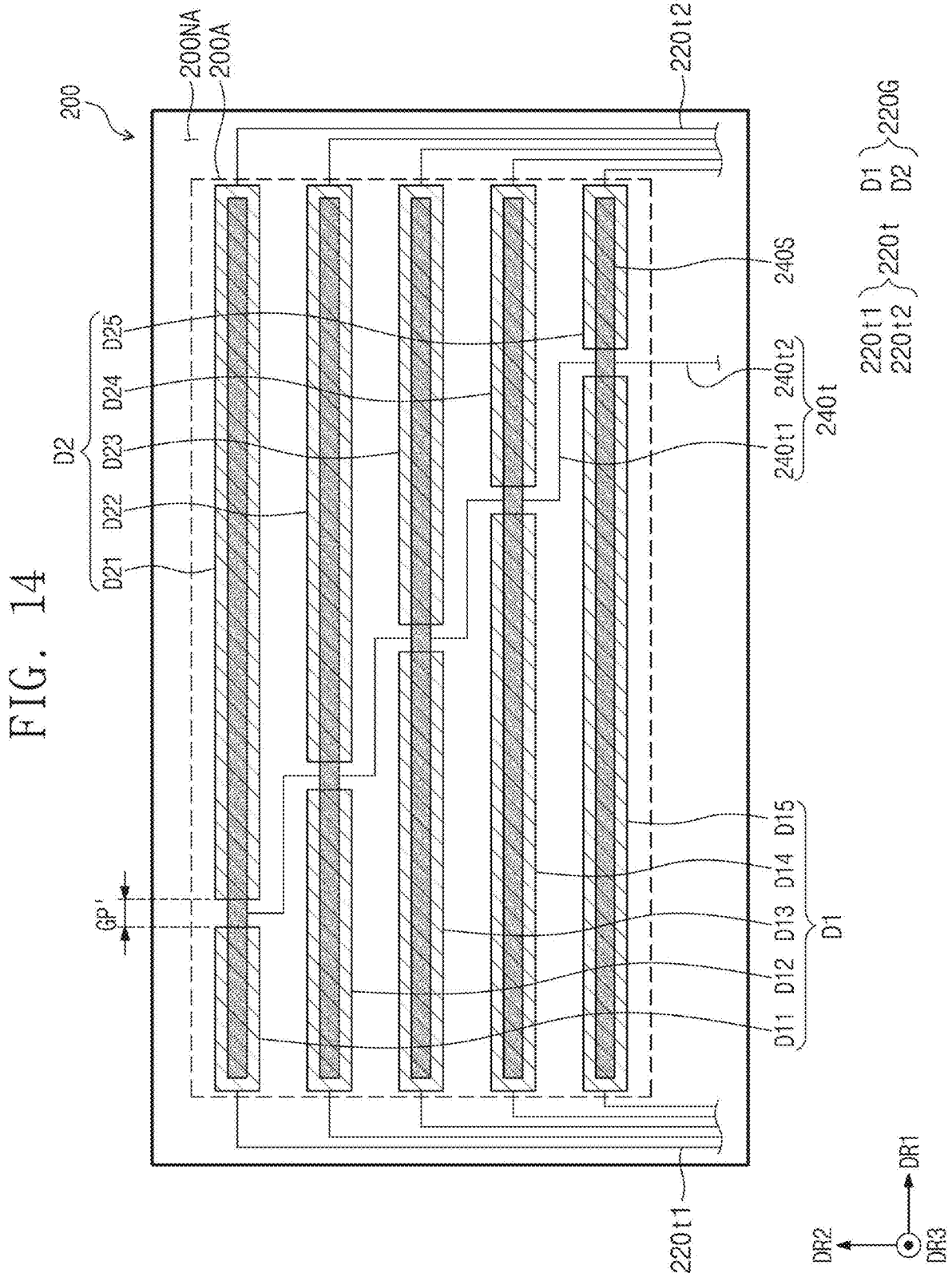

FIG. 14 is a view illustrating some electrode groups inside the sensor layer according to an embodiment of the present disclosure.

Figure 15:
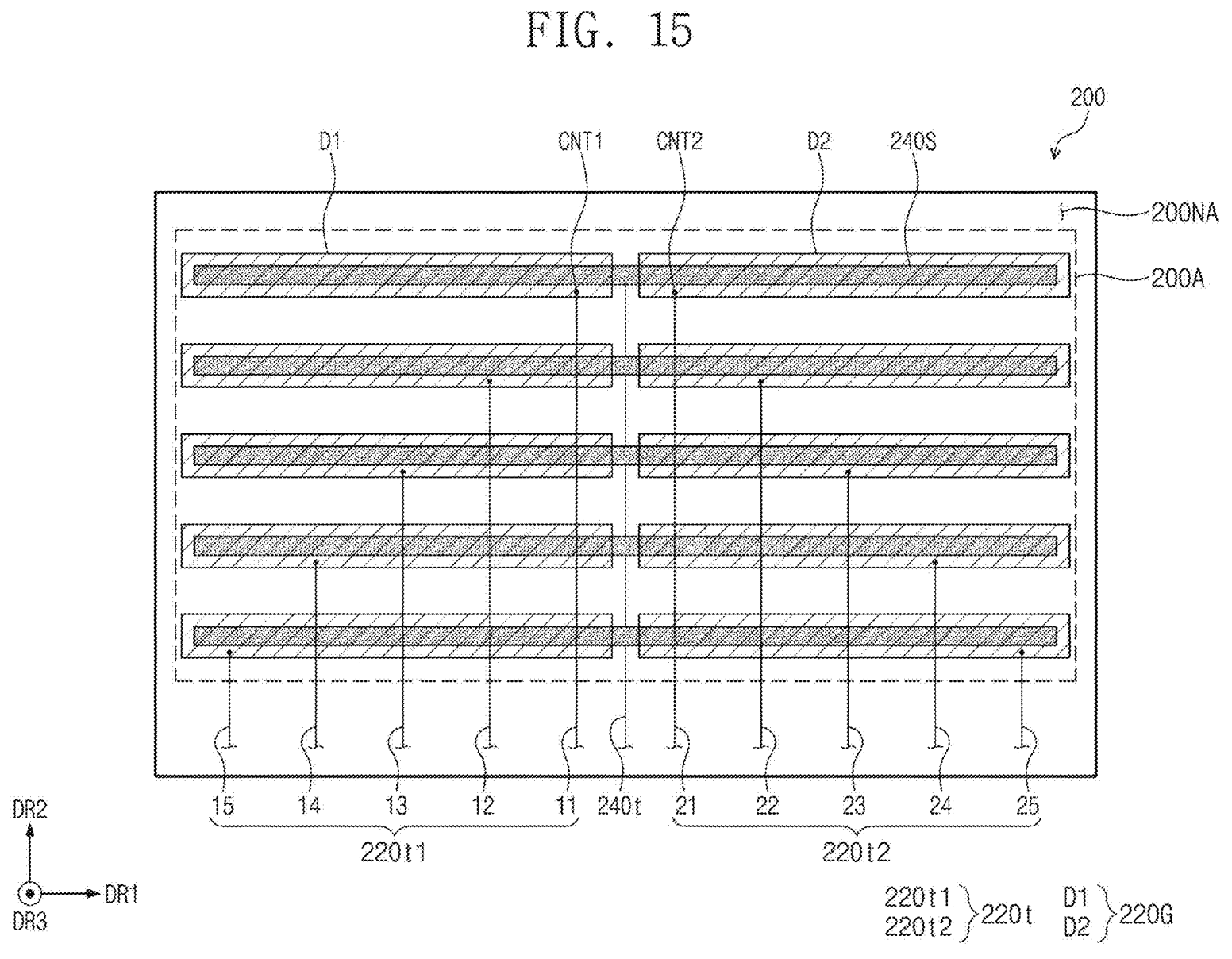

FIG. 15 is a view illustrating some electrode groups inside the sensor layer according to an embodiment of the present disclosure.

Figure 16:
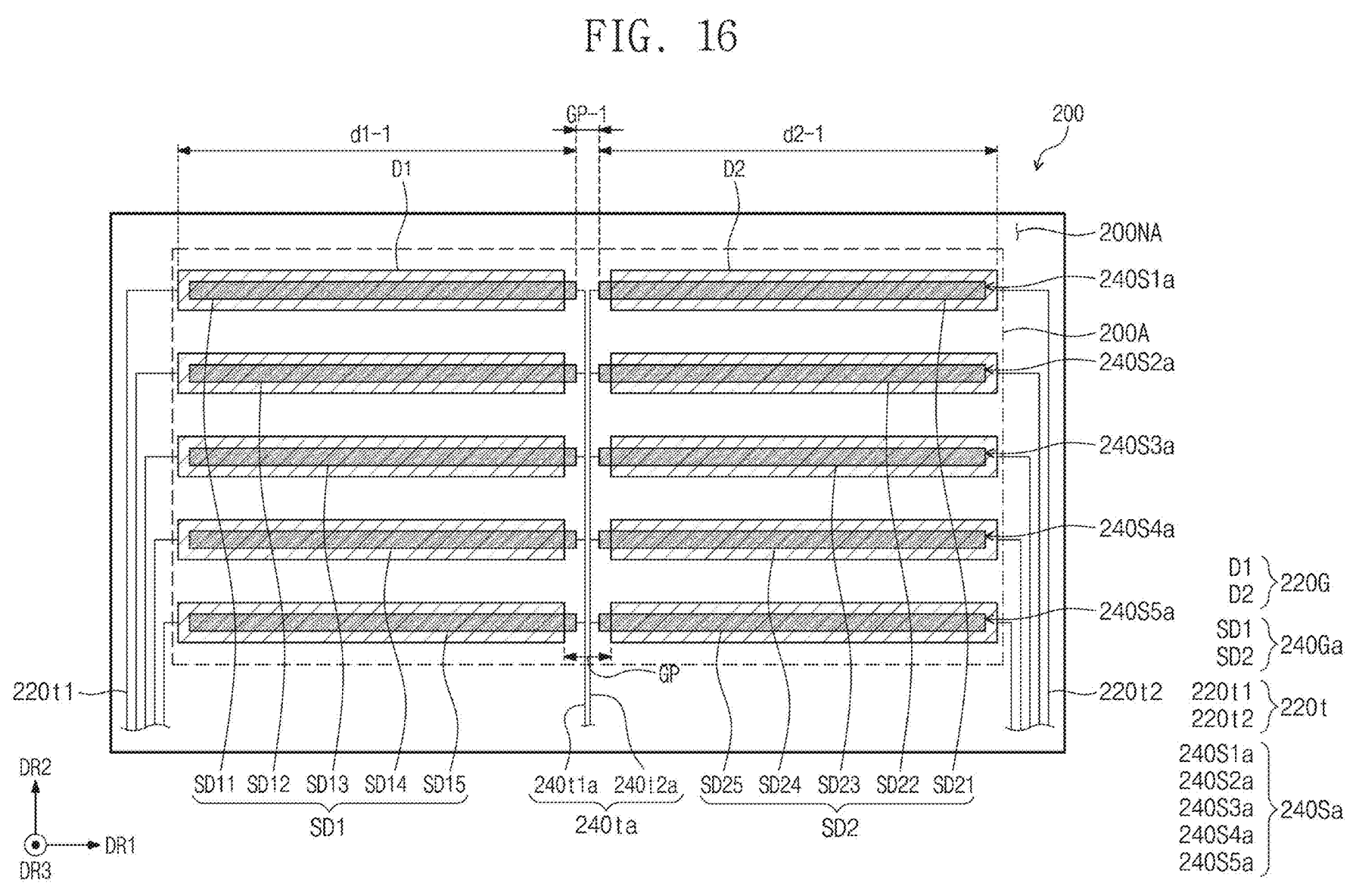

FIG. 16 is a view illustrating some electrode groups inside the sensor layer according to an embodiment of the present disclosure.

Figure 17:
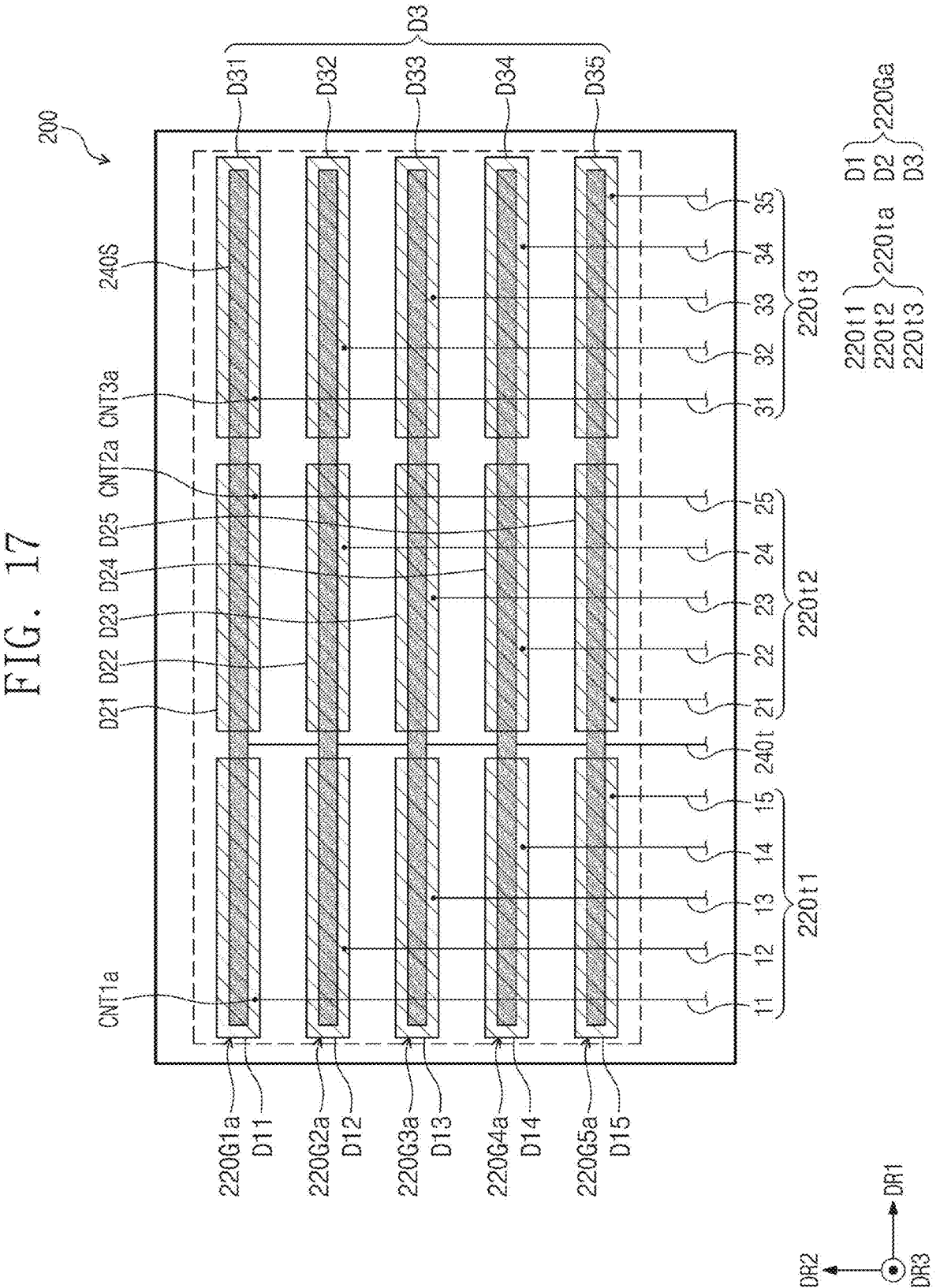

FIG. 17 is a view illustrating some electrode groups inside the sensor layer according to an embodiment of the present disclosure.

Figure 18:
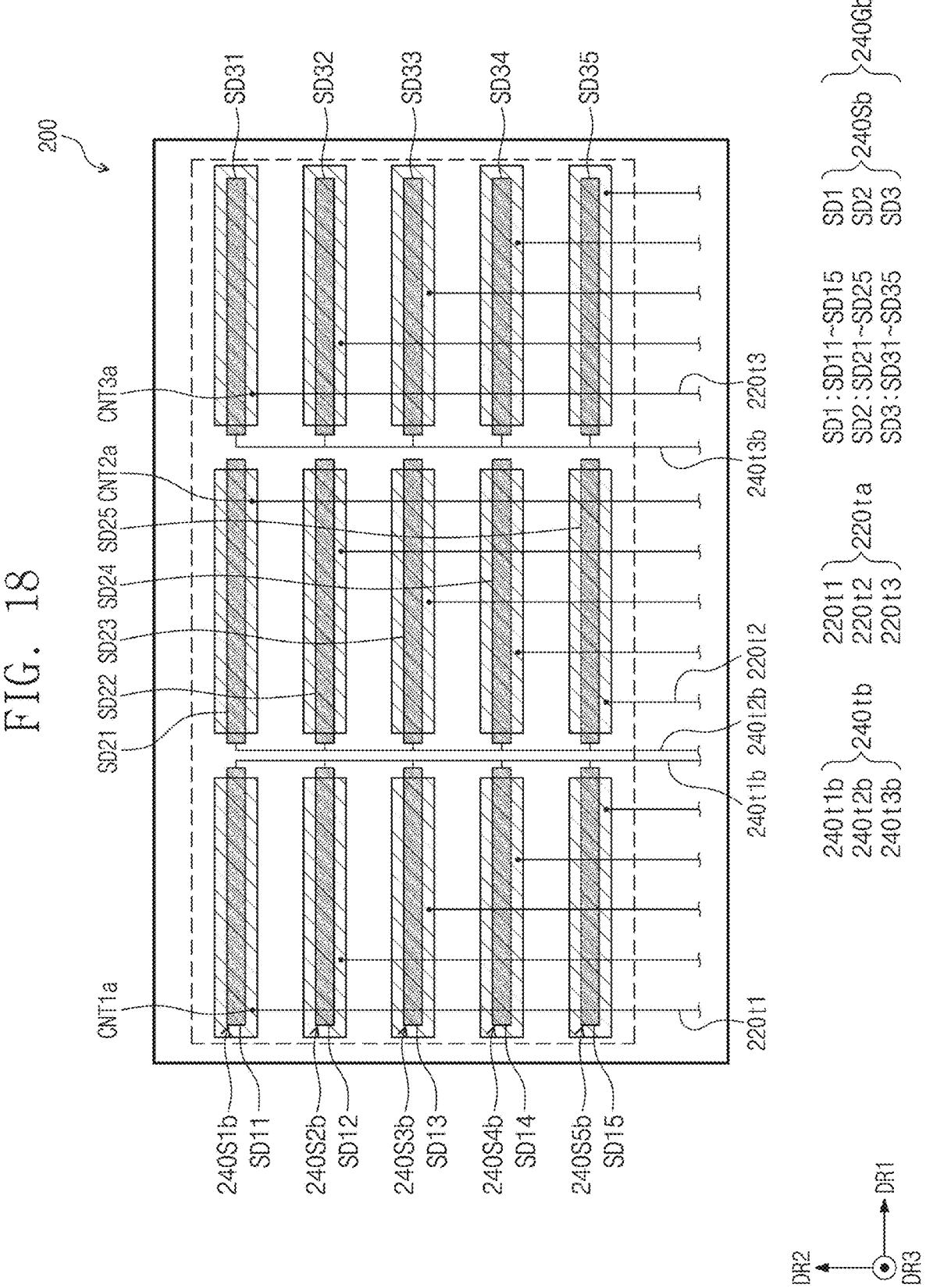

FIG. 18 is a view illustrating some electrode groups inside the sensor layer according to an embodiment of the present disclosure.

Figure 19:
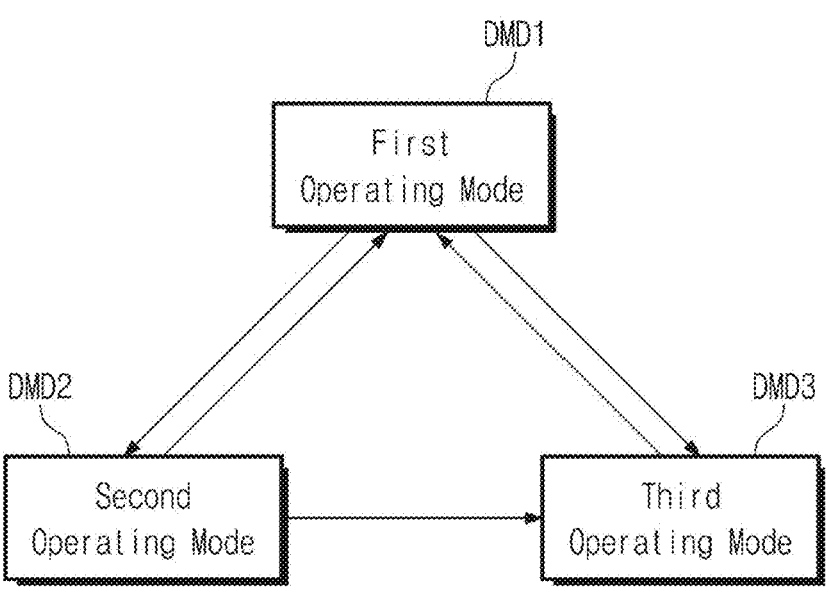

FIG. 19 is a view illustrating an operation of a sensor driving unit according to an embodiment of the present disclosure.

Figure 20:
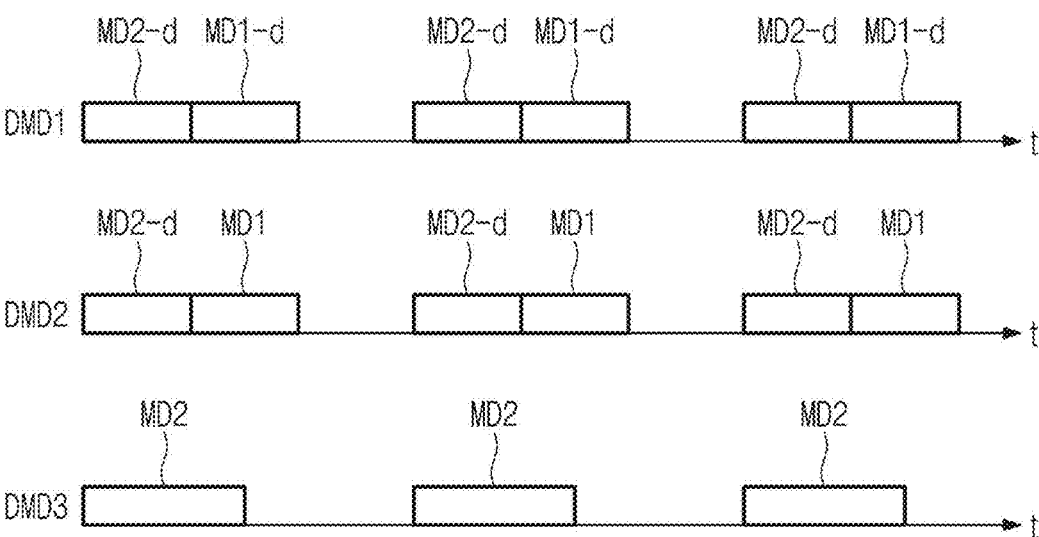

FIG. 20 is a view illustrating an operation of the sensor driving unit according to an embodiment of the present disclosure.

Figure 21:
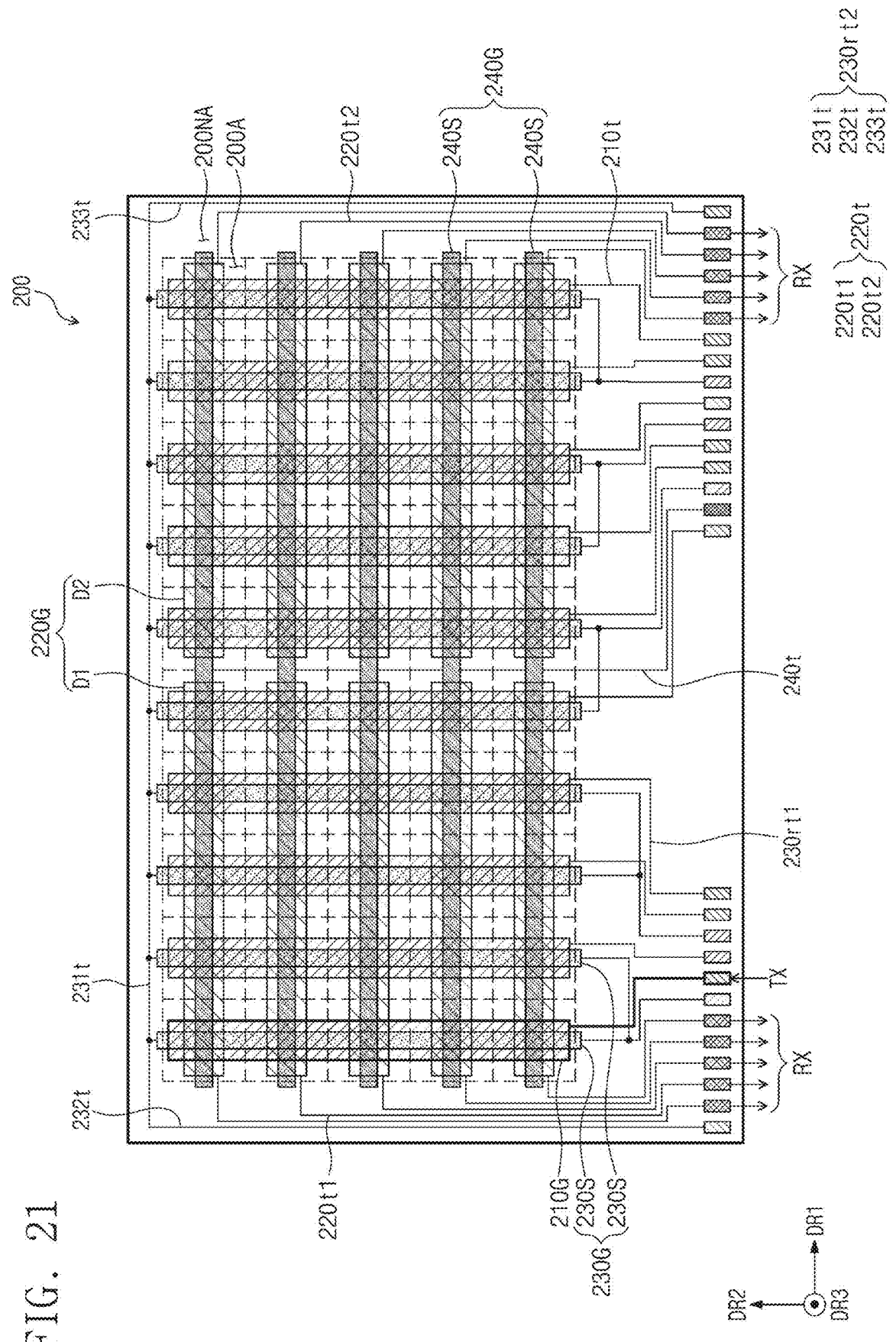

FIG. 21 is a view illustrating a first mode according to an embodiment of the present disclosure.

Figure 22:
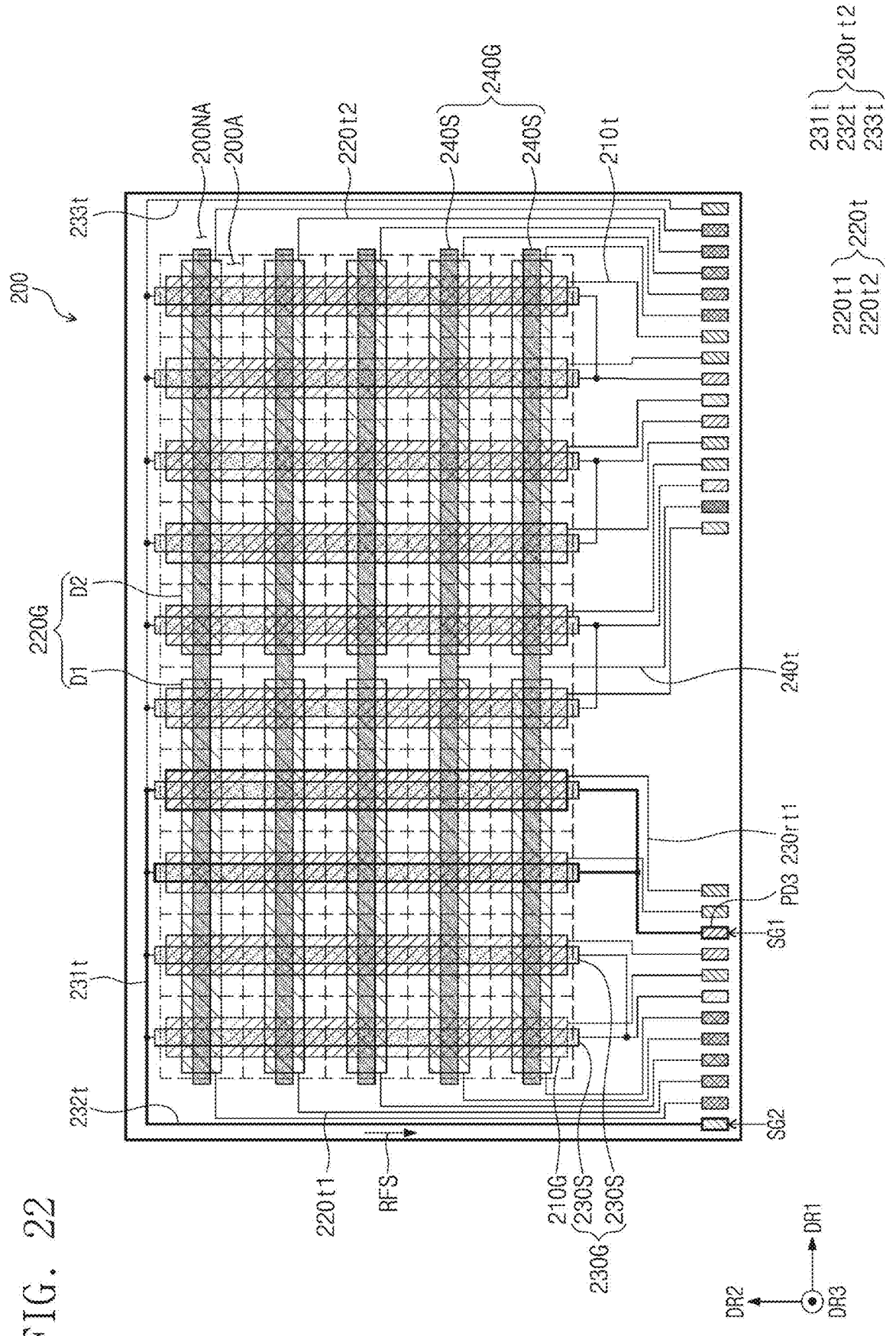

FIG. 22 is a view illustrating a second mode according to an embodiment of the present disclosure.

Figure 23A:
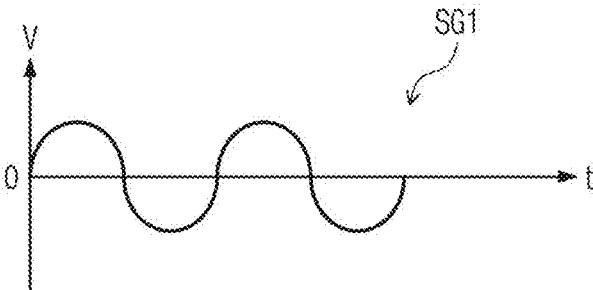

FIG. 23A is a graph illustrating a waveform of a first signal according to an embodiment of the present disclosure.

Figure 23B:
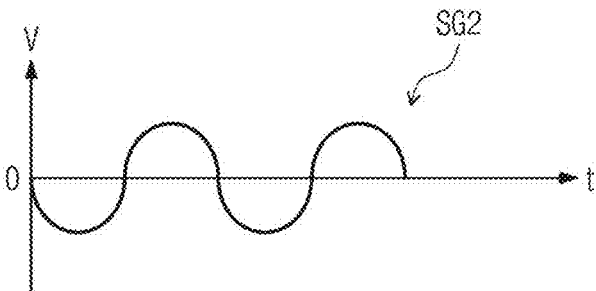

FIG. 23B is a graph illustrating a waveform of a second signal according to an embodiment of the present disclosure.

Figure 24A:
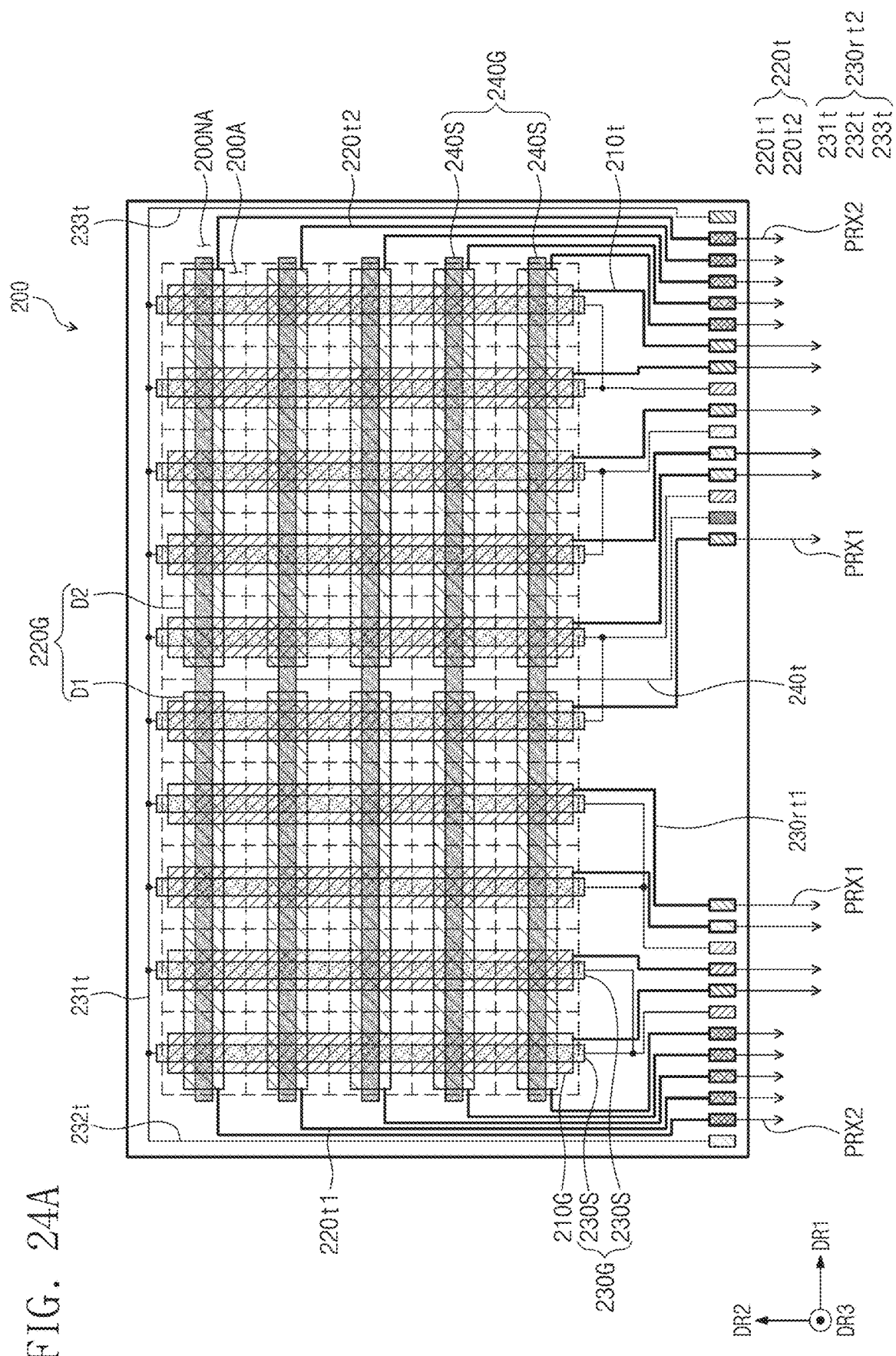

FIG. 24A is a view illustrating the second mode according to an embodiment of the present disclosure.

Figure 24B:
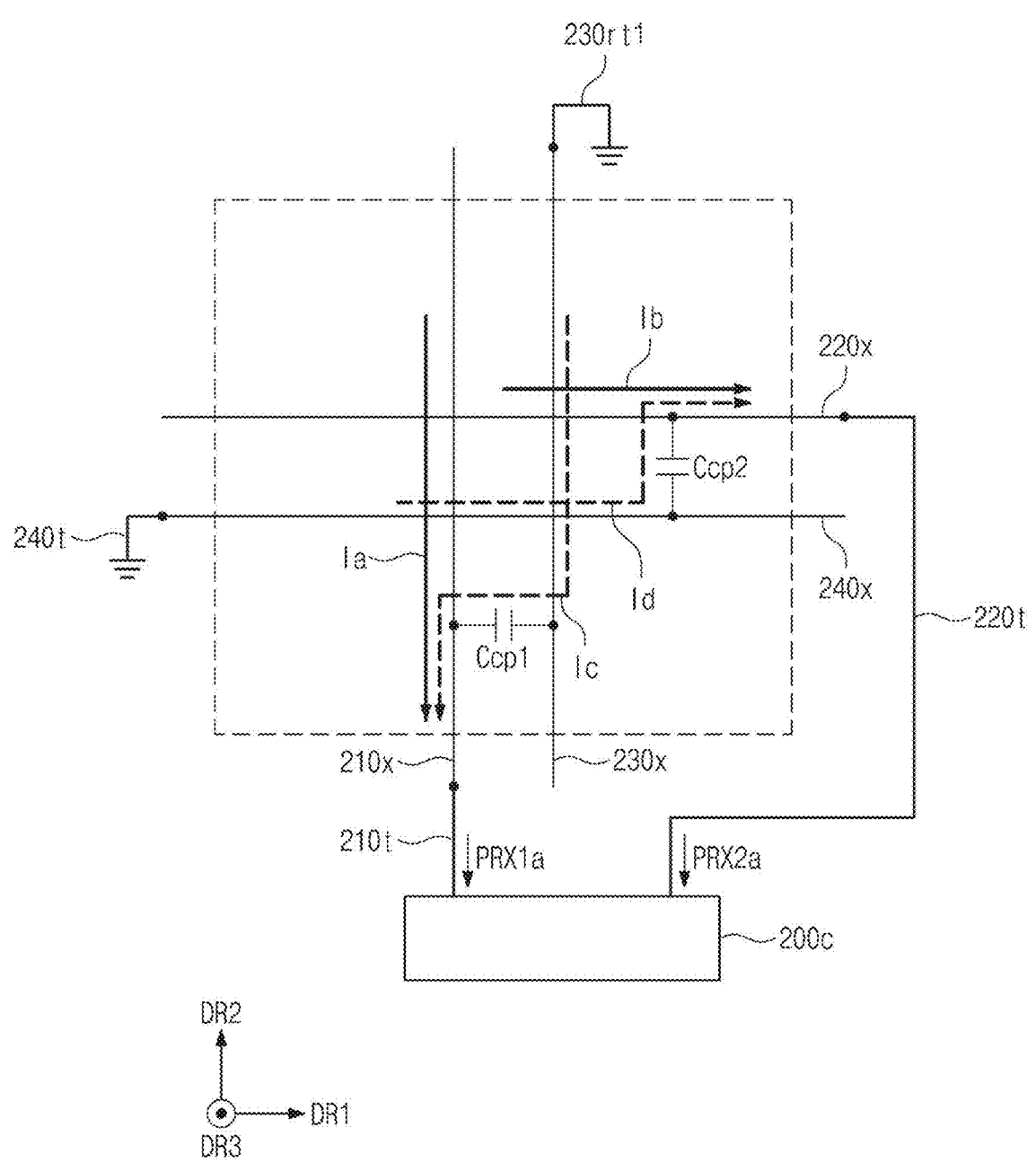

FIG. 24B is a view illustrating the second mode according to an embodiment of the present disclosure.

Figure 25A:
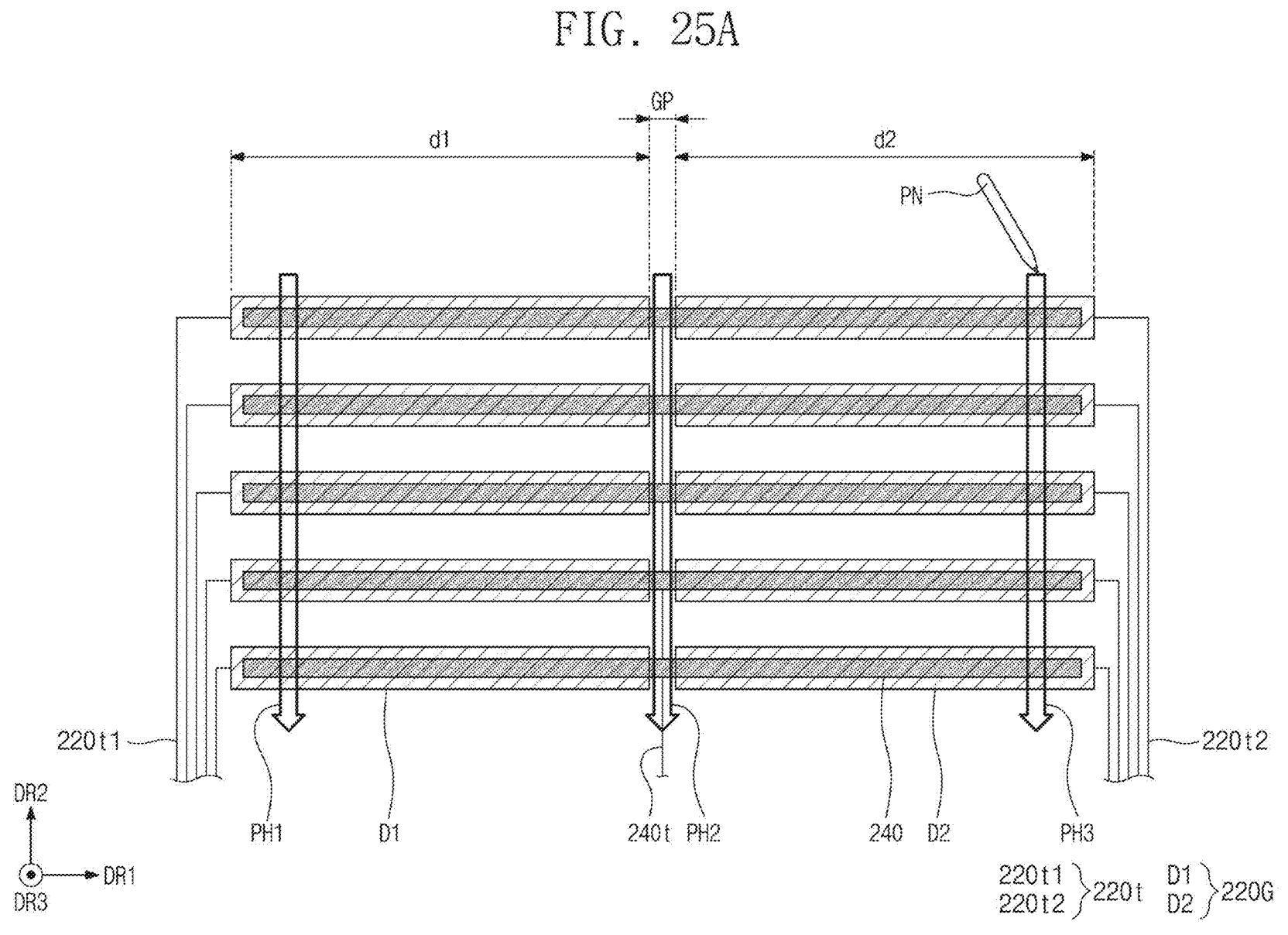

FIG. 25A is a view illustrating a method of detecting input coordinates of a pen in the sensor layer according to an embodiment of the present disclosure.

Figure 25B:
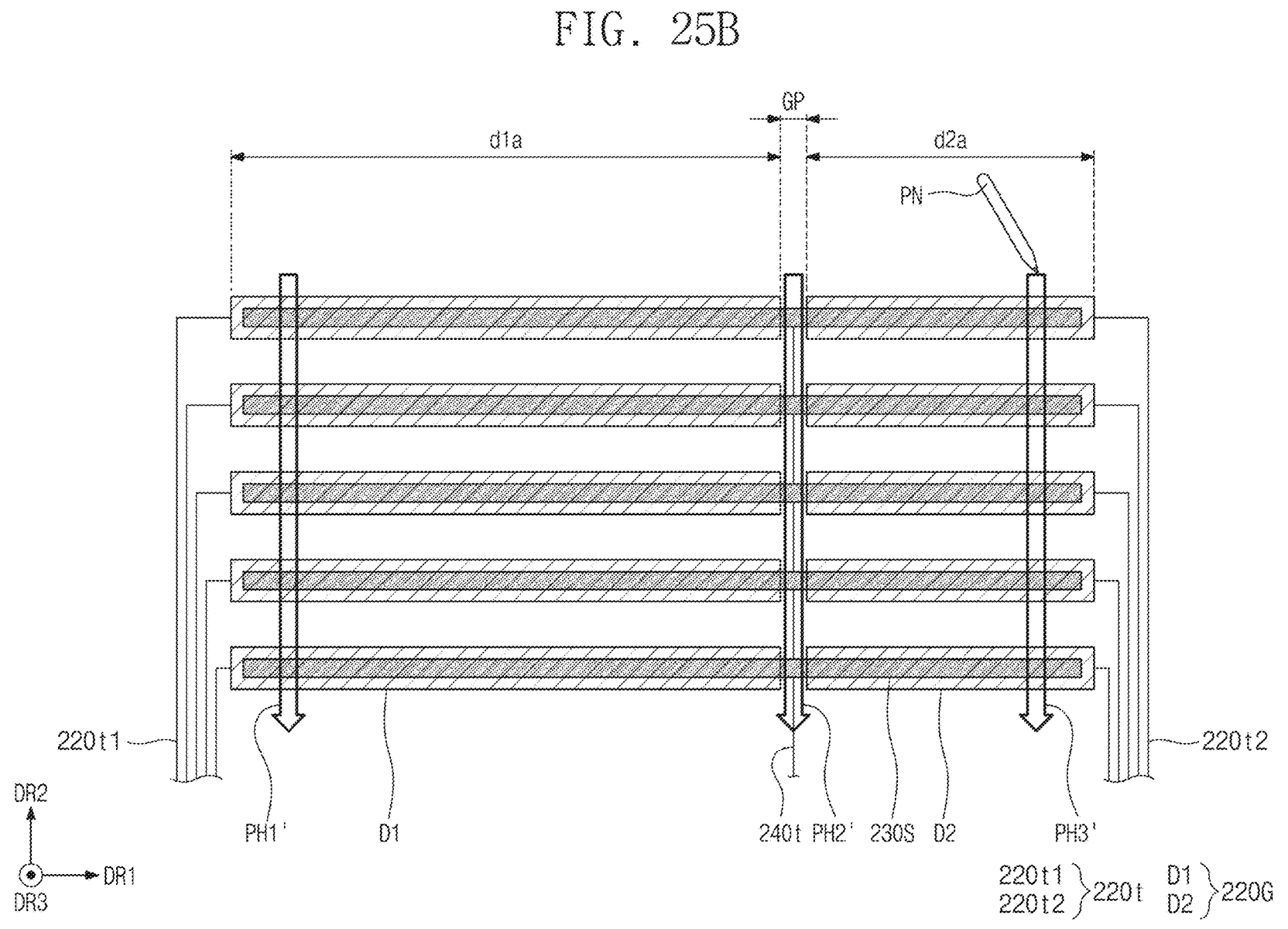

FIG. 25B is a view illustrating a method of detecting input coordinates of a pen in the sensor layer according to an embodiment of the present disclosure.

DETAILED DESCRIPTION

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

Terms such as "part" and "unit" may refer to a software component or a hardware component that performs a specific function. The hardware component may include, for example, a field-programmable gate array (FPGA) or an application-specific integrated circuit (ASIC). The software component may refer to executable code and/or data used by the executable code in an addressable storage medium. Thus, the software components may be, for example, object-oriented software components, class components, and task components, and may include processes, functions, attributes, procedures, subroutines, program code segments, drivers, firmware, microcode, circuits, data, databases, data structures, tables, arrays, and/or variables.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1A:
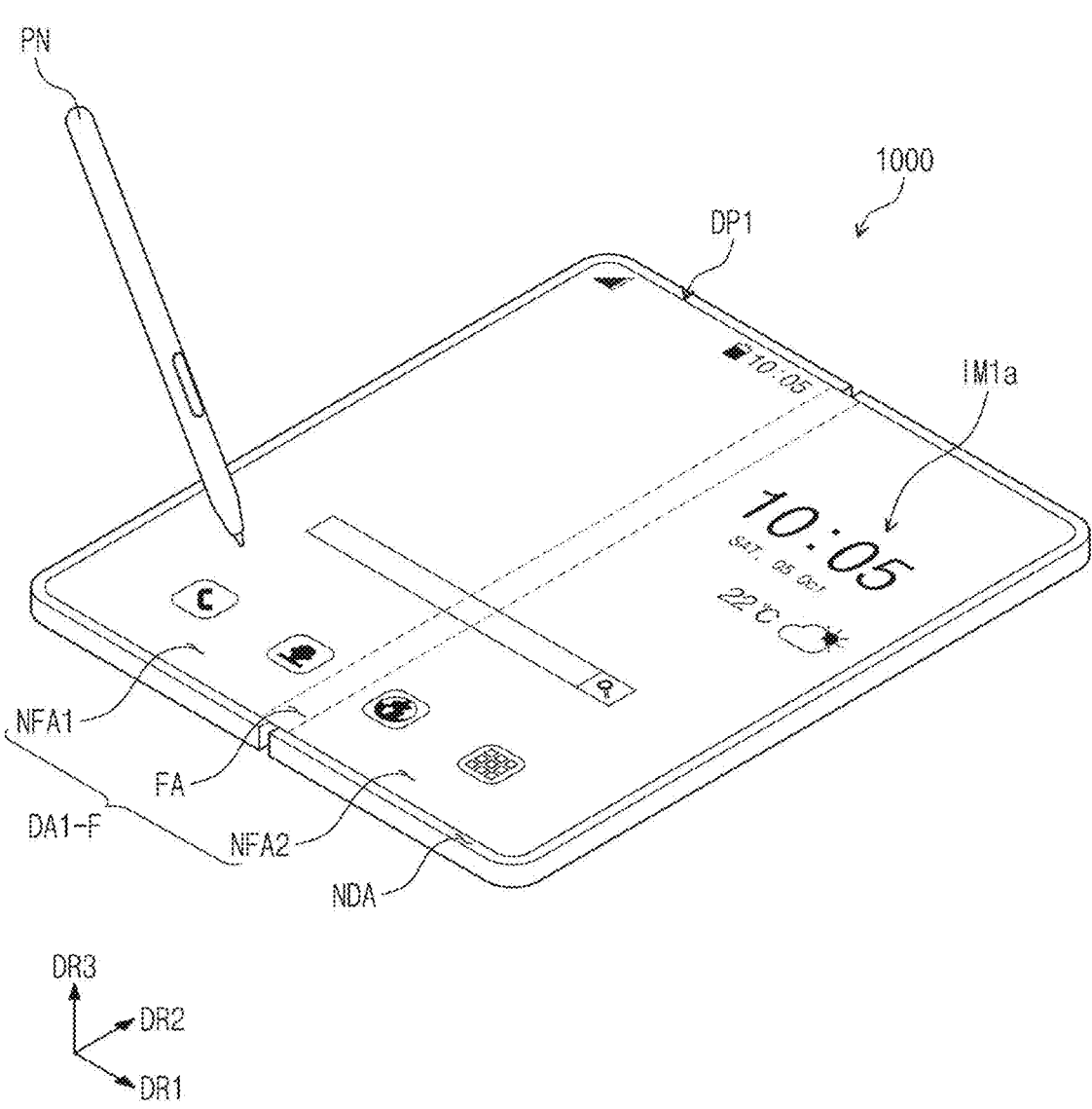
FIG. 1A is a perspective view of an electronic device according to an embodiment of the present disclosure.
Figure 1B:
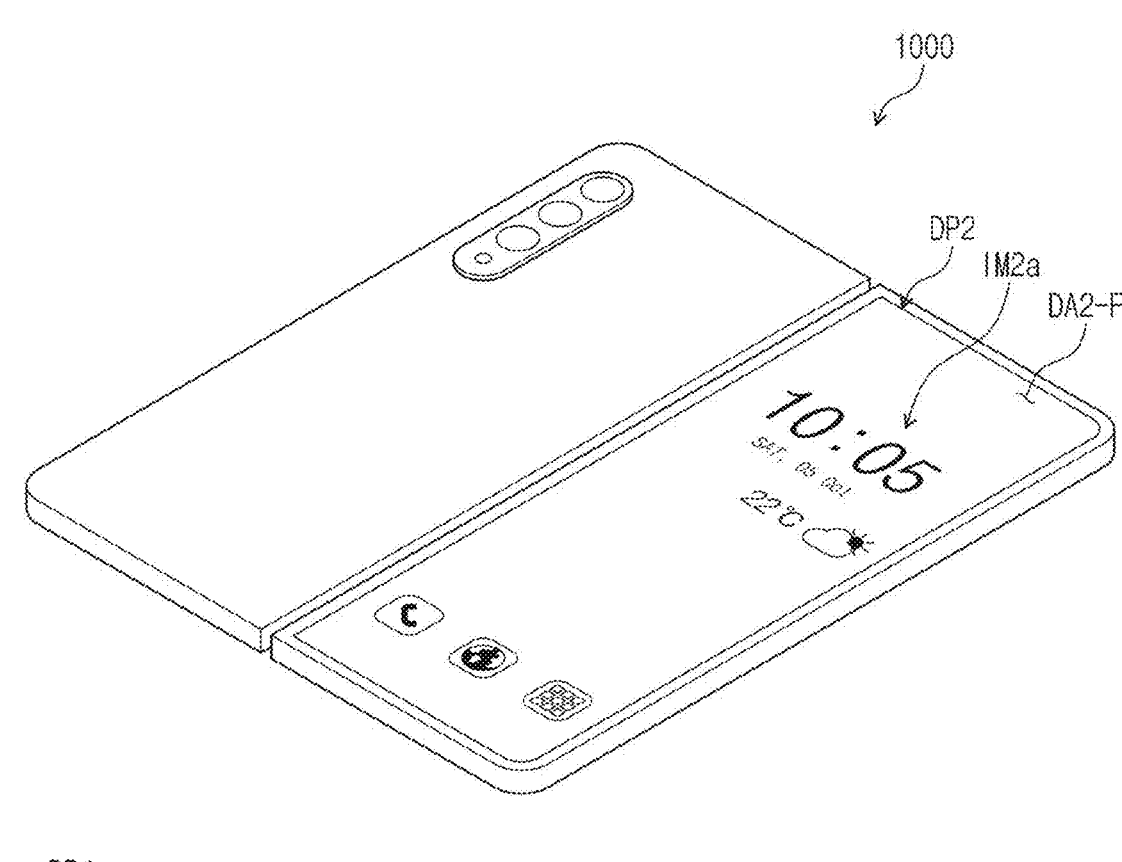
FIG. 1B is a rear perspective view of the electronic device according to an embodiment of the present disclosure.
Figure 1B:
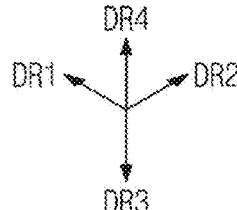

FIG. 1A is a perspective view of an electronic device 1000 according to an embodiment of the present disclosure. FIG. 1B is a rear perspective view of the electronic device 1000 according to an embodiment of the present disclosure.

Referring to FIGS. 1A and 1B, the electronic device 1000 may be a device that is activated according to an electrical signal. For example, the electronic device 1000 may display an image, and may sense inputs applied from the outside. The external input may be an input of the user. The input of the user may include various suitable kinds of external inputs, such as a portion of a body (e.g., a human body) of the user, a pen PN, light, heat, or a pressure.

The electronic device 1000 may include a first display panel DP1 and a second display panel DP2. The first display panel DP1 and the second display panel DP2 may be separate panels that are spaced apart (e.g., separated) from each other. The first display panel DP1 may be referred to as a main display panel, and the second display panel DP2 may be referred to as an auxiliary display panel or an external display panel.

The first display panel DP1 may include a first display unit (e.g., a first display or a first touch-display) DA1-F, and the second display panel DP2 may include a second display unit (e.g., a second display or a second touch-display) DA2-F. An area of the second display panel DP2 may be smaller than an area of the first display panel DP1. For example, an area of the first display unit DA1-F may be larger than an area of the second display unit DA2-F, corresponding to (e.g., depending on) the sizes of the first display panel DP1 and the second display panel DP2.

In a state in which the electronic device 1000 is unfolded, the first display unit DA1-F may have a plane that is parallel to or substantially parallel to a first direction DR1 and a second direction DR2. A thickness direction of the electronic device 1000 may be parallel to or substantially parallel to a third direction DR3 crossing or intersecting the first direction DR1 and the second direction DR2. Thus, front surfaces (e.g., upper surfaces) and rear surfaces (e.g., lower surfaces) of the members constituting the electronic device 1000 may be defined based on the third direction DR3.

The first display panel DP1 or the first display unit DA1-F may include a folding area FA that is capable of being folded or unfolded, and a plurality of non-folding areas NFA1 and NFA2 spaced apart from each other with the folding area FA interposed therebetween. The second display panel DP2 may overlap with one of the plurality of non-folding areas NFA1 and NFA2. For example, the second display panel DP2 may overlap with the first non-folding area NFA1.

A display direction of a first image IM1a displayed on a portion of the first display panel DP1, for example, such as on the first non-folding area NFA1, may be opposite to a display direction of a second image IM2a displayed on the second display panel DP2. For example, the first image IM1a may be displayed in the third direction DR3, and the second image IM2a may be displayed in a fourth direction DR4 that is opposite to the third direction DR3.

In an embodiment of the present disclosure, the folding area FA may be bent with respect to a folding axis extending in a direction parallel to or substantially parallel to long sides of the electronic device 1000, for example, such as a direction parallel to or substantially parallel to the second direction DR2. In a state in which the electronic device 1000 is folded, the folding area FA may have a curvature (e.g., a predetermined curvature) and a radius of curvature (e.g., a predetermined radius of curvature). The first non-folding area NFA1 and the second non-folding area NFA2 may face each other, and the electronic device 1000 may be inner-folded so that the first display unit DA1-F is not exposed to the outside.

In an embodiment of the present disclosure, the electronic device 1000 may be outer-folded, so that the first display unit DA1-F is exposed to the outside. In an embodiment of the present disclosure, the electronic device 1000 may be both inner-folded or outer-folded from an unfolded state, but the present disclosure is not limited thereto.

FIG. 1A illustratively shows one folding area FA defined (e.g., provided or included) in the electronic device 1000, but the present disclosure is not limited thereto. For example, a plurality of folding axes, and a plurality of folding areas corresponding thereto, may be defined in an electronic device, and the electronic device may be inner-folded or outer-folded from an unfolded state in each of the plurality of folding areas.

According to an embodiment of the present disclosure, even when at least one of the first display panel DP1 or the second display panel DP2 does not include a digitizer, the at least one of the first display panel DP1 or the second display panel DP2 may sense an input by the pen PN. Thus, because the digitizer for sensing the pen PN may be omitted, an increase in a thickness, an increase in a weight, and a decrease in a flexibility of the electronic device 1000 that may be caused by the addition of the digitizer may not occur. Thus, the second display panel DP2 as well as the first display panel DP1 may be designed to sense the pen PN.

Figure 2:
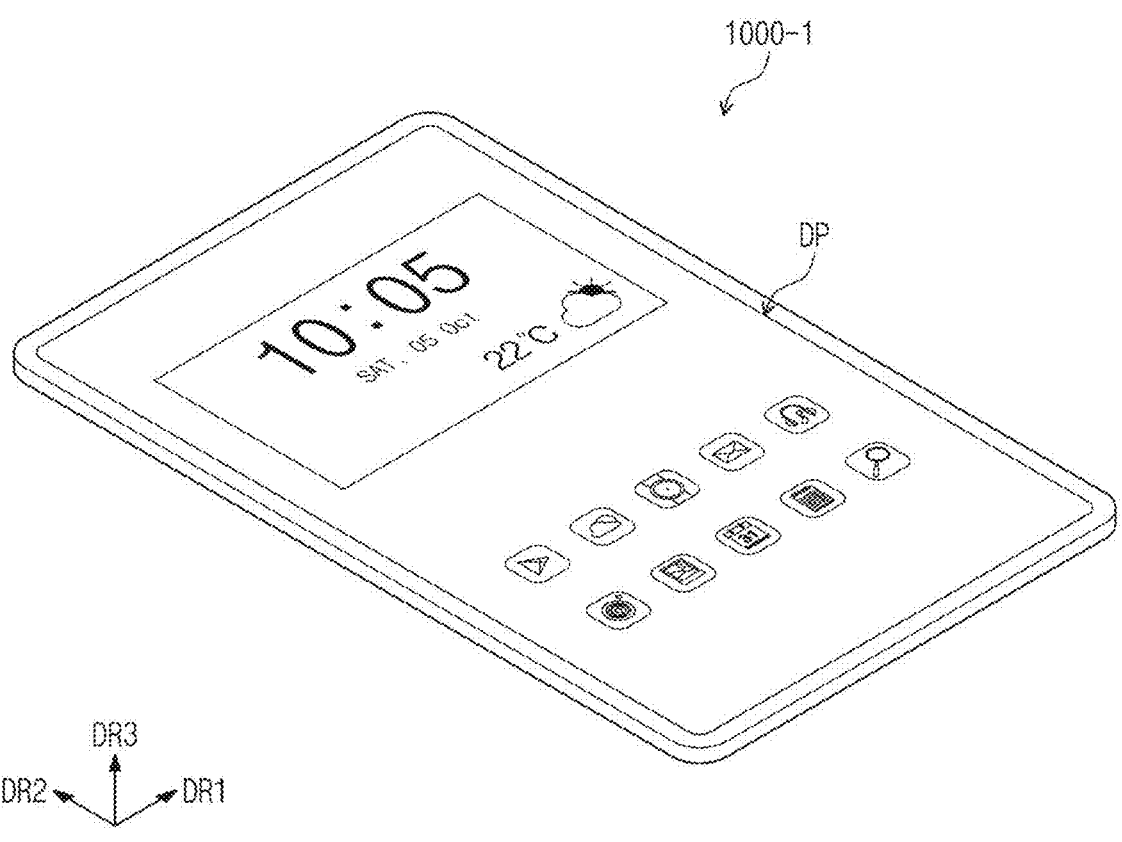
FIG. 2 is a perspective view of an electronic device according to an embodiment of the present disclosure.
Figure 3:
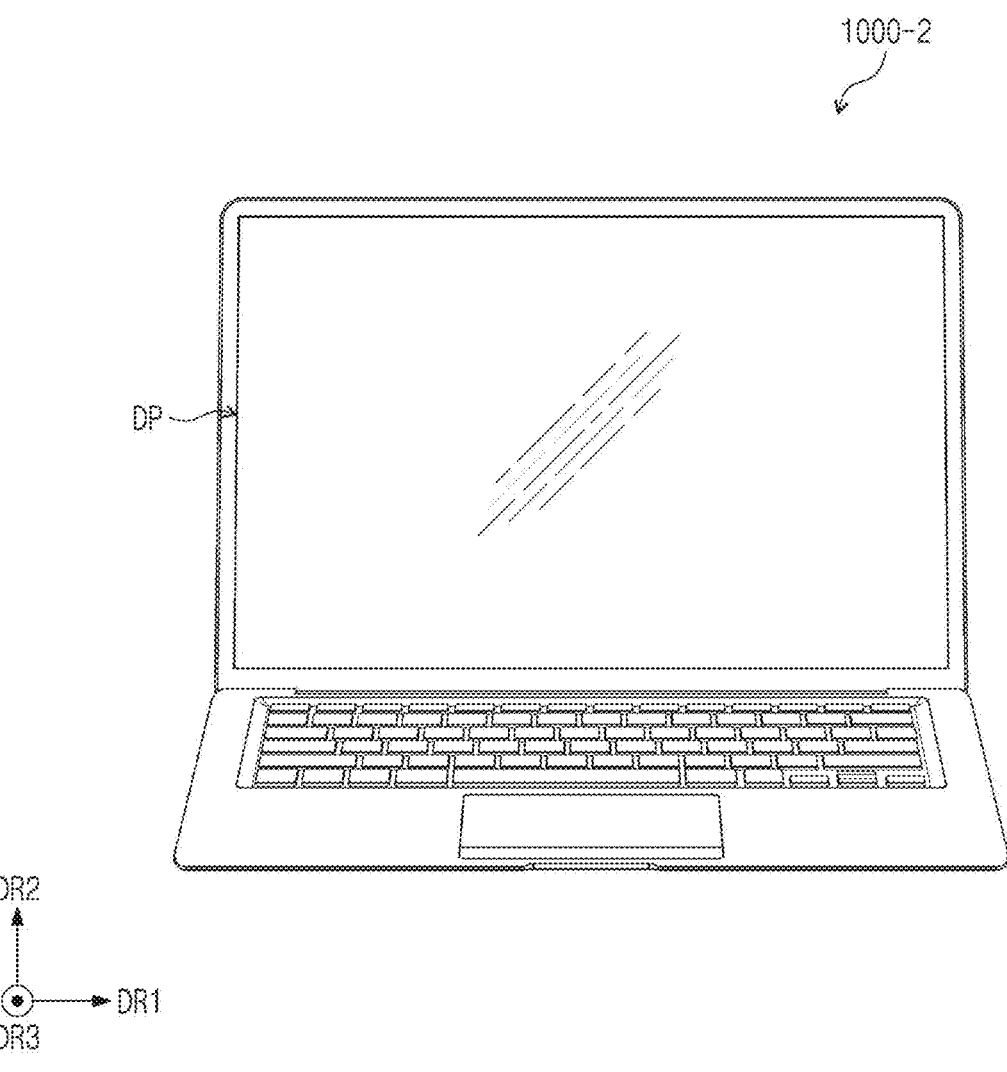
FIG. 3 is a perspective view of an electronic device according to an embodiment of the present disclosure.

FIG. 2 is a perspective view of an electronic device 1000-1 according to an embodiment of the present disclosure. FIG. 3 is a perspective view of an electronic device 1000-2 according to an embodiment of the present disclosure.

FIG. 2 illustratively shows that the electronic device 1000-1 is a mobile phone, and the electronic device 1000-1 may include a display panel DP. FIG. 3 illustratively shows that the electronic device 1000-2 is a laptop, and the electronic device 1000-2 may include the display panel DP.

In an embodiment of the present disclosure, the display panel DP may sense inputs (e.g., external inputs) applied from the outside. The external input may be an input of the user. The input of the user may include various suitable kinds of external inputs, such as the portion of the body of the user, the pen PN (e.g., see FIG. 1A), light, heat, or a pressure.

According to an embodiment of the present disclosure, the display panel DP may sense an input by the pen PN even when the display panel DP does not include a digitizer. Thus, because the digitizer for sensing the pen PN may be omitted, an increase in the thickness and an increase in the weight of the electronic device 1000-1 or 1000-2 that may be caused by the addition of the digitizer may not occur.

FIG. 1A illustratively shows a foldable-kind of electronic device 1000, and FIG. 2 illustratively shows a bar-kind of electronic device 1000-1, but the present disclosure is not limited thereto. For example, the electronic device according to some embodiments of the present disclosure may include a rollable-kind of electronic device, a slidable-kind of electronic device, a stretchable-kind of electronic device, and the like.

Figure 4:
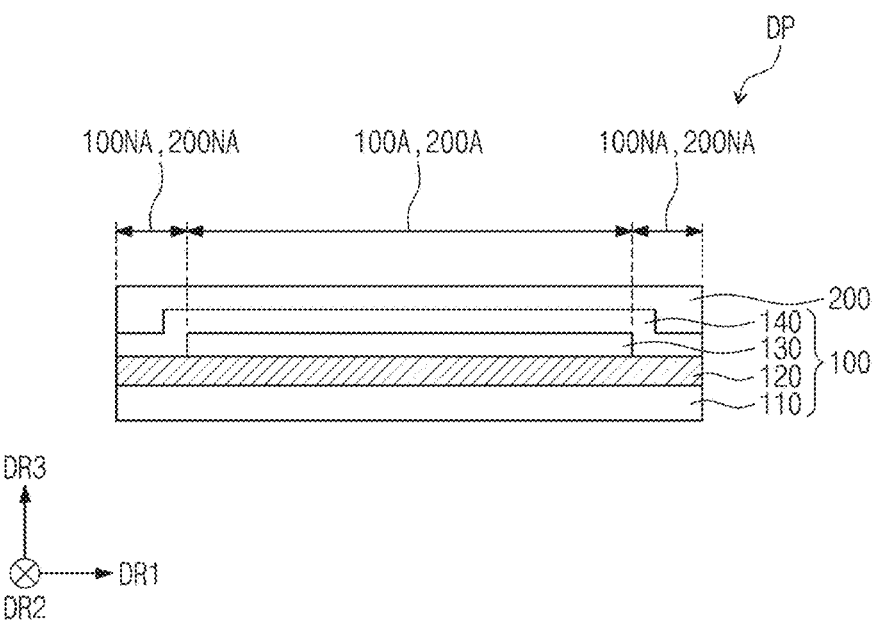
FIG. 4 is a schematic cross-sectional view of a display panel according to an embodiment of the present disclosure.

FIG. 4 is a schematic cross-sectional view of the display panel DP according to an embodiment of the present disclosure.

Referring to FIG. 4, the display panel DP may include a display layer 100 and a sensor layer 200.

The display layer 100 may be a component that generates or substantially generates an image. The display layer 100 may be a light emitting display layer. For example, the display layer 100 may be an organic light emitting display layer, an inorganic light emitting display layer, an organic-inorganic light emitting display layer, a quantum dot display layer, a micro-light emitting diode (LED) display layer, or a nano-LED display layer. The display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may have a multi-layered structure or a single-layer structure. The base layer 110 may be a glass substrate, a metal substrate, a silicon substrate, a polymer substrate, or the like, but the present disclosure is not limited thereto.

The circuit layer 120 may be disposed on the base layer 110. The circuit layer 120 may include an insulating layer, a semiconductor pattern, a conductive pattern, a signal line, and the like. The insulating layer, a semiconductor layer, and a conductive layer may be formed on the base layer 110 in a suitable manner, such as coating and deposition, and the insulating layer, the semiconductor layer, and the conductive layer may be selectively patterned through a plurality of photolithography processes.

The light emitting element layer 130 may be disposed on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from moisture, oxygen, and foreign substances, such as dust particles.

The sensor layer 200 may be disposed on the display layer 100. The sensor layer 200 may sense an external input applied from an external unit (e.g., an external device). The sensor layer 200 may be an integrated sensor formed continuously during a process of manufacturing the display layer 100, or the sensor layer 200 may be an external sensor attached to the display layer 100. The sensor layer 200 may be referred to as a sensor, an input sensing layer, an input sensing panel, an electronic device for sensing input coordinates, or the like.

According to an embodiment of the present disclosure, the sensor layer 200 may sense both an input from a passive input means, such as the body (e.g., the human body) of the user, and an input from an input device that generates a magnetic field having a suitable resonant frequency (e.g., a predetermined resonant frequency). The input device may be referred to as a pen, an input pen, a magnetic pen, a stylus pen, or an electromagnetic resonance pen.

Figure 5:
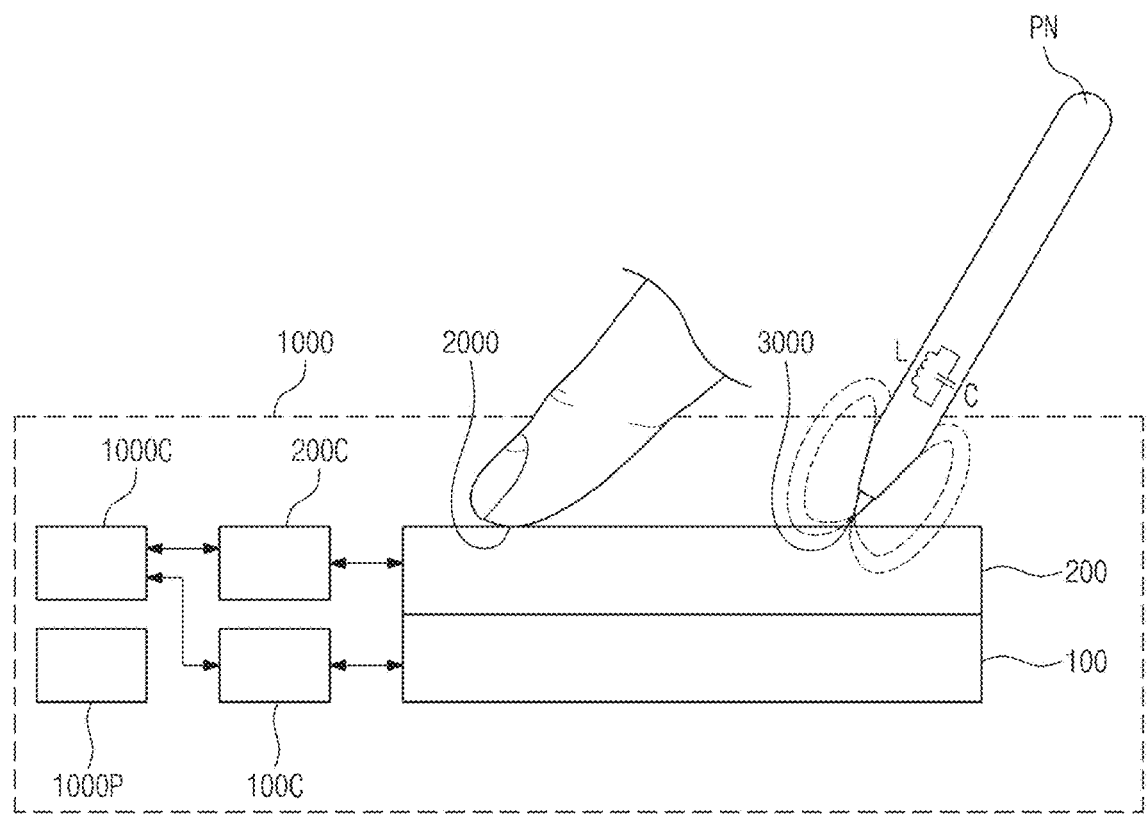
FIG. 5 is a view illustrating an operation of the electronic device according to an embodiment of the present disclosure.

FIG. 5 is a view illustrating an operation of the electronic device 1000 according to an embodiment of the present disclosure.

Referring to FIG. 5, the electronic device 1000 may include the display layer 100, the sensor layer 200, a display driving unit (e.g., a display driving circuit or a display driver) 100C, a sensor driving unit (e.g., a sensor driving circuit or a sensor driver) 200C, a main driving unit (e.g., a main driving circuit or a main driver) 1000C, and a power circuit 1000P.

The sensor layer 200 may sense a first input 2000 or a second input 3000 applied from an external unit (e.g., an external device). The first input 2000 and the second input 3000 may be an input means that may provide a change in a capacitance of the sensor layer 200, or may be an input means that may cause an induced current in the sensor layer 200. For example, the first input 2000 may be a passive input means, such as the body of the user. The second input 3000 may be an input by the pen PN, or an input by a radio frequency integrated circuit (RFIC) tag. For example, the pen PN may be a passive pen or an active pen.

In an embodiment of the present disclosure, the pen PN may be a device that generates a magnetic field having a suitable resonant frequency (e.g., a predetermined resonant frequency). The pen PN may transmit an output signal based on an electromagnetic resonance method. The pen PN may be referred to as an input device, an input pen, a magnetic pen, a stylus pen, or an electromagnetic resonance pen.

The pen PN may include an RLC resonant circuit, and the RLC resonant circuit may include an inductor "L" and a capacitor "C." In an embodiment of the present disclosure, the RLC resonant circuit may be a variable resonant circuit having a variable resonant frequency. In this case, the inductor "L" may be a variable inductor and/or the capacitor "C" may be a variable capacitor, but the present disclosure is not limited thereto.

The inductor "L" generates a current by a magnetic field formed in the electronic device 1000, for example, such as in the sensor layer 200. However, the present disclosure is not particularly limited thereto. For example, when the pen PN operates as an active kind, the pen PN may generate a current even when the pen PN does not receive a magnetic field from an external unit. The generated current may be transmitted to the capacitor "C." The capacitor "C" charges a current input from the inductor "L", and discharges the charged current to the inductor "L." Thereafter, the inductor "L" may emit a magnetic field having a resonant frequency. The induced current may flow in the sensor layer 200 by the magnetic field emitted by the pen PN, and the induced current, as a reception signal (e.g., a sensing signal), may be transmitted to the sensor driving unit 200C.

The main driving unit 1000C may control the overall operations of the electronic device 1000. For example, the main driving unit 1000C may control operations of the display driving unit 100C and the sensor driving unit 200C. The main driving unit 1000C may include at least one microprocessor, and may further include a graphic controller. The main driving unit 1000C may be referred to as an application processor, a central processing unit, or a main processor.

The display driving unit 100C may drive the display layer 100. The display driving unit 100C may receive image data and a control signal from the main driving unit 1000C. The control signal may include various suitable signals. For example, the control signal may include an input vertical synchronization signal, an input horizontal synchronization signal, a main clock, a data enable signal, and the like.

The sensor driving unit 200C may drive the sensor layer 200. The sensor driving unit 200C may receive the control signal from the main driving unit 1000C. The control signal may include a clock signal of the sensor driving unit 200C. Further, the control signal may further include a mode determining signal that determines driving modes of the sensor driving unit 200C and the sensor layer 200.

The sensor driving unit 200C may be implemented as an integrated circuit (IC), and may be electrically connected to the sensor layer 200. For example, the sensor driving unit 200C may be directly mounted on an area (e.g., a predetermined area) of the display panel, or may be mounted on a separate printed circuit board using a chip on film (COF) method and electrically connected to the sensor layer 200.

The sensor driving unit 200C and the sensor layer 200 may be selectively operated in a first mode or a second mode. For example, the first mode may be a mode for sensing a touch input, for example, such as the first input 2000. The second mode may be a mode for sensing the input by the pen PN, for example, such as the second input 3000. The first mode may be referred to as a touch sensing mode, and the second mode may be referred to as a pen sensing mode.

Switching between the first mode and the second mode may be performed in various suitable manners. For example, the sensor driving unit 200C and the sensor layer 200 may be driven in the first mode and the second mode in a time division manner, and may sense the first input 2000 and the second input 3000. As another example, the switching between the first mode and the second mode may be generated by a selection by the user or by a specific action (e.g., an input) of the user, any one of the first mode or the second mode may be activated or deactivated by activating or deactivating a specific application, or a current mode may be switched from one to the other one of the first mode and the second mode. As another example, while the sensor driving unit 200C and the sensor layer 200 are alternately operated in the first mode and the second mode, when the first input 2000 is sensed, the first mode is maintained, or when the second input 3000 is sensed, the second mode is maintained.

The sensor driving unit 200C may calculate coordinate information of the input based on a signal received from the sensor layer 200, and may provide a coordinate signal having the coordinate information to the main driving unit 1000C. The main driving unit 1000C may execute an operation corresponding to the input of the user based on the coordinate signal. For example, the main driving unit 1000C may operate the display driving unit 100C, so that a new application image is displayed on the display layer 100.

The power circuit 1000P may include a power management integrated circuit (PMIC). The power circuit 1000P may generate a plurality of driving voltages for driving the display layer 100, the sensor layer 200, the display driving unit 100C, and the sensor driving unit 200C. For example, the plurality of driving voltages may include a gate-high voltage, a gate-low voltage, a first driving voltage (e.g., an ELVSS voltage), a second driving voltage (e.g., an ELVDD voltage), an initialization voltage, or the like, but the present disclosure is not particularly limited thereto.

Figure 6A:
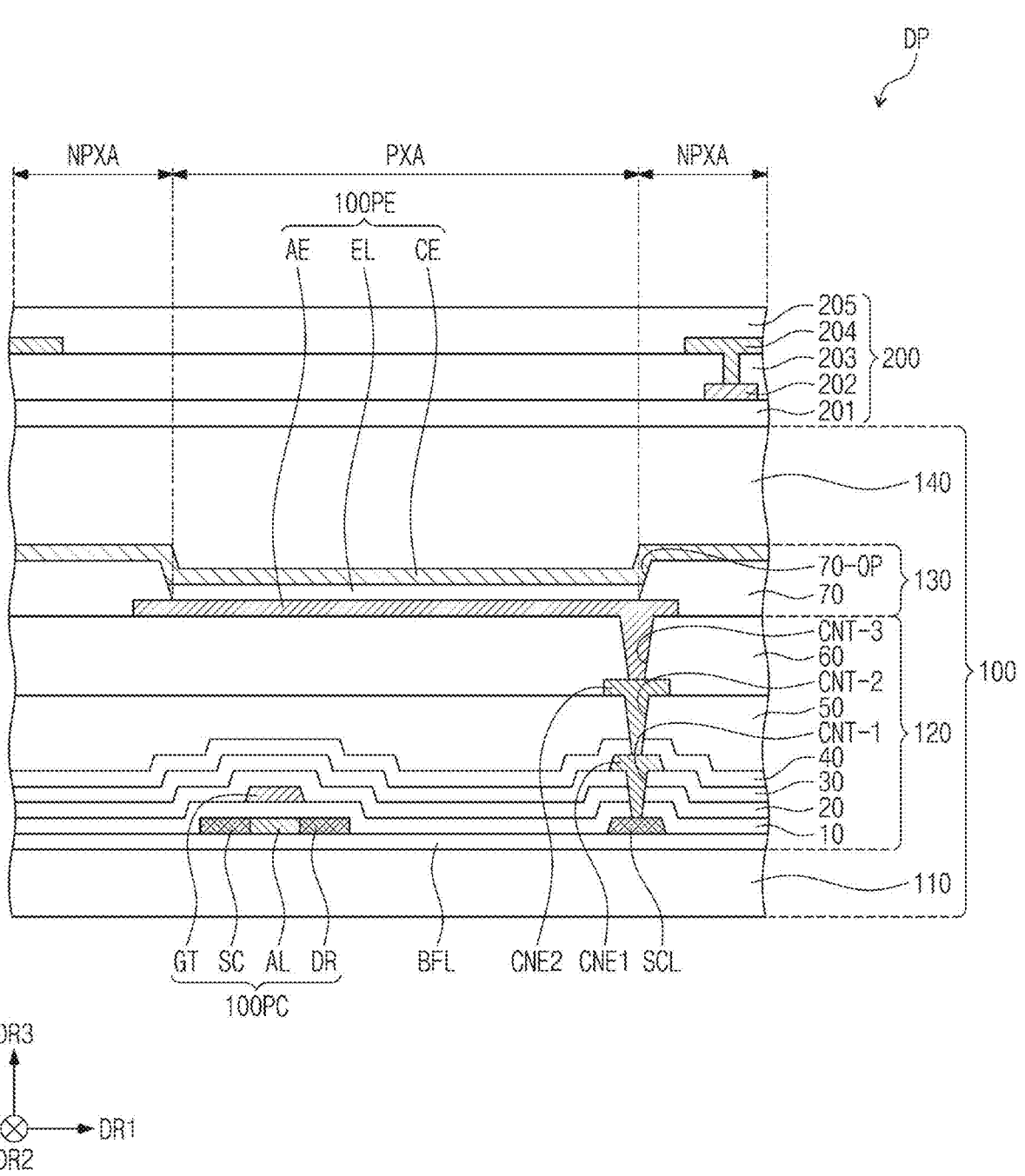
FIG. 6A is a cross-sectional view of the display panel according to an embodiment of the present disclosure.

FIG. 6A is a cross-sectional view of the display panel DP according to an embodiment of the present disclosure.

Referring to FIG. 6A, at least one buffer layer BFL may be formed on an upper surface of the base layer 110. The buffer layer BFL may improve a bonding force between the base layer 110 and the semiconductor pattern. The buffer layer BFL may be formed in multiple layers. As another example, the display layer 100 may further include a barrier layer. The buffer layer BFL may include at least one of a silicon oxide, a silicon nitride, or a silicon oxy nitride. For example, the buffer layer BFL may include a structure in which silicon oxide layers and silicon nitride layers are alternately stacked or laminated.

Semiconductor patterns SC, AL, DR, and SCL may be arranged on the buffer layer BFL. The semiconductor patterns SC, AL, DR, and SCL may include polysilicon. However, the present disclosure is not limited thereto, and the semiconductor patterns SC, AL, DR, and SCL may include an amorphous silicon, a low-temperature polycrystalline silicon, or an oxide semiconductor.

FIG. 6A illustrates some of the semiconductor patterns SC, AL, DR, and SCL, and the semiconductor pattern may be further arranged in other areas. The semiconductor patterns SC, AL, DR, and SCL may be arranged in a suitable rule (e.g., a specific rule) across pixels. The semiconductor patterns SC, AL, DR, and SCL may have different electrical properties depending on whether or not the semiconductor patterns SC, AL, DR, and SCL are doped. The semiconductor patterns SC, AL, DR, and SCL may include first areas SC, DR, and SCL having a high conductivity, and a second area AL having a low conductivity. The first areas SC, DR, and SCL may be doped with an N-type dopant or a P-type dopant. A P-type transistor may include a doped area doped with the P-type dopant, and an N-type transistor may include a doped area doped with the N-type dopant. The second area AL may be a non-doped area, or an area that is doped at a lower concentration than those of the first areas SC, DR, and SCL.

A conductivity of the first areas SC, DR, and SCL may be greater than a conductivity of the second area AL, and the first areas SC, DR, and SCL may serve or substantially serve as an electrode or a signal line. The second area AL may correspond to or substantially correspond to the active area AL (e.g., a channel) of a transistor 100PC. In other words, a part AL of the semiconductor patterns SC, AL, DR, and SCL may be the active area AL of the transistor 100PC, other parts SC and DR may be the source area SC or the drain area DR of the transistor 100PC, and another part SCL may be a connection electrode or a connection signal line SCL.

Each of the pixels may have an equivalent circuit including a plurality of transistors, at least one capacitor, and at least one light emitting element. The equivalent circuit of the pixel may be variously modified into various suitable forms, as would be understood by those having ordinary skill in the art. FIG. 6A illustratively shows one transistor 100PC and one light emitting element 100PE included in the pixel.

The source area SC, the active area AL, and the drain area DR of the transistor 100PC may be formed from the semiconductor patterns SC, AL, DR, and SCL. The source area SC and the drain area DR may extend from the active area AL in opposite directions from each other on a cross section (e.g., in a cross-sectional view). FIG. 6A illustrates a portion of the connection signal line SCL formed from the semiconductor patterns SC, AL, DR, and SCL. In another view, the connection signal line SCL may be connected to the drain area DR of the transistor 100PC on a plane (e.g., in a plan view).

A first insulating layer 10 may be disposed on the buffer layer BFL. The first insulating layer 10 may commonly overlap with the plurality pixels, and may cover the semiconductor patterns SC, AL, DR, and SCL. The first insulating layer 10 may be an inorganic layer and/or an organic layer, and may have a single-layer structure or a multi-layered structure. The first insulating layer 10 may include at least one of aluminum oxide, titanium oxide, silicon oxide, silicon nitride, silicon oxy nitride, zirconium oxide, and/or hafnium oxide. In an embodiment, the first insulating layer 10 may be a single-layer silicon oxide layer. The first insulating layer 10 and an insulating layer of the circuit layer 120, which will be described in more detail below, may be an inorganic layer and/or an organic layer, and may have a single-layer structure or a multi-layered structure. The inorganic layer may include at least one of the above-described materials, but the present disclosure is not limited thereto.

A gate GT of the transistor 100PC may be disposed on the first insulating layer 10. The gate GT may be a portion of a metal pattern. The gate GT overlaps with the active area AL. In a process of doping or reducing the semiconductor patterns SC, AL, DR, and SCL, the gate GT may function as a mask.

A second insulating layer 20 may be disposed on the first insulating layer 10 and cover the gate GT. The second insulating layer 20 may commonly overlap with the pixels. The second insulating layer 20 may be an inorganic layer and/or an organic layer, and may have a single-layer structure or a multi-layered structure. The second insulating layer 20 may include at least one of silicon oxide, silicon nitride, and/or silicon oxy nitride. In an embodiment, the second insulating layer 20 may have a multi-layered structure including a silicon oxide layer and a silicon nitride layer.

A third insulating layer 30 may be disposed on the second insulating layer 20. The third insulating layer 30 may have a single-layer structure or a multi-layered structure. For example, the third insulating layer 30 may have a multi-layered structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 passing through (e.g., penetrating) the first insulating layer 10, the second insulating layer 20, and the third insulating layer 30.

A fourth insulating layer 40 may be disposed on the third insulating layer 30. The fourth insulating layer 40 may be a single-layer silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 passing through (e.g., penetrating) the fourth insulating layer 40 and the fifth insulating layer 50.

A sixth insulating layer 60 may be disposed on the fifth insulating layer 50 to cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, an inorganic light emitting material, an organic-inorganic light emitting material, a quantum dot, a quantum rod, a micro-LED, or a nano-LED. Hereinafter, the light emitting element 100PE may be described in more detail in the context of an organic light emitting element, but the present disclosure is not particularly limited thereto.

The light emitting element 100PE may include a first electrode AE, a light emitting layer EL, and a second electrode CE.

The first electrode AE may be disposed on the sixth insulating layer 60. The first electrode AE may be connected to the second connection electrode CNE2 through a contact hole CNT-3 passing through (e.g., penetrating) the sixth insulating layer 60.

A pixel defining film 70 may be disposed on the sixth insulating layer 60 and cover a portion of the first electrode AE. An opening 70-OP may be defined in the pixel defining film 70. The opening 70-OP of the pixel defining film 70 exposes at least a portion of the first electrode AE.

The first display unit DA1-F (e.g., see FIG. 1A) may include a light emitting area PXA, and a non-light emitting area NPXA adjacent to the light emitting area PXA. The non-light emitting area NPXA may surround (e.g., around a periphery of) the light emitting area PXA. In an embodiment, the light emitting area PXA is defined to correspond to a partial area of the first electrode AE, which is exposed by the opening 70-OP.

The light emitting layer EL may be disposed on the first electrode AE. The light emitting layer EL may be disposed in an area corresponding to the opening 70-OP. FIG. 6A illustratively shows that the light emitting layer EL is disposed inside the opening 70-OP, but the present disclosure is not limited thereto. For example, the light emitting layer EL may extend to cover portions of a side surface of the pixel defining film 70 that defines the opening 70-OP and an upper surface of the pixel defining film 70.

In an embodiment of the present disclosure, the light emitting layer EL may be formed separately for each of the pixels. When the light emitting layer EL is formed separately for each of the pixels, each of the light emitting layers EL may emit light having at least one of a blue color, a red color, or a green color. However, the present disclosure is not limited thereto, and the light emitting layers EL may be connected to the pixels, and may be commonly included in the pixels. In this case, the light emitting layer EL may provide a blue light or a white light.

The second electrode CE may be disposed on the light emitting layer EL. The second electrode CE may have an integral shape, and may be commonly included in the plurality of pixels.

In an embodiment of the present disclosure, a hole control layer may be disposed between the first electrode AE and the light emitting layer EL. The hole control layer may be commonly disposed in the light emitting area PXA and the non-light emitting area NPXA. The hole control layer may include a hole transport layer, and may selectively further include a hole injection layer. An electron control layer may be disposed between the light emitting layer EL and the second electrode CE. The electron control layer may include an electron transport layer, and may selectively further include an electron injection layer. The hole control layer and the electron control layer may be commonly formed in the plurality of pixels by using an open mask or an inkjet process.

The encapsulation layer 140 may be disposed on the light emitting element layer 130. The encapsulation layer 140 may include an inorganic layer, an organic layer, and an inorganic layer that are sequentially laminated, but the layers constituting the encapsulation layer 140 are not limited thereto. The inorganic layers may protect the light emitting element layer 130 from moisture and oxygen, and the organic layer may protect the light emitting element layer 130 from foreign substances, such as dust particles. The inorganic layers may include a silicon nitride layer, a silicon oxy nitride layer, a silicon oxide layer, a titanium oxide layer, an aluminum oxide layer, or the like. The organic layer may include an acryl-based organic layer, but the present disclosure is not limited thereto.

The sensor layer 200 may include a base layer 201, a first conductive layer 202, an intermediate insulating layer 203, a second conductive layer 204, and a cover insulating layer 205.

The base layer 201 may be an inorganic layer including at least one of silicon nitride, silicon oxy nitride, and/or silicon oxide. As another example, the base layer 201 may be an organic layer including an epoxy resin, an acrylic resin, or an imide-based resin. The base layer 201 may have a single-layer structure, or may have a multi-layered structure in which a plurality of layers are laminated in the third direction DR3. In an embodiment of the present disclosure, the sensor layer 200 may not include the base layer 201.

Each of the first conductive layer 202 and the second conductive layer 204 may have a single-layer structure, or may have a multi-layered structure in which a plurality of layers are laminated in the third direction DR3.

Each of the first conductive layer 202 and the second conductive layer 204 having the single-layer structure may include a metal layer or a transparent conductive layer. The metal layer may include molybdenum, silver, titanium, copper, aluminum, or a suitable alloy thereof. The transparent conductive layer may include a transparent conductive oxide, such as indium tin oxide (ITO), indium zinc oxide (IZO), zinc oxide (ZnO), or indium zinc tin oxide (IZTO). In addition, the transparent conductive layer may include a conductive polymer, such as poly(3,4-ethylenedioxythiophene) (PEDOT), a metal nanowire, graphene, or the like.

Each of the first conductive layer 202 and the second conductive layer 204 having the multi-layered structure may include a plurality of metal layers. The metal layers may have, for example, a three-layered structure of titanium/aluminum/titanium. The conductive layer having the multi-layered structure may include at least one metal layer and at least one transparent conductive layer.

In an embodiment of the present disclosure, a thickness of the first conductive layer 202 may be greater than or equal to a thickness of the second conductive layer 204. When the thickness of the first conductive layer 202 is greater than a thickness of the second conductive layer 204, a resistance of a component (e.g., an electrode, a sensing pattern, a bridge pattern, or the like) may be decreased. Further, because the first conductive layer 202 may be disposed under the second conductive layer 204, even when the thickness of the first conductive layer 202 is increased, a probability of the components included in the first conductive layer 202 from being visible due to a reflection of external light may be smaller than that of the second conductive layer 204.

At least one of the intermediate insulating layer 203 or the cover insulating layer 205 may include an inorganic film. The inorganic film may include at least one of aluminum oxide, titanium oxide, silicon oxide, silicon nitride, silicon oxynitride, zirconium oxide, or hafnium oxide.

At least one of the intermediate insulating layer 203 or the cover insulating layer 205 may include an organic film. The organic film may include at least one of an acryl-based resin, a methacrylate-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

The sensor layer 200 including the first conductive layer 202 and the second conductive layer 204, or in other words, a total of two conductive layers, has been described above, but the present disclosure is not particularly limited thereto. For example, the sensor layer 200 may include three or more conductive layers.

US 12,663,905 B2

17

Figure 6B:
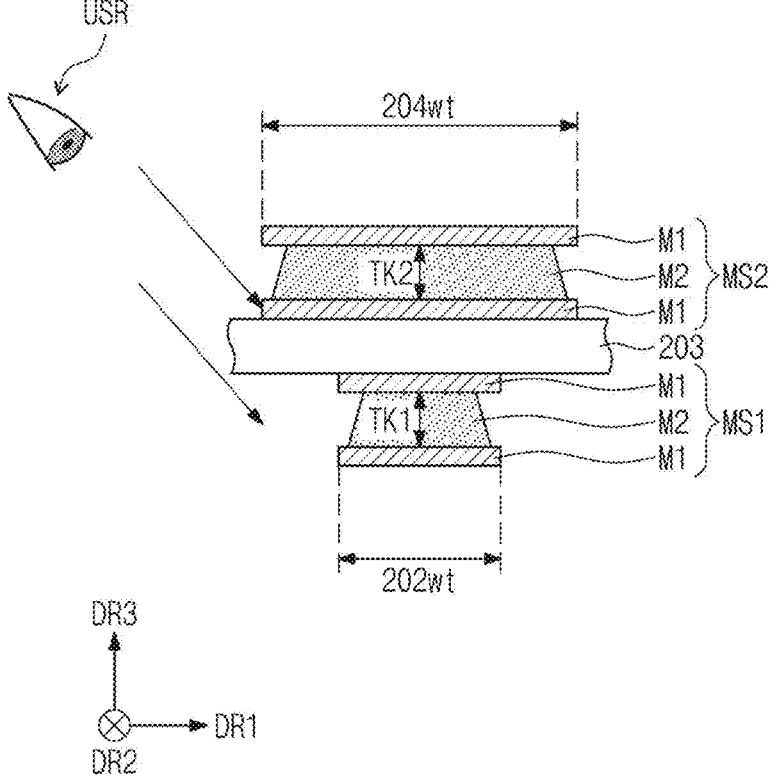
FIG. 6B is a cross-sectional view of a sensor layer according to an embodiment of the present disclosure.

FIG. 6B is a cross-sectional view of a sensor layer 200 according to an embodiment of the present disclosure.

Referring to FIGS. 6A and 6B, a second width 204wt of a second mesh line MS2 included in the second conductive layer 204 may be greater than or equal to a first width 202wt of a first mesh line MS1 included in the first conductive layer 202. When a user USR views the first mesh line MS1 and the second mesh line MS2, the first mesh line MS1 has a width that is smaller than that of the second mesh line MS2, and thus, a probability that the first mesh line MS1 is visually recognized by the user USR may be decreased.

Each of the first mesh line MS1 and the second mesh line MS2 may include first metal layers M1, and a second metal layer M2 disposed between the first metal layers M1. Illustratively, the first metal layers M1 may include titanium (Ti), and the second metal layer M2 may include aluminum (Al). However, the present disclosure is not particularly limited thereto.

In an embodiment of the present disclosure, a first thickness TK1 of the second metal layer M2 of the first mesh line MS1 may be the same or substantially the same as a second thickness TK2 of the second metal layer M2 of the second mesh line MS2, but the present disclosure is not particularly limited thereto. For example, the first thickness TK1 may be greater than the second thickness TK2. As another example, the second thickness TK2 may be greater than the first thickness TK1. In an embodiment of the present disclosure, each of the first thickness TK1 and the second thickness TK2 may be 1,000 Å or more, for example, such as 6,000 Å.

Figure 7:
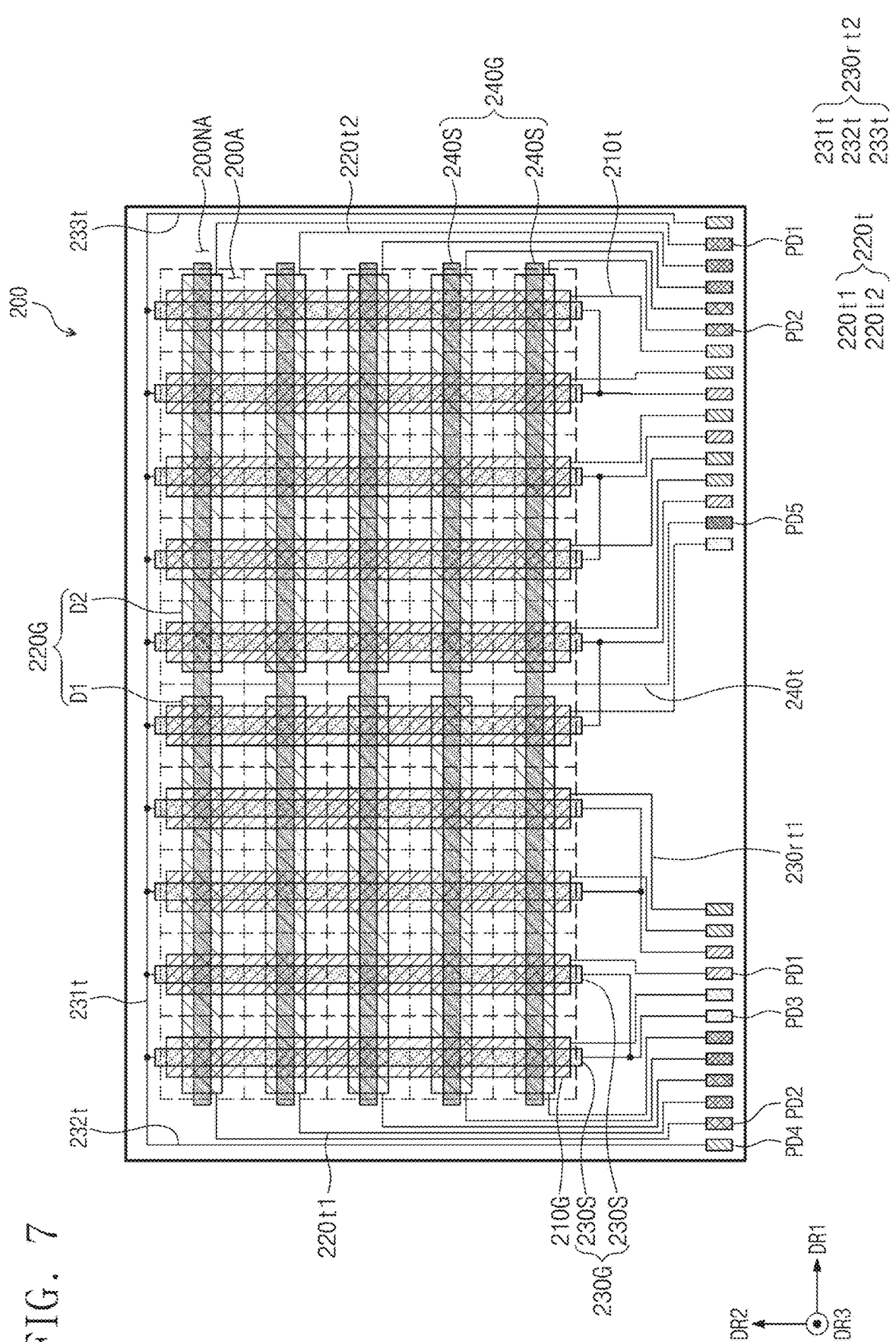
FIG. 7 is a plan view of the sensor layer according to an embodiment of the present disclosure.
Figure 8A:
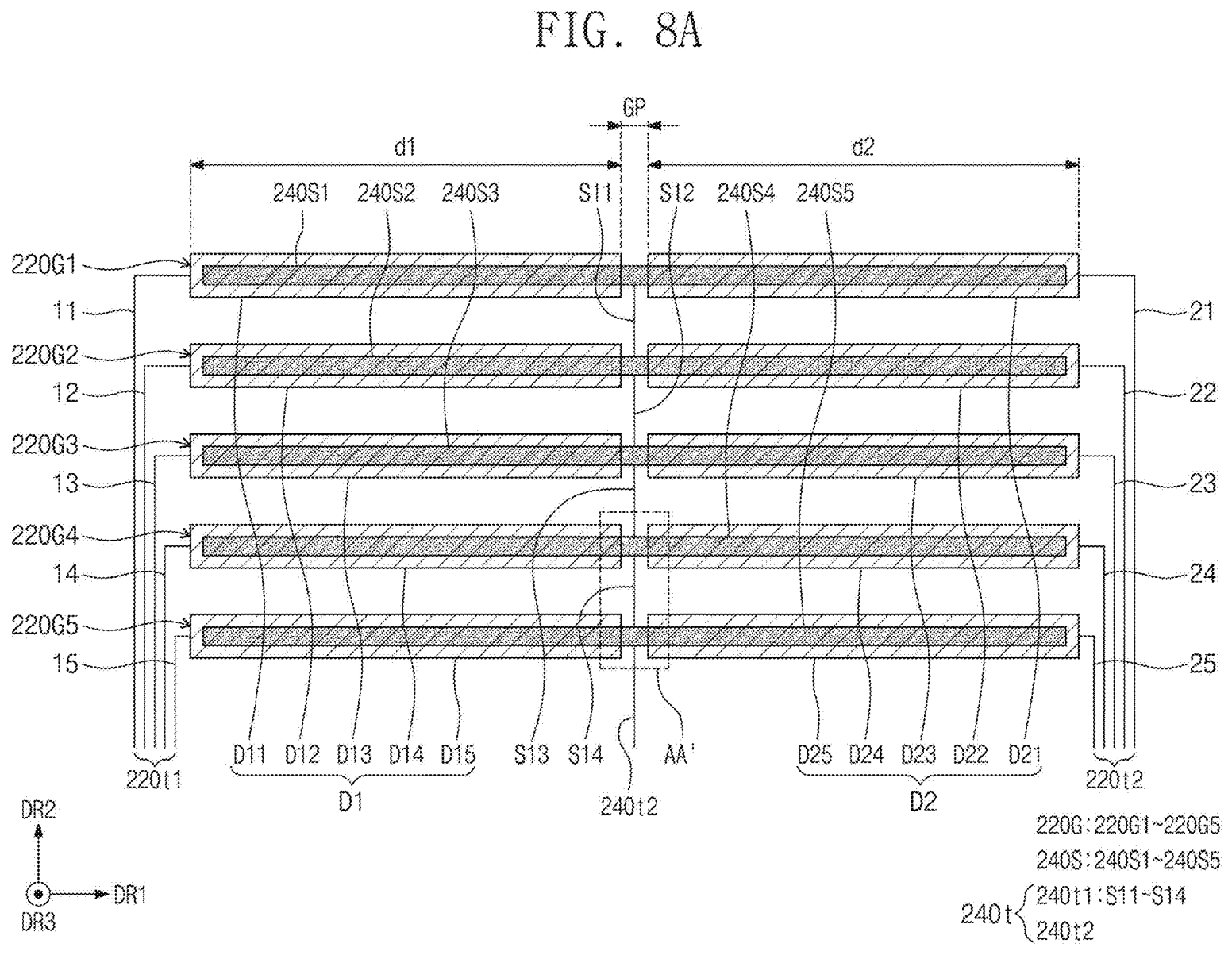
Figure 8B:
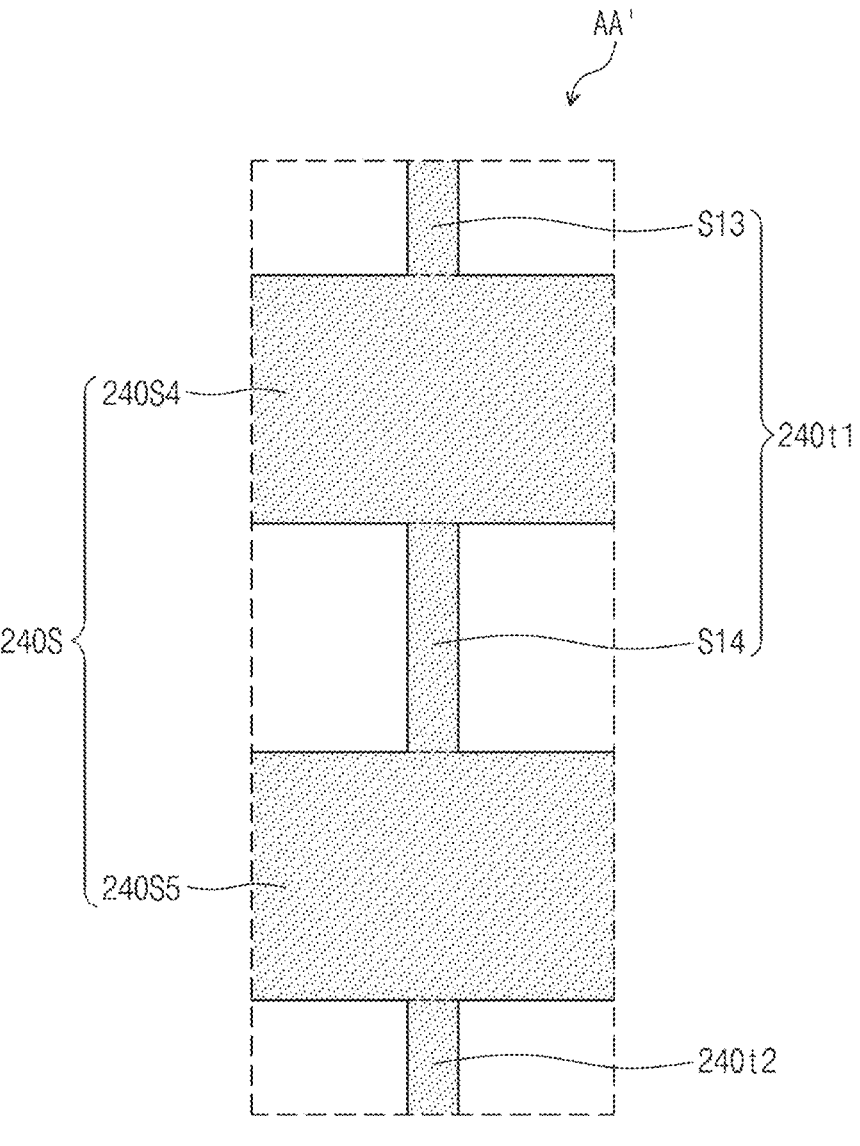
FIG. 8B is an enlarged plan view of the area AA' illustrated in FIG. 8A.

FIG. 7 is a plan view of the sensor layer 200 according to an embodiment of the present disclosure. FIG. 8A is a view illustrating some electrode groups inside the sensor layer 200 according to an embodiment of the present disclosure. FIG. 8B is an enlarged plan view of the area AA' illustrated in FIG. 8A.

Referring to FIG. 7, a sensing area 200A and a peripheral area 200NA adjacent to the sensing area 200A may be defined in the sensor layer 200. In an embodiment, on a plane (e.g., in a plan view), a length (e.g., a width) of the sensing area 200A in the first direction DR1 may be greater than a length (e.g., a width) of the sensing area 200A in the second direction DR2.

The sensor layer 200 may include a plurality of first electrode groups 210G, a plurality of second electrode groups 220G, a plurality of third electrode groups 230G, and a fourth electrode group 240G, which are arranged in the sensing area 200A. For convenience of illustration, FIG. 8A schematically shows the second electrode groups 220G and the fourth electrode groups 240G from among the first to fourth electrode groups 210G, 220G, 230G, and 240G. As used herein, the plurality of second electrode groups 220G may be referred to as a plurality of first electrodes, the plurality of fourth electrode groups 240G may be referred to as a plurality of second electrodes, the plurality of first electrode groups 210G may be referred to as a plurality of third electrodes, and the plurality of third electrode groups 230G may be referred to as a plurality of fourth electrodes.

The first electrode groups 210G may cross or intersect the second electrode groups 220G. Each of the first electrode groups 210G may extend in the second direction DR2, and the first electrode groups 210G may be spaced apart from each other along the first direction DR1. Each of the second electrode groups 220G may extend in the first direction DR1, and the second electrode groups 220G may be spaced apart from each other along the second direction DR2. A sensing unit (e.g., a sensing area) SU of the sensor layer 200 may be an area in which one first electrode group 210G and one second electrode group 220G cross or intersect each other.

FIG. 7 illustratively shows ten first electrode groups 210G and five second electrode groups 220G, and thus, illustratively shows 50 sensing units SU, but the number of first electrode groups 210G and the number of second electrode groups 220G are not limited thereto.

Each of the second electrode groups 220G may include a plurality of split electrodes D1 and D2. In an embodiment, each of the second electrode groups 220G may include a first split electrode D1 and a second split electrode D2. Each of the second electrode groups 220G may include electrodes that are divided into two parts. The first split electrode D1 and the second split electrode D2 may be spaced apart from each other in the first direction DR1. Each of the first split electrode D1 and the second split electrode D2 may extend in the first direction DR1. The first split electrode D1 and the second split electrode D2 included in one second electrode group 220G may sense the same axis (e.g., an axis extending in the first direction DR1).

As illustrated in FIG. 8A, in an embodiment, the second electrode groups 220G may include a $(2\text{-}1)^{th}$ electrode group 220G1, a $(2\text{-}2)^{th}$ electrode group 220G2, a $(2\text{-}3)^{th}$ electrode group 220G3, a $(2\text{-}4)^{th}$ electrode group 220G4, and a $(2\text{-}5)^{th}$ electrode group 220G5, which are sequentially arranged along the second direction DR2.

The $(2\text{-}1)^{th}$ electrode group 220G1 may include a $(1\text{-}1)^{th}$ split electrode D11, and a $(2\text{-}1)^{th}$ split electrode D21 spaced apart from the $(1\text{-}1)^{th}$ split electrode D11 in the first direction DR1. The $(2\text{-}2)^{th}$ electrode group 220G2 may include a $(1\text{-}2)^{th}$ split electrode D12, and a $(2\text{-}2)^{th}$ split electrode D22 spaced apart from the $(1\text{-}2)^{th}$ split electrode D12 in the first direction DR1. The $(2\text{-}3)^{th}$ electrode group 220G3 may include a $(1\text{-}3)^{th}$ split electrode D13, and a $(2\text{-}3)^{th}$ split electrode D23 spaced apart from the $(1\text{-}3)^{th}$ split electrode D13 in the first direction DR1. The $(2\text{-}4)^{th}$ electrode group 220G4 may include a $(1\text{-}4)^{th}$ split electrode D14, and a $(2\text{-}4)^{th}$ split electrode D24 spaced apart from the $(1\text{-}4)^{th}$ split electrode D14 in the first direction DR1. The $(2\text{-}5)^{th}$ electrode group 220G5 may include a $(1\text{-}5)^{th}$ split electrode D15, and a $(2\text{-}5)^{th}$ split electrode D25 spaced apart from the $(1\text{-}5)^{th}$ split electrode D15 in the first direction DR1. The first split electrodes D1 inside the second electrode groups 220G may include the $(1\text{-}1)^{th}$ to $(1\text{-}5)^{th}$ split electrodes D11, D12, D13, D14, and D15. The second split electrodes D2 inside the second electrode groups 220G may include the $(2\text{-}1)^{th}$ to $(2\text{-}5)^{th}$ split electrodes D21, D22, D23, D24, and D25.

According to an embodiment of the present disclosure, inside one second electrode group 220G, a length d1 of the first split electrode D1 in an extension direction (e.g., a long axis direction, such as the first direction DR1) may be the same or substantially the same as a length d2 of the second split electrode D2 in the extension direction (e.g., the long axis direction, such as the first direction DR1). For example, a length of the $(1\text{-}1)^{th}$ split electrode D11 may be the same or substantially the same as a length of the $(2\text{-}1)^{th}$ split electrode D21. A length of the $(1\text{-}2)^{th}$ split electrode D12 may be the same or substantially the same as a length of the $(2\text{-}2)^{th}$ split electrode D22. A length of the $(1\text{-}3)^{th}$ split electrode D13 may be the same or substantially the same as a length of the $(2\text{-}3)^{th}$ split electrode D23. A length of the $(1\text{-}4)^{th}$ split electrode D14 may be the same or substantially the same as a length of the $(2\text{-}4)^{th}$ split electrode D24. A length of the $(1\text{-}5)^{th}$ split electrode D15 may be the same or substantially the same as a length of the $(2\text{-}5)^{th}$ split electrode D25.

According to an embodiment of the present disclosure, all of the first split electrodes D1 of the plurality of second electrode groups 220G may have the same or substantially the same length d1 as each other in the extension direction. All of the second split electrodes D2 of the plurality of second electrode groups 220G may have the same or substantially the same length d2 as each other in the extension direction. For example, the lengths of the $(1\text{-}1)^{th}$ to $(1\text{-}5)^{th}$ split electrodes D11, D12, D13, D14, and D15 may be the same or substantially the same as each other, and the lengths of the $(2\text{-}1)^{th}$ to $(2\text{-}5)^{th}$ split electrodes D21, D22, D23, D24, and D25 may be the same or substantially the same as each other.

Referring to FIG. 7, the third electrode groups 230G may be spaced apart from each other along the first direction DR1. In an embodiment of the present disclosure, each of the third electrode groups 230G may include a plurality of first auxiliary electrodes 230S that are electrically connected to each other. The number of first auxiliary electrodes 230S included in each (e.g., in one) of the third electrode groups 230G may be variously modified as needed or desired. For example, as the number of first auxiliary electrodes 230S included in each of the third electrode groups 230G is increased, a resistance of each of the third electrode groups 230G may be decreased, and thus, a power efficiency may be improved and a sensing sensitivity may be improved. On the other hand, as the number of first auxiliary electrodes 230S included in each of the third electrode groups 230G is decreased, a loop coil pattern formed using the third electrode groups 230G may be implemented in more various suitable forms.

FIG. 7 illustratively shows that one third electrode group 230G includes two first auxiliary electrodes 230S, but the present disclosure is not particularly limited thereto. The first auxiliary electrodes 230S may be arranged in a one-to-one correspondence with the first electrode groups 210G. Thus, one sensing unit SU may include a portion of one first auxiliary electrode 230S.

A coupling capacitor may be defined between one first electrode group 210G and one first auxiliary electrode 230S. In this case, an induced current that may be generated during pen sensing may be transmitted from the first auxiliary electrode 230S to the first electrode group 210G through the coupling capacitor. In other words, the first auxiliary electrode 230S may serve to supplement a signal transmitted from the first electrode group 210G to the sensor driving unit 200C. Thus, the greatest effect may be obtained when a phase of a signal induced in the first auxiliary electrode 230S and a phase of a signal induced in the first electrode group 210G coincide with each other. As such, a center of each of the first electrode groups 210G in the second direction DR2 and a center of each corresponding one of the first auxiliary electrodes 230S in the second direction DR2 may overlap with each other. Further, a center of each of the first electrode groups 210G in the first direction DR1 and a center of each corresponding one of the first auxiliary electrodes 230S in the first direction DR1 may also overlap with each other.

In an embodiment of the present disclosure, because one third electrode group 230G includes two first auxiliary electrodes 230S, the one third electrode group 230G may correspond to (e.g., may overlap with) two first electrode groups 210G. Thus, the number of first electrode groups 210G included in the sensor layer 200 may be greater than the number of third electrode groups 230G. For example, the number of first electrode groups 210G may be the same as a product of the number of third electrode groups 230G included in the sensor layer 200 and the number of first auxiliary electrodes 230S included in each of the third electrode groups 230G. In FIG. 7, the number of first electrode groups 210G may be ten, the number of third electrode groups 230G may be five, and the number of first auxiliary electrodes 230S included in each of the third electrode groups 230G may be two. However, the present disclosure is not limited thereto. As used herein, the phrase "A and B overlap with each other" may mean that a portion of 'A' and a portion of 'B' overlap with each other, an entirety of 'A' and a portion of 'B' overlap with each other, an entirety of 'B' and a portion of 'A' overlap with each other, or the entirety of 'A' and the entirety of 'B' overlap with each other.

The fourth electrode groups 240G may be spaced apart from each other along the second direction DR2. The fourth electrode groups 240G may include a plurality of second auxiliary electrodes 240S. In an embodiment of the present disclosure, each of the fourth electrode groups 240G may include one second auxiliary electrode 240S. The fourth electrode groups 240G may include the plurality of second auxiliary electrodes 240S arranged along the second direction DR2. Each of the second auxiliary electrodes 240S may extend in the first direction DR1. In an embodiment of the present disclosure, the second auxiliary electrodes 240S may be electrically connected to each other.

At least a portion of one second auxiliary electrode 240S may overlap with each of the first split electrode D1 and the second split electrode D2 constituting one second electrode group 220G. The one second auxiliary electrode 240S may continuously extend from one end of the first split electrode D1 adjacent to the peripheral area 200NA to one end of the second split electrode D2 adjacent to the peripheral area 200NA in the first direction DR1.

A coupling capacitor may be defined between one second electrode group 220G and one second auxiliary electrode 240S. In this case, an induced current that may be generated during pen sensing may be transmitted from the second auxiliary electrode 240S to the second electrode group 220G through the coupling capacitor. In other words, the second auxiliary electrode 240S may serve to supplement a signal transmitted from the second electrode group 220G to the sensor driving unit 200C.

Thus, the greatest effect may be obtained when a phase of a signal induced in the second auxiliary electrode 240S and a phase of a signal induced in the second electrode group 220G coincide with each other. As such, a center of each of the second electrode groups 220G in the first direction DR1 and a center of each corresponding one of the second auxiliary electrodes 240S in the first direction DR1 may overlap with each other. Further, a center of each of the second electrode groups 220G in the second direction DR2 and a center of each corresponding one of the second auxiliary electrodes 240S in the second direction DR2 may also overlap with each other.

As illustrated in FIG. 8A, in an embodiment, the fourth electrode groups 240G may include a $(2\text{-}1)^{th}$ auxiliary electrode 240S1, a $(2\text{-}2)^{th}$ auxiliary electrode 240S2, a $(2\text{-}3)^{th}$ auxiliary electrode 240S3, a $(2\text{-}4)^{th}$ auxiliary electrode 240S4, and a $(2\text{-}5)^{th}$ auxiliary electrode 240S5, which are sequentially arranged along the second direction DR2. The $(2\text{-}1)^{th}$ auxiliary electrode 240S1 may overlap with the $(2\text{-}1)^{th}$ electrode group 220G1. The $(2\text{-}2)^{th}$ auxiliary electrode 240S2 may overlap with the $(2\text{-}2)^{th}$ electrode group 220G2. The $(2\text{-}3)^{th}$ auxiliary electrode 240S3 may overlap with the $(2\text{-}3)^{th}$ electrode group 220G3. The $(2\text{-}4)^{th}$ auxiliary electrode 240S4 may overlap with the $(2\text{-}4)^{th}$ electrode group 220G4. The $(2\text{-}5)^{th}$ auxiliary electrode 240S5 may overlap with the $(2\text{-}5)^{th}$ electrode group 220G5.

Referring to FIG. 7, the sensor layer 200 may further include a plurality of first trace lines 210t arranged in the peripheral area 200NA, and a plurality of first pads PD1 connected to the first trace lines 210t in one-to-one correspondence. The first trace lines 210t may be electrically connected to the first electrode groups 210G in one-to-one correspondence. In other words, one first trace line 210t may be connected to one first electrode group 210G.

The sensor layer 200 may further include a plurality of second trace lines 220t, and a plurality of second pads PD2 connected to the second trace lines 220t in one-to-one correspondence. In an embodiment of the present disclosure, the second trace lines 220t may overlap with a non-display area 100NA (e.g., see FIG. 4) or the peripheral area 200NA. The second trace lines 220t may be electrically connected to the second electrode groups 220G in a two-to-one correspondence. Accordingly, the number of second trace lines 220t may be twice the number of second electrode groups 220G. In other words, two second trace lines 220t may be connected to one second electrode group 220G.

The second trace lines 220t may include first split trace lines 220t1 and second split trace lines 220t2. The first split trace lines 220t1 may be electrically connected to the first split electrodes D1 in one-to-one correspondence. The second split trace lines 220t2 may be electrically connected to the second split electrodes D2 in one-to-one correspondence. In an embodiment, each of the first split trace lines 220t1 may be connected to one end of a corresponding first split electrode D1, which is adjacent to the peripheral area 200NA, and each of the second split trace lines 220t2 may be connected to one end of a corresponding second split electrode D2, which is adjacent to the peripheral area 200NA. The first split trace lines 220t1 and the second split trace lines 220t2 may be spaced apart from each other, with the first split electrode D1 and the second split electrode D2 interposed therebetween.

As illustrated in FIG. 8A, in an embodiment, the first split trace lines 220t1 may include a $(1\text{-}1)^{th}$ split trace line 11 electrically connected to the $(1\text{-}1)^{th}$ split electrode D11, a $(1\text{-}2)^{th}$ split trace line 12 electrically connected to the $(1\text{-}2)^{th}$ split electrode D12, a $(1\text{-}3)^{th}$ split trace line 13 electrically connected to the $(1\text{-}3)^{th}$ split electrode D13, a $(1\text{-}4)^{th}$ split trace line 14 electrically connected to the $(1\text{-}4)^{th}$ split electrode D14, and a $(1\text{-}5)^{th}$ split trace line 15 electrically connected to the $(1\text{-}5)^{th}$ split electrode D15. The second split trace lines 220t2 may include a $(2\text{-}1)^{th}$ split trace line 21 electrically connected to the $(2\text{-}1)^{th}$ split electrode D21, a $(2\text{-}2)^{th}$ split trace line 22 electrically connected to the $(2\text{-}2)^{th}$ split electrode D22, a $(2\text{-}3)^{th}$ split trace line 23 electrically connected to the $(2\text{-}3)^{th}$ split electrode D23, a $(2\text{-}4)^{th}$ split trace line 24 electrically connected to the $(2\text{-}4)^{th}$ split electrode D24, and a $(2\text{-}5)^{th}$ split trace line 25 electrically connected to the $(2\text{-}5)^{th}$ split electrode D25.

Referring to FIG. 7, the sensor layer 200 may further include third trace lines 230rt1 arranged in the peripheral area 200NA, third pads PD3 connected to the third trace lines 230rt1 in one-to-one correspondence, a fourth trace line 230rt2, and fourth pads PD4 connected to one end and another end (e.g., an opposite end) of the fourth trace line 230rt2.

The third trace lines 230rt1 may be connected to the third electrode groups 230G in one-to-one correspondence. In other words, the number of third trace lines 230rt1 may correspond to the number of third electrode groups 230G. FIG. 7 illustratively shows five third trace lines 230rt1.

In an embodiment of the present disclosure, the third trace lines 230rt1 and the third pad PD3 may be omitted as needed or desired, and a charging drive mode for charging the pen may be omitted as needed or desired. In this case, the sensor layer 200 may sense an input by an active pen that may emit a magnetic field even when a magnetic field is not provided from the sensor layer 200.

The fourth trace line 230rt2 may be electrically connected to at least one first auxiliary electrode 230S from among the first auxiliary electrodes 230S. In an embodiment of the present disclosure, the fourth trace line 230rt2 may be electrically connected to all of the first auxiliary electrodes 230S. In other words, the fourth trace line 230rt2 may be electrically connected to all of the third electrode groups 230G. The fourth trace line 230rt2 may include a first line portion 231t extending in the first direction DR1 and electrically connected to the third electrode groups 230G, a second line portion 232t extending from a first end of the first line portion 231t in the second direction DR2, and a third line portion 233t extending from a second end of the first line portion 231t in the second direction DR2.

In an embodiment of the present disclosure, each of a resistance of the second line portion 232t and a resistance of the third line portion 233t may be the same or substantially the same as a resistance of one third electrode group 230G from among the third electrode groups 230G. Thus, the second line portion 232t and the third line portion 233t may serve as the third electrode groups 230G, and the same or substantially the same effect may be obtained as if the third electrode groups 230G are also arranged in the peripheral area 200NA. For example, any one of the second line portion 232t or the third line portion 233t and any one of the third electrode groups 230G may form a coil. Thus, the pen positioned in an area adjacent to the peripheral area 200NA may also be sufficiently charged by a loop including the second line portion 232t or the third line portion 233t.

In an embodiment of the present disclosure, a width of each of the second line portion 232t and the third line portion 233t in the first direction DR1 may be variously adjusted as needed or desired to adjust the resistance of the second line portion 232t and the resistance of the third line portion 233t. However, the present disclosure is not limited thereto, and the first to third line portions 231t, 232t, and 233t may have the same or substantially the same width as each other.

The sensor layer 200 may further include a fifth trace line 240t of which at least a portion is disposed to overlap with the sensing area 200A. At least a portion of the fifth trace line 240t may overlap with a display area 100A (e.g., see FIG. 4). For example, when viewed on a plane (e.g., in a plan view), a shape or an area of the display area 100A (e.g., see FIG. 4) may be the same or substantially the same as (or similar to) a shape or an area of the sensing area 200A. The fifth trace line 240t may be electrically connected to the fourth electrode groups 240G. The fifth trace line 240t may be electrically connected to all of the second auxiliary electrodes 240S.

As illustrated in FIGS. 7 and 8A, at least a portion of the fifth trace line 240t may extend within a gap GP between the first split electrode D1 and the second split electrode D2. The at least a portion of the fifth trace line 240t may connect adjacent fourth electrode groups 240G (e.g., adjacent second auxiliary electrodes 240S) to each other within the sensing area 200A. In an embodiment, the fifth trace line 240*t* may include (5-1)$^{th}$ trace lines 240*t*1 and a (5-2)$^{th}$ trace line 240*t*2.

Each of the (5-1)$^{th}$ trace lines 240*t*1 may be a line connecting adjacent second auxiliary electrodes 240S to each other. For example, each of the (5-1)$^{th}$ trace lines 240*t*1 may extend from one side of any one second auxiliary electrode 240S to one side of another adjacent second auxiliary electrode 240S in the second direction DR2. The one side of the any one second auxiliary electrode 240S and the one side of the other second auxiliary electrode 240S may correspond to side surfaces facing each other in the second direction DR2. Each of the one side of the any one second auxiliary electrode 240S and the one side of the other second auxiliary electrode 240S may correspond to a long side extending in the first direction DR1 on a plane (e.g., in a plan view). The (5-1)$^{th}$ trace line 240*t*1 may extend from a portion of the one side of the corresponding second auxiliary electrode 240S, which is exposed from the second electrode group 220G by the gap GP between the first and second split electrodes D1 and D2. In other words, the (5-1)$^{th}$ trace line 240*t*1 may extend from a portion of the one side of the corresponding second auxiliary electrode 240S, which does not overlap with the second electrode group 220G (e.g., the first and second split electrodes D1 and D2).

The (5-2)$^{th}$ trace line 240*t*2 may be a line connecting the fourth electrode group 240G and a fifth pad PD5 to each other. In other words, the (5-2)$^{th}$ trace line 240*t*2 may electrically connect the fourth electrode group 240G and the sensor driving unit 200C to each other. The (5-2)$^{th}$ trace line 240*t*2 may connect the fifth pad PD5 and the second auxiliary electrode 240S closest to the fifth pad PD5 from among the second auxiliary electrodes 240S to each other. For example, the (5-2)$^{th}$ trace line 240*t*2 may extend from one side of the second auxiliary electrode 240S closest to the fifth pad PD5 from among the second auxiliary electrodes 240S to the fifth pad PD5.

As illustrated in FIG. 8A, in an embodiment, the (5-1)$^{th}$ trace lines 240*t*1 may include a first connection trace line S11 connecting the (2-1)$^{th}$ and (2-2)$^{th}$ auxiliary electrodes 240S1 and 240S2 to each other, a second connection trace line S12 connecting the (2-2)$^{th}$ and (2-3)$^{th}$ auxiliary electrodes 240S2 and 240S3 to each other, a third connection trace line S13 connecting the (2-3)$^{th}$ and (2-4)$^{th}$ auxiliary electrodes 240S3 and 240S4 to each other, and a fourth connection trace line S14 connecting the (2-4)$^{th}$ and (2-5)$^{th}$ auxiliary electrodes 240S4 and 240S5 to each other.

As illustrated in FIG. 8B, the fourth electrode group 240G and the fifth trace line 240*t* may be arranged at (e.g., in or on) the same layer as each other. In an embodiment, the second auxiliary electrodes 240S and the (5-1)$^{th}$ and (5-2)$^{th}$ trace lines 240*t*1 and 240*t*2 may together form an integral shape.

According to an embodiment, in the sensor layer 200, a split structure may be applied to the second electrode groups 220G extending in the long axis direction, and thus, resistances of the split electrodes of the second electrode group 220G included in the sensing unit SU may be decreased. Accordingly, a frequency range (e.g., a bandwidth) that may be applied to a signal provided to the sensor layer 200 may be more secured, and a degree of freedom in selecting the frequency may be improved.

According to an embodiment, the split structure may be applied to the second electrode groups 220G, and thus, the fifth trace line 240*t* may be disposed through gaps inside the second electrode groups 220G. Accordingly, at least a portion of the fifth trace line 240*t* may overlap with the sensing area 200A or the display area 100A (e.g., see FIG. 4). Thus, an area of the peripheral area 200NA may be decreased. As a result, an area of a front surface of the electronic device 1000 (e.g., see FIG. 1A), which is occupied by the peripheral area 200NA, may be decreased, and a narrower bezel may be implemented.

As used herein, the plurality of second trace lines 220*t* may be referred to as a plurality of first lines, the plurality of fifth trace lines 240*t* may be referred to as a plurality of second lines, the plurality of first trace lines 210*t* may be referred to as a plurality of third lines, and the plurality of third trace lines 230*rt*1 may be referred to as a plurality of fourth lines. The plurality of first split trace lines 220*t*1 may be referred to as a plurality of (1-1)$^{th}$ lines, and the plurality of second split trace lines 220*t*2 may be referred to as a plurality of (1-2)$^{th}$ lines. The (5-1)$^{th}$ trace line 240*t*1 may be referred to as a (2-1)$^{th}$ line, and the (5-2)$^{th}$ trace line 240*t*2 may be referred to as a (2-2)$^{th}$ line.

Figure 9:
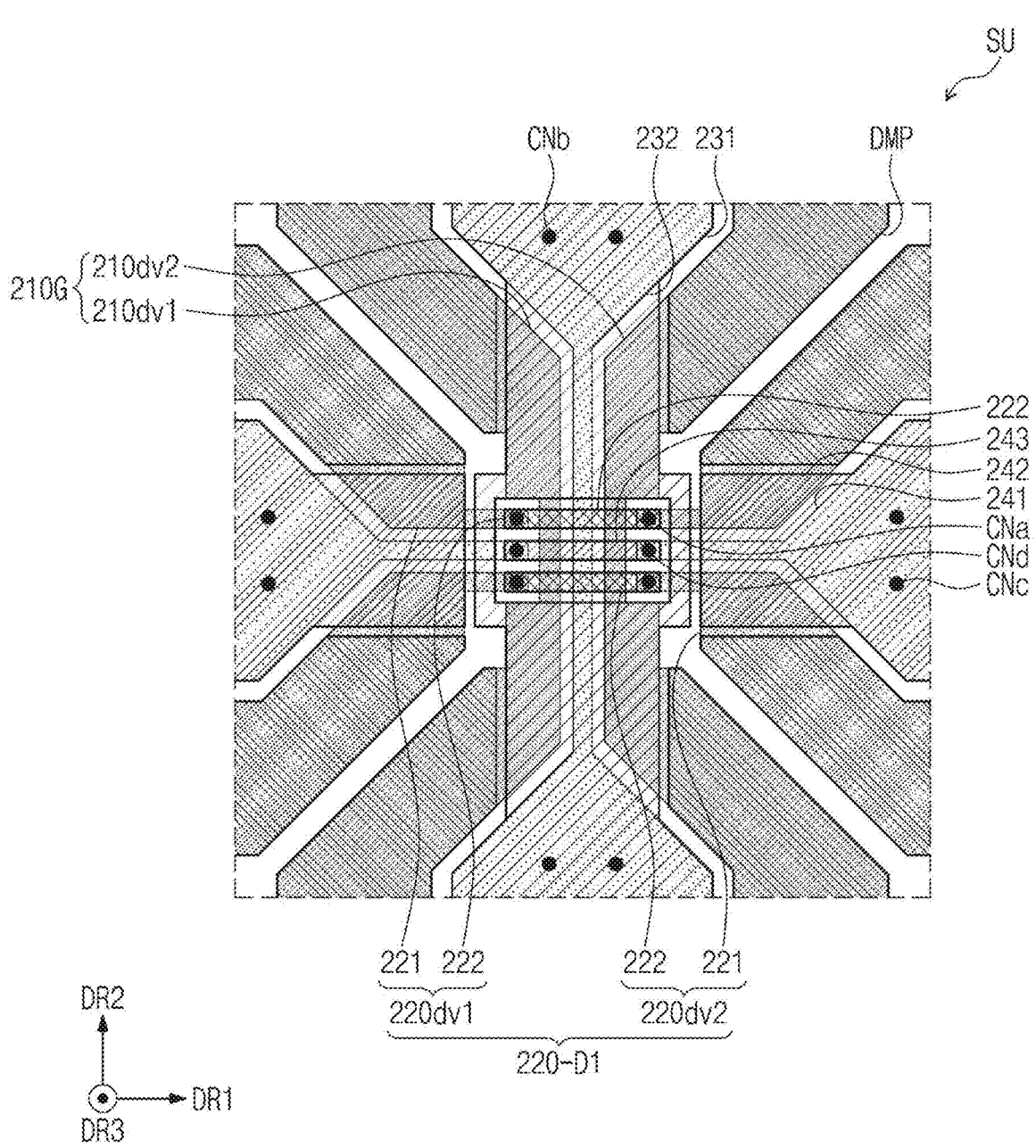
FIG. 9 is an enlarged plan view illustrating one sensing unit according to an embodiment of the present disclosure.

FIG. 9 is an enlarged plan view illustrating one sensing unit SU according to an embodiment of the present disclosure. FIG. 10A is a plan view illustrating a first conductive layer 202SU of the sensor unit according to an embodiment of the present disclosure. FIG. 10B is a plan view illustrating a second conductive layer 204SU of the sensor unit according to an embodiment of the present disclosure. FIG. 10C is a cross-sectional view of the sensor layer 200 taken along the line I-I' illustrated in FIGS. 10A and 10B according to an embodiment of the present disclosure.

Referring to FIGS. 7, 9, and 10A to 10C, each of the first electrode groups 210G may include first unit split electrodes 210*dv*1 and 210*dv*2. The first unit split electrodes 210*dv*1 and 210*dv*2 may extend in the second direction DR2, and may be spaced apart from each other in the first direction DR1. The first unit split electrodes 210*dv*1 and 210*dv*2 may have shapes that are line-symmetrical to each other with respect to a line extending in the second direction DR2.

The two first unit split electrodes 210*dv*1 and 210*dv*2 included in one first electrode group 210G may be connected to one first trace line from among the first trace lines 210*t*. Each of the first trace lines 210*t* may include a plurality of branches for connection to the two first unit split electrodes 210*dv*1 and 210*dv*2. In an embodiment of the present disclosure, the two first unit split electrodes 210*dv*1 and 210*dv*2 may be connected to each other inside the sensing area 200A.

Each of the second electrode groups 220G may include the first split electrode D1 and the second split electrode D2. Each of the first split electrode D1 and the second split electrode D2 may include second unit split electrodes 220*dv*1 and 220*dv*2. FIGS. 9 to 10B illustratively show a first split electrode 220-D1 from among the first split electrode D1 and the second split electrode D2. The second unit split electrodes 220*dv*1 and 220*dv*2 may extend in the first direction DR1, and may be spaced apart from each other in the second direction DR2. The second unit split electrodes 220*dv*1 and 220*dv*2 may have shapes that are line-symmetrical to each other with respect to a line extending in the first direction DR1.

Each of the second unit split electrodes 220*dv*1 and 220*dv*2 may include a sensing pattern 221 and a bridge pattern 222. The sensing pattern 221 and the bridge pattern 222 may be arranged at (e.g., in or on) different layers from each other. The sensing pattern 221 and the bridge pattern 222 may be electrically connected to each other through a first contact CNa. For example, the bridge pattern 222 may be included in the first conductive layer 202SU, and the sensing pattern 221 and the first unit split electrodes 210dv1 and 210dv2 may be included in the second conductive layer 204SU. The first conductive layer 202SU may be included in the first conductive layer 202 described above with reference to FIG. 6A, and the second conductive layer 204SU may be included in the second conductive layer 204 described above with reference to FIG. 6A.

Each of the first auxiliary electrodes 230S included in the third electrode group 230G may include a $(3\text{-}1)^{th}$ pattern 231 and a $(3\text{-}2)^{th}$ pattern 232. The $(3\text{-}1)^{th}$ pattern 231 and the $(3\text{-}2)^{th}$ pattern 232 may be arranged at (e.g., in or on) different layers from each other. The $(3\text{-}1)^{th}$ pattern 231 and the $(3\text{-}2)^{th}$ pattern 232 may be electrically connected to each other through a second contact CNb. The $(3\text{-}1)^{th}$ pattern 231 may be included in the first conductive layer 202SU, and the $(3\text{-}2)^{th}$ pattern 232 may be included in the second conductive layer 204SU.

In an embodiment of the present disclosure, a portion of the $(3\text{-}1)^{th}$ pattern 231 may overlap with a portion of each of the first unit split electrodes 210dv1 and 210dv2. Thus, a coupling capacitance may be provided (e.g., may be formed) between the first electrode group 210G and the third electrode group 230G.

Each of the second auxiliary electrodes 240S included in the fourth electrode group 240G may include a $(4\text{-}1)^{th}$ pattern 241, a $(4\text{-}2)^{th}$ pattern 242, and a $(4\text{-}3)^{th}$ pattern 243. The $(4\text{-}2)^{th}$ pattern 242 and the $(4\text{-}3)^{th}$ pattern 243 may be arranged at (e.g., in or on) the same layer as each other. The $(4\text{-}1)^{th}$ pattern 241 may be disposed at (e.g., in or on) a different layer from that of the $(4\text{-}2)^{th}$ pattern 242 and the $(4\text{-}3)^{th}$ pattern 243. The $(4\text{-}1)^{th}$ pattern 241 and the $(4\text{-}2)^{th}$ pattern 242 may be electrically connected to each other through a third contact CNc. The $(4\text{-}1)^{th}$ pattern 241 and the $(4\text{-}3)^{th}$ pattern 243 may be electrically connected to each other through a fourth contact CNd. The $(4\text{-}2)^{th}$ pattern 242 and the $(4\text{-}3)^{th}$ pattern 243 may be included in the first conductive layer 202SU, and the $(4\text{-}1)^{th}$ pattern 241 may be included in the second conductive layer 204SU.

In an embodiment of the present disclosure, a portion of the $(4\text{-}2)^{th}$ pattern 242 may overlap with the sensing pattern 221 of each of the second unit split electrodes 220dv1 and 220dv2. Thus, a coupling capacitor may be provided (e.g., may be formed) between the second electrode group 220G and the fourth electrode group 240G.

In an embodiment of the present disclosure, the first conductive layer 202SU may further include dummy patterns DMP. Each of the dummy patterns DMP may be electrically floated or electrically grounded. In an embodiment of the present disclosure, the dummy patterns DMP may be omitted as needed or desired. The dummy patterns DMP may be arranged in an empty space, and thus, a probability that specific patterns may be visually recognized by a reflection of external light may be decreased. In other words, the electronic device 1000 (e.g., see FIG. 1A) having an improved visibility due to a reflection of the external light may be provided.

FIG. 11A is a plan view illustrating a first conductive layer 202SUa of the sensor unit according to an embodiment of the present disclosure. FIG. 11B is a plan view illustrating a second conductive layer 204SUa of the sensor unit according to an embodiment of the present disclosure. FIG. 11C is a cross-sectional view of the sensor layer 200 taken along the line II-II' illustrated in FIGS. 11A and 11B according to an embodiment of the present disclosure.

Referring to FIGS. 7, 11A, 11B, and 11C, each of the first electrode groups 210G may include a plurality of first sensing patterns 211 and a plurality of first bridge patterns 212. The first sensing patterns 211 may be spaced apart from each other in the second direction DR2. The first bridge patterns 212 may extend in the second direction DR2, and may be electrically connected to the first sensing patterns 211 through a first contact CNa1. FIGS. 11A and 11B illustratively show that two adjacent first sensing patterns 211 are electrically connected to each other through two first bridge patterns 212, but the present disclosure is not particularly limited thereto. For example, the two adjacent first sensing patterns 211 may be electrically connected to each other through one first bridge pattern 212, or may be electrically connected to each other through three or more first bridge patterns 212.

FIG. 11B illustratively shows the first split electrode 220-D1 from among the first split electrode D1 and the second split electrode D2. The first sensing patterns 211 that are adjacent to each other in the second direction DR2 may be spaced apart from each other with the first split electrode 220-D1 interposed therebetween. In an embodiment of the present disclosure, the first sensing patterns 211, the first split electrode 220-D1, and the second split electrode D2 may be included in the second conductive layer 204SUa, and the first bridge patterns 212 may be included in the first conductive layer 202SUa. The first bridge patterns 212 may be insulated from and cross or intersect the first split electrode D1 or the second split electrode D2 that overlaps with the first bridge patterns 212.

Each of the first auxiliary electrodes 230S included in the third electrode group 230G may extend in the second direction DR2. The first auxiliary electrodes 230S may be included in the first conductive layer 202SUa. One or more holes may be defined in each of the first auxiliary electrodes 230S. One first bridge pattern 212 may be disposed in one hole. Thus, the first bridge pattern 212 may be electrically insulated from the first auxiliary electrodes 230S.

Each of the second auxiliary electrodes 240S included in the fourth electrode group 240G may include a plurality of second sensing patterns 241a and a plurality of second bridge patterns 242a. The second sensing patterns 241a may be spaced apart from each other in the first direction DR1. The second bridge patterns 242a may extend in the first direction DR1, and may be electrically connected to the second sensing patterns 241a through a second contact CNb1.

FIGS. 11A and 11B illustratively show that two adjacent second sensing patterns 241a are electrically connected to each other through two second bridge patterns 242a, but the present disclosure is not particularly limited thereto. For example, the two adjacent second sensing patterns 241a may be electrically connected to each other through one second bridge pattern 242a, or may be electrically connected to each other through three or more second bridge patterns 242a.

In an embodiment of the present disclosure, the second sensing patterns 241a and the first auxiliary electrodes 230S may be included in the first conductive layer 202SUa, and the second bridge patterns 242a may be included in the second conductive layer 204SUa. The second bridge patterns 242a may be insulated from and cross or intersect the first auxiliary electrodes 230S overlapping with the second bridge patterns 242a.

Referring to FIGS. 11A and 11B, in the second conductive layer 204SU inside one sensing unit SU, an area occupied by the components included in the first electrode group 210G and the second electrode group 220G may be greater than an area occupied by the components included in the third electrode group 230G and the fourth electrode group 240G. A change in a capacitance due to the first input 2000 (e.g., see FIG. 4) may be greater as a distance therefrom becomes shorter. Thus, the components for sensing the first input 2000 (e.g., see FIG. 4) may be arranged in a relatively larger area in a layer that is adjacent to a surface of the electronic device 1000 (e.g., see FIG. 1A). As a result, a touch performance may be improved.

In an embodiment of the present disclosure, the first conductive layer 202SUa may further include first dummy patterns DMP1, and the second conductive layer 204SUa may further include second dummy patterns DMP2. Each of the first dummy patterns DMP1 and the second dummy patterns DMP2 may be floating or electrically floating. Each of the first dummy patterns DMP1 and the second dummy patterns DMP2 may be divided into a plurality of conductive patterns. For example, one first dummy pattern DMP1 may include a plurality of floating dummy patterns that are spaced apart (e.g., that are separated or electrically separated) from each other.

Referring to FIG. 11C, an area of the first auxiliary electrode 230S and an area of the first sensing pattern 211 may be variously adjusted as needed or desired. For example, a position of a boundary between the first auxiliary electrode 230S and the first dummy patterns DMP1 and a position of a boundary between the first sensing pattern 211 and the second dummy patterns DMP2 may be variously adjusted as needed or desired. In this case, an area of an overlapping area in which the first auxiliary electrode 230S and the first sensing pattern 211 overlap with each other may be adjusted as needed or desired, and thus, a magnitude of a capacitance of a coupling capacitor C-CP between the first auxiliary electrode 230S and the first sensing pattern 211 may be adjusted as needed or desired.

FIG. 12A is an enlarged plan view of the area BB' illustrated in FIG. 10A. FIG. 12B is an enlarged plan view of the area CC' illustrated in FIG. 10B.

Referring to FIGS. 10A, 10B, 12A, and 12B, each of the first electrode groups 210G, the second electrode groups 220G, the third electrode groups 230G, the fourth electrode groups 240G, and the dummy patterns DMP may have a mesh structure. Each of the mesh structures may include a plurality of mesh lines. Each of the plurality of mesh lines may have a shape extending in a suitable direction (e.g., a predetermined direction), and may be connected to one another. The shape may include various suitable shapes, such as a straight line, a line having a protrusion, and an uneven line. Openings in which the mesh structures are not arranged may be defined (e.g., may be provided or formed) in each of the first electrode groups 210G, the second electrode groups 220G, the third electrode groups 230G, the fourth electrode groups 240G, and the dummy patterns DMP.

FIGS. 12A and 12B illustratively show that the mesh structure includes the mesh lines extending in a first intersection direction CDR1 that crosses or intersects the first direction DR1 and the second direction DR2, and the mesh lines extending in a second intersection direction CDR2 that crosses or intersects the first intersection direction CDR1. However, the present disclosure is not limited thereto, and the extension direction of the mesh lines constituting the mesh structure is not particularly limited to that illustrated in FIGS. 12A and 12B. For example, the mesh structure may include mesh lines (e.g., may include only mesh lines) extending in the first direction DR1 and the second direction DR2, or may include mesh lines extending in the first direction DR1, the second direction DR2, the first intersection direction CDR1, and the second intersection direction CDR2. In other words, the mesh structure may be variously modified into various suitable forms as needed or desired.

FIG. 13 is a view illustrating some electrode groups inside the sensor layer 200 according to an embodiment of the present disclosure. FIG. 13 schematically illustrates the second electrode groups 220G and the fourth electrode groups 240G from among the first to fourth electrode groups 210G, 220G, 230G, and 240G (e.g., see FIG. 7).

Referring to FIGS. 7 and 13, each of the second electrode groups 220G may include the first split electrode D1 and the second split electrode D2. According to an embodiment of the present disclosure, inside one second electrode group 220G, a length d1$a$ of the first split electrode D1 in the extension direction (e.g., the long axis direction, such as the first direction DR1) may be different from a length d2$a$ of the second split electrode D2 in the extension direction (e.g., the long axis direction).

FIG. 14 is a view illustrating some electrode groups inside the sensor layer 200 according to an embodiment of the present disclosure. FIG. 14 schematically illustrates the second electrode groups 220G and the fourth electrode groups 240G from among the first to fourth electrode groups 210G, 220G, 230G, and 240G (e.g., see FIG. 7).

Referring to FIGS. 7 and 14, each of the second electrode groups 220G may include the first split electrode D1 and the second split electrode D2. According to an embodiment of the present disclosure, at least some of the first split electrodes D1 of the second electrode groups 220G may have different lengths (e.g., lengths in the extension direction, the long axis direction, or the first direction DR1) from each other. At least some of the second split electrodes D2 of the second electrode groups 220G may have different lengths (e.g., lengths in the extension direction, the long axis direction, or the first direction DR1) from each other.

For example, the lengths of the $(1\text{-}1)^{th}$ to $(1\text{-}5)^{th}$ split electrodes D11, D12, D13, D14, and D15 may be different from each other, and the lengths of the $(2\text{-}1)^{th}$ to $(2\text{-}5)^{th}$ split electrodes D21, D22, D23, D24, and D25 may be different from each other.

For example, the lengths of the $(1\text{-}1)^{th}$ to $(1\text{-}5)^{th}$ split electrodes D11, D12, D13, D14, and D15 may have sequentially increased lengths, and the lengths of the $(2\text{-}1)^{th}$ to $(2\text{-}5)^{th}$ split electrodes D21, D22, D23, D24, and D25 may have sequentially decreased lengths. Within the second electrode groups 220G, gaps GP' defined between the first and second split electrodes D1 and D2 that are adjacent to each other may be arranged along a diagonal direction of (e.g., between) the first direction DR1 and the second direction DR2.

The fifth trace line 240$t$ may include the $(5\text{-}1)^{th}$ trace lines 240$t$1 and the $(5\text{-}2)^{th}$ trace line 240$t$2. In an embodiment of the present disclosure, at least some of the $(5\text{-}1)^{th}$ trace lines 240$t$1 may extend within the gap GP' between the first and second split electrodes D1 and D2 that are adjacent to each other. In an embodiment, the gaps GP' inside the second electrode groups 220G are arranged along the diagonal direction, and thus, each of the $(5\text{-}1)^{th}$ trace lines 240$t$1 may include a bent portion. However, the present disclosure is not limited to the $(5\text{-}1)^{th}$ trace lines 240$t$1 illustrated in FIG. 14, and the shape and/or the extension direction of the $(5\text{-}1)^{th}$ trace lines 240$t$1 may be variously modified as needed or desired.

FIG. 15 is a view illustrating some electrode groups inside the sensor layer 200 according to an embodiment of the present disclosure. FIG. 15 schematically shows the second electrode groups 220G and the fourth electrode groups 240G from among the first to fourth electrode groups 210G, 220G, 230G, and 240G (e.g., see FIG. 7).

Referring to FIGS. 7 and 15, in an embodiment of the present disclosure, at least some of the second trace lines 220t may overlap with the display area 100A (e.g., see FIG. 4) or the sensing area 200A. The second trace lines 220t may extend to overlap with, or to be insulated from and cross or intersect, the second electrode groups 220G.

The second trace lines 220t may be electrically connected to the second electrode groups 220G in a two-to-one correspondence. The second trace lines 220t may include the first split trace lines 220t1 electrically connected to the first split electrodes D1 in a one-to-one correspondence, and the second split trace lines 220t2 electrically connected to the second split electrodes D2 in a one-to-one correspondence. At least some of the first split trace lines 220t1 may overlap with, or may be insulated from and cross or intersect, at least some of the first split electrodes D1. At least some of the second split trace lines 220t2 may overlap with, or may be insulated from and cross or intersect, at least some of the second split electrodes D2.

FIG. 15 illustratively shows that each of the first split trace lines 220t1 is connected to a corresponding first split electrode D1 through a first contact CNT1, and each of the second split trace lines 220t2 is connected to a corresponding second split electrode D2 through a second contact CNT2. However, the present disclosure is not limited thereto, and each of the first split trace lines 220t1 may be disposed at (e.g., in or on) the same layer as that of the corresponding first split electrode D1 and have an integral shape, and each of the second split trace lines 220t2 may be disposed at (e.g., in or on) the same layer as that of the corresponding second split electrode D2 and have an integral shape.

According to an embodiment, the $(1\text{-}5)^{th}$ split trace line 15, the $(1\text{-}4)^{th}$ split trace line 14, the $(1\text{-}3)^{th}$ split trace line 13, the $(1\text{-}2)^{th}$ split trace line 12, and the $(1\text{-}1)^{th}$ split trace line 11 may be sequentially arranged along the first direction DR1. The $(2\text{-}1)^{th}$ split trace line 21, the $(2\text{-}2)^{th}$ split trace line 22, the $(2\text{-}3)^{th}$ split trace line 23, the $(2\text{-}4)^{th}$ split trace line 24, and the $(2\text{-}5)^{th}$ split trace line 25 may be sequentially arranged in the first direction DR1. Accordingly, first contacts CNT1 may be arranged along a diagonal direction (e.g., hereinafter, referred to as a first diagonal direction) of the first direction DR1 and the second direction DR2, and second contacts CNT2 may be arranged along a second diagonal direction that crosses or intersects the first diagonal direction. However, the arrangement sequences of the first split trace lines 220t1 and the second split trace lines 220t2 or the arrangement forms of the first contacts CNT1 and the second contacts CNT2 are not limited thereto.

According to an embodiment, all the second trace lines 220t and the fifth trace line 240t are arranged, such that at least portions thereof overlap with the sensing area 200A, and thus, an area of the peripheral area 200NA may be decreased. As a result, the area of the front surface of the electronic device 1000 (e.g., see FIG. 1A), which is occupied by the peripheral area 200NA, may be decreased, and a narrower bezel may be implemented.

FIG. 16 is a view illustrating some electrode groups inside the sensor layer 200 according to an embodiment of the present disclosure. FIG. 16 schematically illustrates the second electrode groups 220G and fourth electrode groups 240Ga from among the first to fourth electrode groups 210G, 220G, 230G, and 240G (e.g., see FIG. 7).

Referring to FIGS. 7 and 16, the fourth electrode groups 240Ga may include a plurality of second auxiliary electrodes 240Sa arranged along the second direction DR2. In an embodiment of the present disclosure, each of the fourth electrode groups 240Ga may include one second auxiliary electrode 240Sa. Each of the second auxiliary electrodes 240Sa may include a plurality of auxiliary split electrodes SD1 and SD2. In an embodiment, each of the second auxiliary electrodes 240Sa may include the first auxiliary split electrode SD1 and the second auxiliary split electrode SD2 that are spaced apart from each other in the first direction DR1. Each of the second auxiliary electrodes 240Sa may include electrodes that are divided into two parts. Each of the first auxiliary split electrode SD1 and the second auxiliary split electrode SD2 may extend in the first direction DR1. The first auxiliary split electrode SD1 and the second auxiliary split electrode SD2 included in one second electrode group 220G may sense the same axis (e.g., the axis extending in the first direction DR1). The first auxiliary split electrode SD1 may overlap with a corresponding first split electrode D1 of the second electrode group 220G, and the second auxiliary split electrode SD2 may overlap with a corresponding second split electrode D2 of the second electrode group 220G.

In an embodiment, a $(2\text{-}1)^{th}$ auxiliary electrode 240S1a may include a $(1\text{-}1)^{th}$ auxiliary split electrode SD11 and a $(2\text{-}1)^{th}$ auxiliary split electrode SD21 that are spaced apart from each other in the first direction DR1. A $(2\text{-}2)^{th}$ auxiliary electrode 240S2a may include a $(1\text{-}2)^{th}$ auxiliary split electrode SD12 and a $(2\text{-}2)^{th}$ auxiliary split electrode SD22 that are spaced apart from each other in the first direction DR1. A $(2\text{-}3)^{th}$ auxiliary electrode 240S3a may include a $(1\text{-}3)^{th}$ auxiliary split electrode SD13 and a $(2\text{-}3)^{th}$ auxiliary split electrode SD23 that are spaced apart from each other in the first direction DR1. A $(2\text{-}4)^{th}$ auxiliary electrode 240S4a may include a $(1\text{-}4)^{th}$ auxiliary split electrode SD14 and a $(2\text{-}4)^{th}$ auxiliary split electrode SD24 that are spaced apart from each other in the first direction DR1. A $(2\text{-}5)^{th}$ auxiliary electrode 240S5a may include a $(1\text{-}5)^{th}$ auxiliary split electrode SD15 and a $(2\text{-}5)^{th}$ auxiliary split electrode SD25 that are spaced apart from each other in the first direction DR1. The first auxiliary split electrodes SD1 inside the fourth electrode groups 240Ga may include the $(1\text{-}1)^{th}$ to $(1\text{-}5)^{th}$ auxiliary split electrodes SD11, SD12, SD13, SD14, and SD15, and the second auxiliary split electrodes SD2 inside the fourth electrode groups 240Ga may include the $(2\text{-}1)^{th}$ to $(2\text{-}5)^{th}$ auxiliary split electrodes SD21, SD22, SD23, SD24, and SD25.

FIG. 16 illustratively shows that a length d1-1 of the first auxiliary split electrode SD1 in the extension direction (e.g., the long axis direction, such as the first direction DR1) is the same or substantially the same as a length d2-1 of the second auxiliary split electrode SD2 in the extension direction (e.g., the long axis direction). Further, in FIG. 16, all the first auxiliary split electrodes SD1 of the fourth electrode groups 240Ga have the same length d1-1 as each other, and all the second auxiliary split electrodes SD2 of the fourth electrode groups 240Ga have the same length d2-1 as each other. However, the present disclosure is not limited thereto. For example, the length of the first auxiliary split electrode SD1 may be different from the length of the second auxiliary split electrode SD2. As another example, at least some of the first auxiliary split electrodes SD1 of the fourth electrode groups 240Ga may have different lengths from each other, and at least some of the second auxiliary split electrodes SD2 of the fourth electrode groups 240Ga may have different lengths from each other.

A fifth trace line 240ta may include a $(5\text{-}1)^{th}$ trace line 240t1a and a $(5\text{-}2)^{th}$ trace line 240t2a.

In an embodiment of the present disclosure, the $(5\text{-}1)^{th}$ trace line $240t1a$ may be electrically connected to all of the first auxiliary split electrodes SD1 of the second auxiliary electrodes 240Sa. The $(5\text{-}1)^{th}$ trace line $240t1a$ may be connected to each of areas of the first auxiliary split electrodes SD1, which are adjacent to the second auxiliary split electrodes SD2. For example, the $(5\text{-}1)^{th}$ trace line $240t1a$ may be connected to the first auxiliary split electrodes SD1 at ends of the first auxiliary split electrodes SD1, which are adjacent to the second auxiliary split electrodes SD2.

The $(5\text{-}2)^{th}$ trace line $240t2a$ may be electrically connected to all of the second auxiliary split electrodes SD2 of the second auxiliary electrodes 240Sa. The $(5\text{-}2)^{th}$ trace line $240t2a$ may be connected to each of areas of the second auxiliary split electrodes SD2, which are adjacent to the first auxiliary split electrodes SD1. For example, the $(5\text{-}2)^{th}$ trace line $240t2a$ may be connected to the second auxiliary split electrodes SD2 at ends of the second auxiliary split electrodes SD2, which are adjacent to the first auxiliary split electrodes SD1. Each of the $(5\text{-}1)^{th}$ trace line $240t1a$ and the $(5\text{-}2)^{th}$ trace line $240t2a$ may extend across gaps GP-1 between the first auxiliary split electrodes SD1 and the second auxiliary split electrodes SD2. Each of the $(5\text{-}1)^{th}$ trace line $240t1a$ and the $(5\text{-}2)^{th}$ trace line $240t2a$ may extend across the gaps GP-1 between the first split electrodes D1 and the second split electrodes D2.

FIG. 17 is a view illustrating some electrode groups inside the sensor layer 200 according to an embodiment of the present disclosure. FIG. 17 schematically illustrates second electrode groups 220Ga and the fourth electrode groups 240G from among the first to fourth electrode groups 210G, 220G, 230G, and 240G (e.g., see FIG. 7).

Referring to FIGS. 7 and 17, each of the second electrode groups 220Ga may include the first split electrode D1, the second split electrode D2, and a third split electrode D3. In other words, each of the second electrode groups 220Ga may include electrodes that are divided into three parts. The first split electrode D1, the second split electrode D2, and the third split electrode D3 may be spaced apart from each other in the first direction DR1. Each of the first split electrode D1, the second split electrode D2, and the third split electrode D3 may extend in the first direction DR1. The first split electrode D1, the second split electrode D2, and the third split electrode D3 included in one second electrode group 220Ga may sense the same axis (e.g., the axis extending in the first direction DR1).

In an embodiment, a $(2\text{-}1)^{th}$ electrode group 220G1a may include $(1\text{-}1)^{th}$, $(2\text{-}1)^{th}$, and $(3\text{-}1)^{th}$ split electrodes D11, D21, and D31 that are spaced apart from each other in the first direction DR1. A $(2\text{-}2)^{th}$ electrode group 220G2a may include $(1\text{-}2)^{th}$, $(2\text{-}2)^{th}$, and $(3\text{-}2)^{th}$ split electrodes D12, D22, and D32 that are spaced apart from each other in the first direction DR1. A $(2\text{-}3)^{th}$ electrode group 220G3a may include $(1\text{-}3)^{th}$, $(2\text{-}3)^{th}$, and $(3\text{-}3)^{th}$ split electrodes D13, D23, and D33 that are spaced apart from each other in the first direction DR1. A $(2\text{-}4)^{th}$ electrode group 220G4a may include $(1\text{-}4)^{th}$, $(2\text{-}4)^{th}$, and $(3\text{-}4)^{th}$ split electrodes D14, D24, and D34 that are spaced apart from each other in the first direction DR1. A $(2\text{-}5)^{th}$ electrode group 220G5a may include $(1\text{-}5)^{th}$, $(2\text{-}5)^{th}$, and $(3\text{-}5)^{th}$ split electrodes D15, D25, and D35 that are spaced apart from each other in the first direction DR1. The first split electrodes D1 inside the second electrode groups 220Ga may include the $(1\text{-}1)^{th}$ to $(1\text{-}5)^{th}$ split electrodes D11, D12, D13, D14, and D15. The second split electrodes D2 inside the second electrode groups 220Ga may include the $(2\text{-}1)^{th}$ to $(2\text{-}5)^{th}$ split electrodes D21, D22, D23, D24, and D25. The third split electrodes D3 inside the second electrode groups 220Ga may include the $(3\text{-}1)^{th}$ to $(3\text{-}5)^{th}$ split electrodes D31, D32, D33, D34, and D35.

FIG. 17 illustratively shows that the length of the first split electrode D1 in the extension direction (e.g., the long axis direction, such as the first direction DR1), the length of the second split electrode D2 in the extension direction (e.g., the long axis direction), and a length of the third split electrode D3 in the extension direction (e.g., the long axis direction) are the same or substantially the same as each other. However, the present disclosure is not limited thereto, and the length of the first split electrode D1, the length of the second split electrode D2, and the length of the third split electrode D3 may be different from each other.

FIG. 17 illustratively shows that all of the first split electrodes D1 of the second electrode groups 220Ga have the same or substantially the same length as each other, all of the second split electrodes D2 of the second electrode groups 220Ga have the same or substantially the same length as each other, and all of the third split electrodes D3 of the second electrode groups 220Ga have the same or substantially the same length as each other. However, the present disclosure is not limited thereto, and at least some of the first split electrodes D1 of the second electrode groups 220Ga may have different lengths from each other, at least some of the second split electrodes D2 of the second electrode groups 220Ga may have different lengths from each other, and at least some of the third split electrodes D3 of the second electrode groups 220Ga may have different lengths from each other.

Second trace lines $220ta$ may be electrically connected to the second electrode groups 220Ga in a three-to-one correspondence. The second trace lines $220ta$ may include the first split trace lines $220t1$, the second split trace lines $220t2$, and third split trace lines $220t3$. The first split trace lines $220t1$ may be electrically connected to the first split electrodes D1 in a one-to-one correspondence. The second split trace lines $220t2$ may be electrically connected to the second split electrodes D2 in a one-to-one correspondence. The third split trace lines $220t3$ may be electrically connected to the third split electrodes D3 in a one-to-one correspondence.

In an embodiment, the first split trace lines $220t1$ may include the $(1\text{-}1)^{th}$ to $(1\text{-}5)^{th}$ split trace lines 11, 12, 13, 14, and 15 that are electrically connected to the $(1\text{-}1)^{th}$ to $(1\text{-}5)^{th}$ split electrodes D11, D12, D13, D14, and D15, respectively. The second split trace lines $220t2$ may include the $(2\text{-}1)^{th}$ to $(2\text{-}5)^{th}$ split trace lines 21, 22, 23, 24, and 25 that are electrically connected to the $(2\text{-}1)^{th}$ to $(2\text{-}5)^{th}$ split electrodes D21, D22, D23, D24, and D25, respectively. The third split trace lines $220t3$ may include $(3\text{-}1)^{th}$ to $(3\text{-}5)^{th}$ split trace lines 31, 32, 33, 34, and 35 that are electrically connected to the $(3\text{-}1)^{th}$ to $(3\text{-}5)^{th}$ split electrodes D31, D32, D33, D34, and D35, respectively.

According to an embodiment of the present disclosure, at least portions of the second trace lines $220ta$ may overlap with the sensing area 200A or the display area 100A (e.g., see FIG. 4). The second trace lines $220ta$ may extend to overlap with, or to be insulated from and cross or intersect, the second electrode groups 220Ga.

FIG. 17 illustratively shows that each of the first split trace lines $220t1$ is connected to a corresponding first split electrode D1 through a first contact CNT1a, each of the second split trace lines $220t2$ is connected to a corresponding second split electrode D2 through a second contact CNT2a, and each of the third split trace lines $220t3$ is connected to a corresponding third split electrode D3 through a third contact CNT3a. Further, it is illustratively shown that the second contacts CNT2a are arranged along the diagonal direction (e.g., the first diagonal direction) of the first direction DR1 and the second direction DR2, and the first contacts CNT1a and the third contacts CNT3a are arranged along the second diagonal direction that crosses or intersects the first diagonal direction. However, the present disclosure is not limited thereto. For example, each of the first split trace lines 220t1 may be disposed at (e.g., in or on) the same layer as that of the corresponding first split electrode D1 and may be provided to have an integral shape, each of the second split trace lines 220t2 may be disposed at (e.g., in or on) the same layer as that of the corresponding second split electrode D2 and may be provided to have an integral shape, and each of the third split trace lines 220t3 may be disposed at (e.g., in or on) the same layer as that of the corresponding third split electrode D3 and may be provided to have an integral shape. As another example, the arrangement form of the first contacts CNT1a, the second contacts CNT2a, and the third contacts CNT3a may be variously modified as needed or desired.

FIG. 17 illustrates that at least portions of all of the second trace lines 220ta overlap with the sensing area 200A, but according to another embodiment, the portions of the second trace lines 220ta may be arranged not to cross or intersect the second electrode groups 220Ga and to overlap with the peripheral area 200NA.

The fourth electrode groups 240G may include the plurality of second auxiliary electrodes 240S arranged along the second direction DR2. In an embodiment, each of the fourth electrode groups 240G may include one second auxiliary electrode 240S. Each of the second auxiliary electrodes 240S may extend in the first direction DR1. At least a portion of each of the second auxiliary electrodes 240S may overlap with corresponding first to third split electrodes D1, D2, and D3 of the second electrode group 220Ga.

At least a portion of the fifth trace line 240t may overlap with the sensing area 200A or the display area 100A (e.g., see FIG. 4). The at least a portion of the fifth trace line 240t may extend within a gap between the first and second split electrodes D1 and D2, or within a gap between the second and third split electrodes D2 and D3.

FIG. 18 is a view illustrating some electrode groups inside the sensor layer 200 according to an embodiment of the present disclosure. FIG. 18 schematically illustrates the second electrode groups 220Ga and fourth electrode groups 240Gb from among the first to fourth electrode groups 210G, 220G, 230G, and 240G (e.g., see FIG. 7).

Referring to FIGS. 7 and 18, each of the second electrode groups 220Ga may include the first split electrode D1, the second split electrode D2, and the third split electrode D3, which are spaced apart from each other in the first direction DR1.

In an embodiment of the present disclosure, at least portions of the second trace lines 220ta may overlap with the sensing area 200A or the display area 100A (e.g., see FIG. 4). The second trace lines 220ta may extend to overlap with, or to be insulated from and cross or intersect, the second electrode groups 220Ga. The second trace lines 220ta may include the first split trace lines 220t1 electrically connected to the first split electrodes D1 in a one-to-one correspondence, the second split trace lines 220t2 electrically connected to the second split electrodes D2 in a one-to-one correspondence, and the third split trace lines 220t3 electrically connected to the third split electrodes D3 in a one-to-one correspondence.

The fourth electrode group 240Gb may include a plurality of second auxiliary electrodes 240Sb arranged along the second direction DR2. In an embodiment, each of the fourth electrode groups 240Gb may include one second auxiliary electrode 240Sb. Each of the second auxiliary electrodes 240Sb may include the first auxiliary split electrode SD1, the second auxiliary split electrode SD2, and a third auxiliary split electrode SD3, which are spaced apart from each other in the first direction DR1. Each of the second auxiliary electrodes 240Sb may include electrodes that are divided into three parts. Each of the first to third auxiliary split electrodes SD1, SD2, and SD3 may extend in the first direction DR1. The first to third auxiliary split electrodes SD1, SD2, and SD3 included in one fourth electrode group 240Gb may sense the same axis (e.g., the axis extending in the first direction DR1). The first auxiliary split electrode SD1 may overlap with a corresponding first split electrode D1 of the second electrode group 220Ga, the second auxiliary split electrode SD2 may overlap with a corresponding second split electrode D2 of the second electrode group 220Ga, and the third auxiliary split electrode SD3 may overlap with a corresponding third split electrode D3 of the second electrode group 220Ga.

In an embodiment, a $(2\text{-}1)^{th}$ auxiliary electrode 240S1b may include the $(1\text{-}1)^{th}$, $(2\text{-}1)^{th}$, and $(3\text{-}1)^{th}$ auxiliary split electrodes SD11, SD21, and SD31. A $(2\text{-}2)^{th}$ auxiliary electrode 240S2b may include the $(1\text{-}2)^{th}$, $(2\text{-}2)^{th}$, and $(3\text{-}2)^{th}$ auxiliary split electrodes SD12, SD22, and SD32. A $(2\text{-}3)^{th}$ auxiliary electrode 240S3b may include the $(1\text{-}3)^{th}$, $(2\text{-}3)^{th}$, and $(3\text{-}3)^{th}$ auxiliary split electrodes SD13, SD23, and SD33. A $(2\text{-}4)^{th}$ auxiliary electrode 240S4b may include the $(1\text{-}4)^{th}$, $(2\text{-}4)^{th}$, and $(3\text{-}4)^{th}$ auxiliary split electrodes SD14, SD24, and SD34. A $(2\text{-}5)^{th}$ auxiliary electrode 240S5b may include the $(1\text{-}5)^{th}$, $(2\text{-}5)^{th}$, and $(3\text{-}5)^{th}$ auxiliary split electrodes SD15, SD25, and SD35. The first auxiliary split electrodes SD1 inside the fourth electrode groups 240Gb may include the $(1\text{-}1)^{th}$ to $(1\text{-}5)^{th}$ auxiliary split electrodes SD11, SD12, SD13, SD14, and SD15, the second auxiliary split electrodes SD2 inside the fourth electrode groups 240Gb may include the $(2\text{-}1)^{th}$ to $(2\text{-}5)^{th}$ auxiliary split electrodes SD21, SD22, SD23, SD24, and SD25, and the third auxiliary split electrodes SD3 inside the fourth electrode groups 240Gb may include the $(3\text{-}1)^{th}$ to $(3\text{-}5)^{th}$ auxiliary split electrodes SD31, SD32, SD33, SD34, and SD35.

A fifth trace line 240tb may include a $(5\text{-}1)^{th}$ trace line 240t1b, a $(5\text{-}2)^{th}$ trace line 240t2b, and a $(5\text{-}3)^{th}$ trace line 240t3b. In an embodiment of the present disclosure, the $(5\text{-}1)^{th}$ trace line 240t1b may be electrically connected to all of the first auxiliary split electrodes SD1 of the second auxiliary electrodes 240Sb. The $(5\text{-}2)^{th}$ trace line 240t2b may be electrically connected to all of the second auxiliary split electrodes SD2 of the second auxiliary electrodes 240Sb. The $(5\text{-}3)^{th}$ trace line 240t3b may be electrically connected to all of the third auxiliary split electrodes SD3 of the second auxiliary electrodes 240Sb. As used herein, the $(5\text{-}3)^{th}$ trace line 240t3b may be referred to as a $(2\text{-}3)^{th}$ line.

At least a portion of the fifth trace line 240t may overlap with the sensing area 200A or the display area 100A (e.g., see FIG. 4). At least a portion of each of the fifth trace lines 240tb may extend within a gap between the first and second auxiliary split electrodes SD1 and SD2, or within a gap between the second and third auxiliary split electrodes SD2 and SD3. The at least a portion of each of the fifth trace lines 240tb may extend within the gap between the first and second split electrodes D1 and D2, or within the gap between the second and third split electrodes D2 and D3. In an embodiment, each of the $(5\text{-}1)^{th}$ and $(5\text{-}2)^{th}$ trace lines 240t1b and 240t2b may extend across gaps between the first auxiliary split electrodes SD1 and the second auxiliary split electrodes SD2. The (5-3)$^{th}$ trace line 240t3b may extend across gaps between the second auxiliary split electrodes SD2 and the third auxiliary split electrodes SD3.

FIG. 19 is a view illustrating an operation of the sensor driving unit 200C according to an embodiment of the present disclosure. FIG. 20 is a view illustrating an operation of the sensor driving unit 200C according to an embodiment of the present disclosure.

Referring to FIGS. 5 and 19, the sensor driving unit 200C may be selectively driven in one of a first operation mode DMD1, a second operation mode DMD2, and a third operation mode DMD3.

The first operation mode DMD1 may be referred to as a touch and pen waiting mode. The second operation mode DMD2 may be referred to as a touch activation and pen waiting mode. The third operation mode DMD3 may be referred to as a pen activation mode. The first operation mode DMD1 may be a mode that waits for the first input 2000 and the second input 3000. The second operation mode DMD2 may be a mode that senses the first input 2000 and waits for the second input 3000. The third operation mode DMD3 may be a mode that senses the second input 3000.

In an embodiment of the present disclosure, the sensor driving unit 200C may be first driven in the first operation mode DMD1. When the first input 2000 is sensed in the first operation mode DMD1, the sensor driving unit 200C may be switched (e.g., may be changed) to the second operation mode DMD2. As another example, when the second input 3000 is sensed in the first operation mode DMD1, the sensor driving unit 200C may be switched (e.g., may be changed) to the third operation mode DMD3.

In an embodiment of the present disclosure, when the second input 3000 is sensed in the second operation mode DMD2, the sensor driving unit 200C may be switched to the third operation mode DMD3. When the first input 2000 is released (e.g., is not sensed) in the second operation mode DMD2, the sensor driving unit 200C may be switched to the first operation mode DMD1. When the second input 3000 is released (e.g., is not sensed) in the third operation mode DMD3, the sensor driving unit 200C may be switched to the first operation mode DMD1.

FIG. 20 illustratively shows some operations in the first to third operation modes DMD1, DMD2, and DMD3 in an order of time "t."

Referring to FIGS. 5, 19, and 20, in the first operation mode DMD1, the sensor driving unit 200C may be repeatedly driven in a second mode MD2-d and a first mode MD1-d. During the second mode MD2-d, the sensor layer 200 may be scan-driven to detect the second input 3000. During the first mode MD1-d, the sensor layer 200 may be scan-driven to detect the first input 2000. FIG. 20 illustratively shows that the sensor driving unit 200C is operated in the first mode MD1-d continuously after the second mode MD2-d, but the order thereof is not limited thereto.

In the second operation mode DMD2, the sensor driving unit 200C may be repeatedly driven in the second mode MD2-d and a first mode MD1. During the second mode MD2-d, the sensor layer 200 may be scan-driven to detect the second input 3000. During the first mode MD1, the sensor layer 200 may be scan-driven to detect coordinates by the first input 2000.

In the third operation mode DMD3, the sensor driving unit 200C may be driven in the second mode MD2. During the second mode MD2, the sensor layer 200 may be scan-driven to detect coordinates by the second input 3000. In the third operation mode DMD3, the sensor driving unit 200C may not be operated in the first mode MD1-d or MD1 until the second input 3000 is released (e.g., is not sensed).

Referring further to FIG. 7 together, in the first mode MD1-d of the first operation mode DMD1 and the first mode MD1 of the second operation mode DMD2, all of the third electrode groups 230G and the fourth electrode group 240G may be grounded, or a constant voltage may be applied thereto. As another example, in the first mode MD1-d and the first mode MD1, all of the third electrode groups 230G and the fourth electrode group 240G may be floating. As another example, in the first mode MD1-d and the first mode MD1, a signal having the same phase as that of a transmission signal provided to the first electrode groups 210G may be applied to the third electrode groups 230G and the fourth electrode group 240G. In this case, a touch noise may be prevented or substantially prevented from being introduced through the third electrode groups 230G and the fourth electrode group 240G.

In the second mode MD2-d of the first operation mode DMD1 or the second operation mode DMD2 and the second mode MD2 of the third operation mode DMD3, one end of each of the third electrode groups 230G and the fourth electrode group 240G may be floating. Further, in the second mode MD2-d and the second mode MD2, another end (e.g., an opposite end) of each of the third electrode groups 230G and the fourth electrode group 240G may be grounded or floating. Thus, a compensation for the sensing signal may be maximized or increased by a coupling between the first electrode groups 210G and the third electrode groups 230G and a coupling between the second electrode groups 220G and the fourth electrode groups 240G.

FIG. 21 is a view illustrating a first mode according to an embodiment of the present disclosure.

Referring to FIGS. 5, 20, and 21, the first mode MD1-d of the first operation mode DMD1 and the first mode MD1 of the second operation mode DMD2 may include a mutual capacitance detecting mode. FIG. 21 illustrates the mutual capacitance detecting mode in the first mode MD1-d of the first operation mode DMD1 and the first mode MD1 of the second operation mode DMD2.

In the mutual capacitance detecting mode, the sensor driving unit 200C may sequentially provide a transmission signal TX to the first electrode groups 210G, and may detect coordinates of the first input 2000 using a reception signal RX detected through the second electrode groups 220G. For example, the sensor driving unit 200C may calculate input coordinates by sensing a change in a mutual capacitance between the first electrode groups 210G and the second electrode groups 220G.

FIG. 21 illustratively shows that the transmission signal TX is provided to one first electrode group 210G, and the reception signal RX is output from the second electrode groups 220G. To clearly express the signals, FIG. 21 shows the one first electrode group 210G, to which the transmission signal TX is provided, in bold. The sensor driving unit 200C may detect input coordinates of the first input 2000 by sensing a change in the capacitance between the first electrode groups 210G and the second electrode groups 220G.

In an embodiment of the present disclosure, at least one of the first mode MD1-d of the first operation mode DMD1 or the first mode MD1 of the second operation mode DMD2 may further include a self-capacitance detecting mode. In the self-capacitance detecting mode, the sensor driving unit 200C may output driving signals to the first electrode groups 210G and the second electrode groups 220G, and may calculate the input coordinates by sensing the change in the capacitance between the first electrode groups 210G and the second electrode groups 220G. An operation of outputting the driving signals to the first electrode groups 210G and the second electrode groups 220G may be performed separately at different timings from each other, or may be superposed in time.

FIG. 22 is a view illustrating a second mode according to an embodiment of the present disclosure. FIG. 23A is a graph illustrating a waveform of a first signal according to an embodiment of the present disclosure. FIG. 23B is a graph illustrating a waveform of a second signal according to an embodiment of the present disclosure. FIG. 22 illustrates the second mode, or more specifically, a charging drive mode, according to an embodiment of the present disclosure.

Referring to FIGS. 5, 22, 23A, and 23B, the second mode MD2 may include the charging drive mode. The charging drive mode may include a searching charging drive mode and a tracking charging drive mode.

The searching charging drive mode may be a drive mode before a position of the pen is sensed. Thus, a first signal SG1 or a second signal SG2 may be provided to all channels included in the sensor layer 200. In other words, in the searching charging drive mode, the entire area of the sensor layer 200 may be scanned. In the searching charging drive mode, when the pen PN is sensed, the sensor layer 200 may be driven for tracking charging. For example, in the tracking charging drive mode, the sensor driving unit 200C may sequentially output the first signal SG1 and the second signal SG2 to an area overlapping with a point at which the pen PN is sensed, rather than to the entire sensor layer 200.

In the charging drive mode, the sensor driving unit 200C may apply the first signal SG1 to one pad from among the third pads PD3 and the fifth pads PD5, and may apply the second signal to another one pad. The second signal SG2 may be an inverse signal of the first signal SG1. For example, the first signal SG1 may be a sinusoidal signal.

Because the first signal SG1 and the second signal SG2 may be applied to at least two pads, a current RFS may have a current path flowing to the other one pad through the one pad. Further, because the first signal SG1 and the second signal SG2 may be sinusoidal signals having an inverse relationship, a direction of the current RFS may be changed periodically. In an embodiment of the present disclosure, the first signal SG1 and the second signal SG2 may be square wave signals having an inverse phase relationship.

When the first signal SG1 and the second signal SG2 have the inverse phase relationship, noise that may be caused in the display layer 100 (e.g., see FIG. 4) by the first signal SG1 may be canceled with noise that may be caused by the second signal SG2. Thus, a flicker phenomenon may not occur in the display layer 100, and a display quality of the display layer 100 may be improved.

In an embodiment of the present disclosure, the first signal SG1 may be a sinusoidal signal. However, the present disclosure is not limited thereto, and the first signal SG1 may be a square wave signal. Further, the second signal SG2 may have a suitable constant voltage (e.g., a predetermined constant voltage). For example, the second signal SG2 may be a ground voltage. In other words, the pad to which the second signal SG2 is applied may be grounded or considered as being grounded. Even in this case, the current RFS may flow from the one pad to the other pad. Further, even when the other one pad is grounded, the first signal SG1 may be a sinusoidal wave signal or a square wave signal, and thus, the direction of the current RFS may be changed periodically.

FIG. 22 illustrates that the first signal SG1 is provided to the one third pad PD3 connected to one third trace line 230rt1, and the second signal SG2 is provided to the one fourth pad PD4 connected to the fourth trace line 230rt2. The current RFS may flow through the current path defined by the fourth pad PD4, the fourth trace line 230rt2 connected to the fourth pad PD4, the third electrode group 230G, a portion of the third trace line 230rt1 connected to the third pad PD3, and the third pad PD3. The current path may have a coil shape. Thus, in the charging drive mode of the second mode, a resonant circuit of the pen PN may be charged by the current path.

According to some embodiments of the present disclosure, the current path having a loop coil pattern may be implemented by the components included in the sensor layer 200. Thus, the electronic device 1000 (e.g., see FIG. 1A) may charge the pen PN using the sensor layer 200. As such, because an additional component having a coil for charging the pen PN may not be separately provided or required, an increase in the thickness, an increase in the weight, and a decrease in the flexibility of the electronic device 1000 may be prevented or substantially prevented.

In the charging drive mode, the first electrode groups 210G, the second electrode groups 220G, and the fourth electrode groups 240G may be grounded or electrically floated, or a constant voltage may be applied thereto. In more detail, the first electrode groups 210G, the second electrode groups 220G, and the fourth electrode groups 240G may be floated. In this case, the current RFS may not flow to the first electrode groups 210G, the second electrode groups 220G, and the fourth electrode group 240G.

FIG. 24A is a view illustrating the second mode according to an embodiment of the present disclosure. FIG. 24B is a view illustrating the second mode according to an embodiment of the present disclosure.

Referring to FIGS. 5, 24A, and 24B, the second mode may include the charging drive mode and a pen sensing drive mode. FIGS. 24A and 24B are views illustrating the pen sensing drive mode. FIG. 24B is an equivalent circuit diagram of a partial configuration of the sensor layer 200 through which first to fourth induced currents Ia, Ib, Ic, and Id generated by the pen PN may flow.

In an embodiment of the present disclosure, routing directions of one electrode and another one electrode of the sensor layer 200, which overlap with each other, may be different from each other. For example, a routing direction of a first electrode 210x and a routing direction of a third electrode 230x may be different from each other. Further, a routing direction of a second electrode 220x and a routing direction of a fourth electrode 240x may be different from each other. For example, in FIG. 24B, the first electrode 210x and the first trace line 210t may be connected to each other at a lower portion of the sensing unit SU, and the third electrode 230x and the third trace line 230rt1 may be connected to each other at an upper portion of the sensing unit SU. The second electrode 220x and the second trace line 220t may be connected to each other at a right portion of the sensing unit SU, and the fourth electrode 240x and the fifth trace line 240t may be connected to each other at a left portion of the sensing unit SU.

The RLC resonant circuit of the pen PN may emit a magnetic field having a resonant frequency while discharging the charged charges. By the magnetic field provided in the pen PN, the first induced current Ia may be generated in the first electrode 210x, and the second induced current Ib may be generated in the second electrode 220x. Further, the third induced current Ic may be generated in the third electrode 230x, and the fourth induced current Id may be generated in the fourth electrode 240x.

A first coupling capacitor Ccp1 may be formed between the third electrode 230x and the first electrode 210x, and a second coupling capacitor Ccp2 may be formed between the fourth electrode 240x and the second electrode 220x. The third induced current Ic may be transmitted to the first electrode 210x through the first coupling capacitor Ccp1, and the fourth induced current Id may be transmitted to the second electrode 220x through the second coupling capacitor Ccp2.

The sensor driving unit 200C may receive, from the first electrode 210x, a first reception signal PRX1a based on the first induced current Ia and the third induced current Ic, and may receive, form the second electrode 220x, a second reception signal PRX2a based on the second induced current Ib and the fourth induced current Id. The sensor driving unit 200C may detect the input coordinates of the pen PN based on the first reception signal PRX1a and the second reception signal PRX2a.

The sensor driving unit 200C may receive the first reception signal PRX1a from the first electrode 210x, and may receive the second reception signal PRX2a from the second electrode 220x. In this case, both ends (e.g., opposite ends) of the third electrode 230x and the fourth electrode 240x may be floating. Thus, the compensation for the sensing signal may be maximized or increased by the coupling between the first electrode 210x and the third electrode 230x, and the coupling between the second electrode 220x and the fourth electrode 240x.

Further, the other ends of the third electrode 230x and the fourth electrode 240x may be grounded or floated. Thus, the third induced current Ic and the fourth induced current Id may be sufficiently transmitted to the first electrode 210x and the second electrode 220x by the coupling between the first electrode 210x and the third electrode 230x and the coupling between the second electrode 220x and the fourth electrode 240x.

FIG. 25A is a view illustrating a method of detecting input coordinates of a pen in the sensor layer 200 according to an embodiment of the present disclosure. FIG. 25A illustrates a method of detecting the input coordinates of the pen PN in the sensor layer 200 described above with reference to FIGS. 7 and 8A.

Referring to FIGS. 7, 8A, and 25A, the sensor layer 200 may be used to detect the input coordinates of the pen PN, and may include the second electrode groups 220G, each including the first split electrode D1 and the second split electrode D2. The sensor layer 200 includes the fifth trace line 240t of which at least a portion overlaps with the sensing area 200A, and which is disposed inside the gaps GP between the first and second split electrodes D1 and D2. Further, within one second electrode group 220G, the length d1 of the first split electrode D1 may be the same or substantially the same as the length d2 of the second split electrode D2.

In the sensor layer 200 according to an embodiment, the pen sensing drive mode of the second mode may be operated to detect data of the input coordinates of the pen PN. The pen PN may move along each of a first path PH1, a second path PH2, and a third path PH3 to secure the data of the input coordinates. The pen PN that moves along the first path PH1 may correspond to a state in which the pen PN moves in the second direction DR2 to cross the first split electrodes D1. The pen PN that moves along the second path PH2 may correspond to a state in which the pen PN moves along the second direction DR2 to cross the gaps GP between the first and second split electrodes D1 and D2. The pen PN that moves along the third path PH3 may correspond to a state in which the pen PN moves in the second direction DR2 to cross the second split electrodes D2. First coordinate data may be secured through the pen PN moving along the first path PH1, second coordinate data may be secured through the pen PN moving along the second path PH2, and third coordinate data may be secured through the pen PN moving along the third path PH3. According to an embodiment, no significant difference between y-coordinate values of the first coordinate data, the second coordinate data, and the third coordinate data may be identified. In other words, even when the split structure is applied to the second electrode groups 220G, and the fifth trace line 240t electrically connected to the fourth electrode groups 240G is disposed to cross the gaps GP between the split electrodes inside the second electrode groups 220G, a pen sensing sensitivity may not be changed depending on the position of the pen PN. In more detail, the pen sensing sensitivity in the gaps GP between the first and second split electrodes D1 and D2 and an area adjacent thereto may be the same or substantially the same as (or similar to) the pen sensing sensitivity in the other areas. As such, that the pen sensing sensitivity may be predicted to be uniform or substantially uniform in all areas.

FIG. 25B is a view illustrating a method of detecting the input coordinates of a pen in the sensor layer 200 according to an embodiment of the present disclosure. FIG. 25B illustrates a method of detecting the input coordinates of the pen in the sensor layer 200 described above with reference to FIG. 13.

Referring to FIGS. 13 and 25B, the sensor layer 200 may be used to detect the input coordinates of the pen PN, and may include the second electrode groups 220G, each including the first split electrode D1 and the second split electrode D2. The sensor layer 200 includes the fifth trace line 240t of which at least a portion overlaps with the sensing area 200A, and which is disposed inside the gaps GP between the first and second split electrodes D1 and D2. Further, within one second electrode group 220G, the length d1a of the first split electrode D1 is different from the length d2a of the second split electrode D2.

In the sensor layer 200 according to an embodiment, the pen sensing drive mode of the second mode may be operated to detect the data of the input coordinates of the pen PN. The pen PN may move along each of a first path PH1', a second path PH2', and a third path PH3' to secure the data of the input coordinates. First coordinate data may be secured through the pen PN moving along the first path PH1', second coordinate data may be secured through the pen PN moving along the second path PH2', and third coordinate data may be secured through the pen PN moving along the third path PH3'. According to an embodiment, there may be no significant difference between y-coordinate values of the first coordinate data, the second coordinate data, and the third coordinate data. In other words, even when the lengths of the first and second split electrodes D1 and D2 inside the second electrode groups 220G are different from each other, the pen sensing sensitivity may not be changed depending on the position of the pen PN.

According to some embodiments described above, an input by a pen, as well as a touch input, may be sensed using a sensor layer. As such, because the electronic device may not require an additional separate component (e.g., a digitizer) for pen sensing, an increase in a thickness, an increase in a weight, and a decrease in a flexibility of the electronic device due to the addition of the digitizer may be prevented.

According to some embodiments described above, in the sensor layer, a split structure may be applied to electrodes extending in a long axis direction, and thus, a resistance of an electrode included in a sensing unit may be decreased. Accordingly, a frequency range (e.g., a bandwidth) that may be applied to a signal provided to the sensor layer may be more secured, and a degree of freedom in selecting a frequency may be improved.

According to some embodiments described above, at least some of the trace lines of the sensor layer may overlap with a sensing area or a display area. As such, an area of the peripheral area of the sensor layer may be decreased. As a result, an area of a front surface of the electronic device, which is occupied by the peripheral area, may be decreased, and a narrower bezel may be implemented.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:
a sensor layer having a sensing area, and a peripheral area adjacent to the sensing area; and
a sensor driver configured to drive the sensor layer, and selectively operate in a first mode of sensing a touch input or a second mode of sensing a pen input,
wherein the sensor layer comprises:
a plurality of first electrodes, each extending in a first direction, and located along a second direction crossing the first direction;
a plurality of second electrodes, each extending in the first direction, and located along the second direction;
a plurality of first lines electrically connected to the plurality of first electrodes; and
a second line electrically connected to the plurality of second electrodes,
wherein each of the plurality of first electrodes comprises:
a first split electrode extending in the first direction; and
a second split electrode extending in the first direction, and spaced from
the first split electrode in the first direction, and p1 wherein at least a portion of the second line connects adjacent second electrodes to each other inside the sensing area from among the plurality of second electrodes, and
wherein at least a portion of each of the plurality of second electrodes overlaps with the first split electrode and the second split electrode of a corresponding one of the plurality of first electrodes.

2. The electronic device of claim 1, wherein the at least a portion of the second line is located inside a gap between the first split electrode and the second split electrode.

3. The electronic device of claim 1, wherein the second line comprises:
$(2-1)^{th}$ lines connecting adjacent ones of the plurality of second electrodes to each other; and
a $(2-2)^{th}$ line electrically connecting the plurality of second electrodes to the sensor driver, and
wherein the plurality of second electrodes, the $(2-1)^{th}$ lines, and the $(2-2)^{th}$ line have an integrated shape together.

4. The electronic device of claim 1, wherein each of the plurality of second electrodes comprises:
a first auxiliary split electrode extending in the first direction; and
a second auxiliary split electrode extending in the first direction, and spaced from the first auxiliary split electrode in the first direction, and
wherein the second line comprises:
a $(2-1)^{th}$ line electrically connected to a plurality of the first auxiliary split electrodes of the plurality of second electrodes; and
a $(2-2)^{th}$ line electrically connected to a plurality of the second auxiliary split electrodes of the plurality of second electrodes.

5. The electronic device of claim 4, wherein the $(2-1)^{th}$ line is connected to one area of each of the plurality of first auxiliary split electrodes adjacent to the plurality of the second auxiliary split electrodes, and
wherein the $(2-2)^{th}$ line is connected to one area of each of the plurality of the second auxiliary split electrodes adjacent to the plurality of the first auxiliary split electrodes.

6. The electronic device of claim 4, wherein at least a portion of the first auxiliary split electrode overlaps with the first split electrode of a corresponding one of the plurality of first electrodes, and
wherein at least a portion of the second auxiliary split electrode overlaps with the second split electrode of a corresponding one of the plurality of second electrodes.

7. The electronic device of claim 1, wherein a length of the first split electrode of one of the plurality of first electrodes and a length of the second split electrode of the one of the plurality of first electrodes are the same as each other.

8. The electronic device of claim 1, wherein a length of the first split electrode of one of the plurality of first electrodes and a length of the second split electrode of the one of the plurality of first electrodes are different from each other.

9. The electronic device of claim 1, wherein the first split electrodes of the plurality of first electrodes have the same length as each other, and
wherein the second split electrodes of the plurality of second electrodes have the same length as each other.

10. The electronic device of claim 1, wherein at least some of the first split electrodes of the plurality of first electrodes have different lengths from each other, and
wherein at least some of the second split electrodes of the plurality of second electrodes have different lengths from each other.

11. The electronic device of claim 10, wherein gaps between the first split electrodes of the plurality of first electrodes and the second split electrodes of the plurality of second electrodes are located along a diagonal direction with respect to the first direction and the second direction.

12. The electronic device of claim 1, wherein the plurality of first lines comprises:

a plurality of $(1-1)^{th}$ lines electrically connected to a plurality of the first split electrodes of the plurality of first electrodes, respectively; and a plurality of $(1-2)^{th}$ lines electrically connected to a plurality of the second split electrodes of the plurality of first electrodes, respectively.

13. The electronic device of claim 12, wherein each of the plurality of $(1-1)^{th}$ lines and the plurality of $(1-2)^{th}$ lines overlaps with the peripheral area, and the plurality of $(1-1)^{th}$ lines and the plurality of $(1-2)^{th}$ lines are spaced from each other with the plurality of the first split electrodes and the plurality of the second split electrodes located therebetween.

14. The electronic device of claim 12, wherein at least a portion of each of the plurality of $(1-1)^{th}$ lines and the plurality of $(1-2)^{th}$ lines overlaps with the sensing area, and wherein at least some of the plurality of $(1-1)^{th}$ lines are insulated from and cross at least some of the plurality of the first split electrodes, and at least some of the plurality of $(1-2)^{th}$ lines are insulated from and cross at least some of the plurality of the second split electrodes.

15. The electronic device of claim 1, wherein each of the plurality of first electrodes further comprises a third split electrode spaced from the first split electrode and the second split electrode in the first direction, and extending in the first direction.

16. The electronic device of claim 15, wherein at least a portion of each of the plurality of second electrodes overlaps with the first split electrode, the second split electrode, and the third split electrode of a corresponding one of the plurality of first electrodes.

17. The electronic device of claim 15, wherein each of the plurality of second electrodes comprises a first auxiliary split electrode, a second auxiliary split electrode, and a third auxiliary split electrode spaced from each other in the first direction, and extending in the first direction, and wherein the second line comprises:

a $(2-1)^{th}$ line electrically connected to a plurality of the first auxiliary split electrodes of the plurality of second electrodes;

a $(2-2)^{th}$ line electrically connected to a plurality of the second auxiliary split electrodes of the plurality of second electrodes; and a $(2-3)^{th}$ line electrically connected to a plurality of the third auxiliary split electrodes of the plurality of second electrodes.

18. The electronic device of claim 1, wherein a length of the sensing area in the first direction is greater than a length of the sensing area in the second direction.

19. The electronic device of claim 1, wherein the sensor layer further comprises:

a plurality of third electrodes located along the first direction, and insulated from and crossing the plurality of first electrodes, each of the plurality of third electrodes extending in the second direction;

a plurality of fourth electrodes located along the first direction, and insulated from and crossing the plurality of third electrodes, each of the plurality of fourth electrodes extending in the second direction;

a plurality of third lines electrically connected to the plurality of third electrodes, respectively; and a fourth line electrically connected to the plurality of fourth electrodes.

20. The electronic device of claim 19, wherein, in the first mode, the plurality of first electrodes and the plurality of third electrodes are configured to sense a capacitance, and the plurality of second electrodes and the plurality of fourth electrodes are configured to be grounded, wherein the second mode comprises a pen sensing drive mode, and wherein, in the pen sensing drive mode, the sensor driver is configured to receive reception signals based on an induced current flowing through the plurality of first electrodes, the plurality of second electrodes, the plurality of third electrodes, and the plurality of fourth electrodes.

21. The electronic device of claim 20, wherein the second mode further comprises a charging drive mode, and wherein, in the charging drive mode, at least the plurality of fourth electrodes is configured to define a current path, and the plurality of first electrodes, the plurality of second electrodes, and the plurality of third electrodes are configured to be floated.

22. An electronic device comprising:

a sensor layer; and a sensor driver configured to drive the sensor layer, and selectively operate in a first mode of sensing a touch input or a second mode of sensing a pen input, wherein the sensor layer comprises:

a plurality of first electrodes, each extending in a first direction, and located along a second direction crossing the first direction;

a plurality of second electrodes, each extending in the first direction, and located along the second direction;

a plurality of first lines electrically connected to the plurality of first electrodes; and a second line electrically connected to the plurality of second electrodes, wherein each of the plurality of first electrodes comprises:

a first split electrode extending in the first direction; and a second split electrode extending in the first direction, and spaced from the first split electrode in the first direction, and wherein at least a portion of the second line is located inside a gap between the first split electrode and the second split electrode.

23. An electronic device comprising:

a sensor layer having a sensing area, and a peripheral area adjacent to the sensing area, the sensor layer comprising:

a plurality of first electrodes, each extending in a first direction, and located along a second direction crossing the first direction;

a plurality of second electrodes, each extending in the first direction, and located along the second direction;

a plurality of first lines electrically connected to the plurality of first electrodes; and a second line electrically connected to the plurality of second electrodes, wherein at least a portion of the second line connects adjacent second electrodes to each other inside the sensing area from among the plurality of second electrodes, and the plurality of second electrodes and the second line have an integrated shape together.

* * * * *